United States Patent
Kasuya et al.

(10) Patent No.: US 7,639,800 B2
(45) Date of Patent: Dec. 29, 2009

(54) DATA CONVERSION DEVICE AND DATA CONVERSION METHOD

(75) Inventors: Tomomi Kasuya, Tokyo (JP); Mitsuru Matsui, Tokyo (JP); Tetsuya Ichikawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 768 days.

(21) Appl. No.: 10/514,637

(22) PCT Filed: Mar. 7, 2003

(86) PCT No.: PCT/JP03/02689

§ 371 (c)(1), (2), (4) Date: Nov. 17, 2004

(87) PCT Pub. No.: WO03/100751

PCT Pub. Date: Dec. 4, 2003

(65) Prior Publication Data

US 2005/0226407 A1    Oct. 13, 2005

(30) Foreign Application Priority Data

May 23, 2002    (JP)    ............................ 2002-148786

(51) Int. Cl.
H04L 9/06    (2006.01)
(52) U.S. Cl. .......................................... 380/37; 380/29
(58) Field of Classification Search .................. 380/28, 380/37, 210, 255, 259, 277–278; 713/168, 713/189
See application file for complete search history.

(56) References Cited

U.S. PATENT DOCUMENTS

| | | | | |
|---|---|---|---|---|
| 6,065,143 | A | * 5/2000 | Yamasaki et al. | ............ 714/720 |
| 7,333,609 | B2 | * 2/2008 | Kasuya et al. | ................ 380/46 |
| 2002/0159599 | A1 | 10/2002 | Matsui et al. | |
| 2002/0181709 | A1 | * 12/2002 | Sorimachi et al. | ............ 380/265 |
| 2003/0051147 | A1 | 3/2003 | Maeda et al. | |
| 2003/0076985 | A1 | 4/2003 | Moghaddam | |
| 2003/0095664 | A1 | * 5/2003 | Asano et al. | ................ 380/277 |

OTHER PUBLICATIONS

Tokita et al., "Misty, Kasumi and Camellia Cipher Algorithm Development", Technical Reports by Mitsibuishi Electric Advance, Dec. 2002, pp. 2-8.*

(Continued)

*Primary Examiner*—Gilberto Barron, Jr.
*Assistant Examiner*—Hadi Armouche
(74) *Attorney, Agent, or Firm*—Birch, Stewart, Kolasch & Birch, LLP

(57) ABSTRACT

A sub converter 330 provided in a data conversion apparatus for data encryption/decryption includes a data conversion function and a data transfer function or key transfer function, the sub converter converts data and transfers data that is nonlinear converted in a main converter 320 or a key that is outputted from a key KL register 240, by switching between the data conversion function and the data or key transfer function.

31 Claims, 64 Drawing Sheets

OTHER PUBLICATIONS

A. Satoh, et al., "Compact Hardware Architecture for 128-bit Block Cipher Camellia," Third Open Nessie Workshop, Siemens AG, Munich Germany, Sponsored by Information Societies Technology (IST) Programme of the European Commission, Nov. 6-7, 2002.

K. Aoki, et al., "Camellia: A 128-Bit Block Cipher Suitable for Multiple Platforms," NTT and Mitsubishi Electric Corporation 2000-2002.

K. Aoki, et al., "Specification of *Camellia*—a 128-bit Block Cipher," NTT and Mitsubishi Electric Corporation 2000-2001.

CRYPTREC Report 2000, Feistel—SPN (Substitution Permutation Network), Information Technology Promotion Agency, Security Center, Mar. 2001, pp. 15-17.

Aoki et al., *Camellia*: A 128-Bit Block Cipher Suitable for Multiple Platforms—Design and Analysis, pp. 39-56, 2000.

Aoki, et al. "128 Bit block Ango Camellia no Jisso Hyoka", The Institute of Electronics, Information and Communiction Engineers, Gijutsu Kenkyu Hokoku, Sep. 22, 2000, ISEC 2000-68 to 78, vol. 100, No. 324, pp. 131 to 138.

Sato, et al. "128 Bit Block Ango Camellia no Kogata Hardware Architecture", 2002 nen Ango to Joho Security Symposium Yokoshu, Jan. 29, 2002, vol. 2, pp. 595-598.

Aoki, et al. "128 Bit block Ango Camellia no Jisso Hyoka", The Institute of Electronics, Information and Communication Engineers, Gijutsu Kenkyu Hokoku, Sep. 22, 2000, ISEC 2000-68 to 78, vol. 100, No. 324, pp. 131 to 138.

Ichikawa, et al. "128 Bit Block Ango Camellia no Kogata Hardware Jisso ni okeru Ichihoho", The Institute of Electronics, Information and Communication Engineers Gijutsu Kenkyu Hokoku, Mar. 12, 2002, SST 2001-190 to 217, vol. 101, No. 730, pp. 121 to 126.

Sato et al.; "Small Hardware Architecture of 128-bit Block Cipher Camellia"; Proceedings of the 2002 Symposium on Cryptography and Information Security, vol. II; Jan. 29-Feb. 1, 2002.

Aoki et al.; "Camellia—A 128-bit Block Cipher"; Techical Report of IEICE; ISEC2000-B (May 2000).

\* cited by examiner

DATA CONVERSION DEVICE AND DATA CONVERSION METHOD

TECHNICAL FIELD

The present invention relates to a data conversion apparatus for data encryption and/or data decryption and a method thereof.

BACKGROUND ART

A description will now be given of related art.

FIG. 56 is a diagram illustrating the configuration and operation of a related data conversion apparatus.

As shown in FIG. 56, the data conversion apparatus for block cipher consists of a key generator 20 and a data scrambler 30.

The key generator 20 is a key generation unit that generates a key for data encryption/decryption.

The data scrambler 30 is a unit that encrypts and decrypts input data.

The key generator 20 consists of an intermediate key generator 40 and a key scheduler 210. The intermediate key generator 40 is a unit that receives a secret key and generates an intermediate key (Key KL) and an output key (Key KA) based on the secret key received. The key scheduler 210 that receives the intermediate keys (Key KL) and the output keys (Key KA) generated at the intermediate key generator 40 (Key KLL, Key KLH, Key KAL, and Key KAH), and schedules a key to be fed to the data scrambler 30 among the inputted keys. Thus, in the key generator 20, keys are generated and scheduled at the intermediate key generator 40 and the key scheduler 210, respectively.

The data scrambler 30, upon receipt of P (plaintext), performs a data conversion of the data for encryption, and then outputs converted data as C (ciphertext). Upon receipt of P (ciphertext), on the other hand, the data scrambler 30 performs a data conversion of the data for data decryption, and then outputs converted data as C (deciphertext). The data scrambler 30 thus performs the data encryption process and the data decryption process.

In the data scrambler 30, a main converter 320 and a sub converter 330 are connected in series.

The main converter 320 is a unit that performs nonlinear conversion. More particularly, the main converter 320 is provided with an F function that performs nonlinear data conversion for one round or multiple rounds, or a part of the F function, and performs a nonlinear conversion of data using the F function or the part of the F function. FIG. 57 shows the main converter 320 that is provided with the F function for one or more rounds.

The sub converter 330 is provided with at least one of a data converter unit (FL) performing a linear conversion of data and a data inverter unit ($FL^{-1}$) performing a conversion that is inverse to the conversion performed by the data converter unit, and makes a linear conversion of input data using an input key by means of the data converter unit (FL) or the data inverter unit ($FL^{-1}$).

The selector 310 is a selector that selects one signal out of the input signals of the main converter 320, the sub converter 330, P (plaintext or ciphertext) and a key. The selector 310 shown in FIG. 56 is provided with a selector that selects one signal out of four input signals, which is equivalent to three 2-1 selectors, each of which outputs one output signal out of two input signals.

The arithmetic register 350 is a memory that holds data that is outputted as the main converter 320, the sub converter 330 and C (ciphertext or deciphertext) for a predetermined period of time.

Thus, the data scrambler 30 encrypts/decrypts the input data P (plaintext or ciphertext) through repetitions of nonlinear conversion by the main converter 320 and the linear conversion by the sub converter 330 several times alternately, and then outputs C (ciphertext or deciphertext).

A description will now be given of the internal configuration of the main converter 320.

FIG. 57 shows the internal configuration of the main converter 320. The main converter 320 of FIG. 57 is made up with six F function units. Assuming here that each of the F function units is configured with a circuit that is designed for a one-round F function process, the main converter 320 of FIG. 57 is then to perform the F function based nonlinear data conversion for six rounds.

With respect to the circuit for the six-round F function process, the main converter 320 may be provided with six F function process circuits, or otherwise a single F function process circuit with repetitions of the F function process six times to end up achieving the six-round F function based data processing.

At the main converter 320, upper data divided of input data is inputted to an F function unit 321a first. A key 1 that was scheduled by the key scheduler 210 is also inputted thereto. At the F function unit 321a, the upper input data is nonlinear converted by use of the key as aforementioned. At an EXOR circuit 322a, the data nonlinear converted is XORed with the lower input data. Data outputted from the EXOR circuit 322a is inputted to an F function unit 321b. The F function unit 321b, like the F function unit 321a, performs the nonlinear conversion, and converted data is then XORed with the upper input data at an EXOR circuit 322b. Data outputted from the EXOR circuit 322b is inputted to an F function unit 321c. In this manner, the same process as that performed by the F function unit 321a and the EXOR circuit 322a is performed by the F function unit 321b and the EXOR circuit 322b, by the F function unit 321c and an EXOR circuit 322c, by an F function unit 321d and an EXOR circuit 322d, by an F function unit 321e and an EXOR circuit 322e, and by an F function unit 321f and an EXOR circuit 322f, respectively. Thus, the six-round F function based nonlinear conversion is performed (or the one-round F function based nonlinear data conversion is repeated six times) in that manner, and then converted data is outputted.

The structure for the process of nonlinear conversion aforementioned is called a FEISTEL structure, which is characterized in that the upper data and the lower data are swapped and outputted by receiving one of upper data divided and lower data divided, nonlinear converting data received, outputting one of the upper data and the lower data converted, XORing between one of the upper data and the lower data outputted and the other one of the upper data and the lower data, swapping XORed data and the other one of the upper data and the lower data that was not inputted to the F function unit, and outputting the lower data and the upper data swapped.

Typical structures for data randomization are FEISTEL structure and SPN (Substitution Permutation Network) structure. The main converter 320 with the SPN structure is said to excel in parallel processing. With the FEISTEL structure, the main converter 320 is said to excel in hardware downsizing.

Note that the SPN structure, unlike the FEISTEL structure in which input data is divided, is structured such that an F function made up of an S layer (nonlinear layer) and a P layer (linear layer) is repeated.

A description will now be given of the internal structure of the sub converter 330.

FIG. 58 is a diagram illustrating circuits that make up the sub converter 330.

The sub converter 330 of FIG. 58 is provided with a data converter unit 50 and a data inverter unit 70.

In the data converter unit 50, a logical AND operation is performed between the upper 32-bit data of 64-bit input data and a key 1 at an AND circuit 54, a result of which is then subject to rotation shift by one bit to the left. Then, at an EXOR circuit 55, an input is XORed with the lower 32 bits of the input data, a result of which is outputted as a lower 32-bit output signal and also inputted to an OR circuit 57. Then, at the OR circuit 57, an input is subject to a logical OR operation with a key 2, a result of which is then XORed with the upper 32-bit data of the input data at an EXOR circuit 56, a result of which is outputted as an upper 32-bit output signal. In this manner, the 64-bit input data is linear converted and then outputted as a 64-bit output signal.

In the data inverter unit 70, a logical OR operation is performed between the lower 32-bit data of 64-bit input data and a key 3 at an OR circuit 74, a result of which is then XORed with the upper 32 bits of the input data at an EXOR circuit 75, a result of which is outputted as an upper 32-bit output signal and also inputted to an AND circuit 77. At the AND circuit 77, an input is subject to a logical AND operation with a key 4, a result of which is then subject to rotation shift by one bit to the left. Then, at an EXOR circuit 76, an input is XORed with the lower 32-bit data of the input data, a result of which is outputted as a lower 32-bit output signal. In this manner, the 64-bit input data is liner converted at the data converter unit 50 and the data inverter unit 70, and then outputted as a 64-bit output signal. Note that the key 1 through the key 4 are fed by the key scheduler 210.

FIG. 59 is a diagram showing a circuit shared by the data converter unit 50 and the data inverter unit 70 as an example of the sub converter 330.

With FIG. 59, when a switching signal for switching between the data converter unit 50 and the data inverter unit 70 is inputted, the data converter unit 50 and the data inverter unit 70 are switched. More specifically, in the shared circuit of FIG. 59 when receiving the switching signal, a 2-1 selector 99a switches between an input signal A and an input signal E, and a 2-1 selector 99b switches between an input signal C and an input signal F.

A description will be given of the case in which the shared circuit acts as the data converter unit 50 first.

The 2-1 selector 99a selects the input signal A out of the input signal E and the input signal A, and outputs the signal as an output signal B. Then, at an AND circuit 101, an input is subject to a logical AND operation with the key 1, a result of which is then subject to rotation shift by one bit to the left. Then, at an EXOR circuit 91, an input is XORed with the lower 32 bits of the input data, a result of which is outputted as a lower 32-bit output signal, and also inputted to the 2-1 selector 99b as the input signal C. The 2-1 selector 99b selects the input signal C out of the input signal C and the input signal F, and outputs the signal C as an output signal D. Then, at an OR circuit 92, a logical OR operation is performed between the output signal D and a key 2, a result of which is then XORed with the upper 32-bit data of the input data at an EXOR circuit 93, a result of which is then outputted as an upper 32-bit output signal.

A description will then be given of the case in which the shared circuit acts as the data inverter unit 70.

The 2-1 selector 99b selects the input signal F out of the input signal C and the input signal F, and outputs the input signal F as the output signal D. Then, the OR circuit 92 performs a logical OR operation between the output signal D and the key 2, a result of which is XORed with the upper 32 bits of the input data at the EXOR circuit 93, a result of which is outputted as an upper 32-bit output signal, and also inputted to the 2-1 selector 99a as the input signal E. The 2-1 selector 99a selects the input signal E out of the input signal A and the input signal E, and outputs the input signal E as the output signal B. Then, at the AND circuit 101, a logical OR operation is performed between the output signal B and the key 1, a result of which is then subject to rotation shift by one bit to the left, a result of which is then XORed with the lower 32 bits of the input data at the EXOR circuit 91, a result of which is outputted as a lower 32-bit output signal.

FIG. 60, in contrast with the data conversion apparatus of FIG. 56, is a diagram illustrating a data conversion apparatus in which the main converter 320 is provided with $\frac{1}{2}^x (x \geq 1)$ F function, which is designed for processing the F function for less than one round.

In the case where the main converter 320 is provided with ½ F function, for example, a two-cycle process may be performed by way of the path from the main converter 320 through the sub converter 330, the selector 310, the arithmetic register 350, then back to the main converter 320. This allows one round of F function based nonlinear data conversion process to be accomplished. To implement such a process, the data conversion apparatus of FIG. 60, in contrast with the converter of FIG. 56, is added with the path from the arithmetic register 350 to the selector 310.

A description will now be given of the operation of the main converter 320 by way of the path from the arithmetic register 350 to the selector 310.

FIG. 61 illustrates the internal configuration of the main converter 320.

As shown in FIG. 61, the main converter 320 is made up of 12 F function units, each of which processes the F function for less than one round, e.g., ½ of the F function (½ F function). The main converter 320 of FIG. 61 performs data conversion using an F function unit 1321a, an F function unit 1321b, an EXOR circuit 1322a, and an EXOR circuit 1322b, while the main converter 320 of FIG. 57 performs the same data conversion using the F function unit 321a and the EXOR circuit 322a.

With reference to the main converter 320 of FIG. 61, the first round process will be explained first. Upper data divided from the upper input data is inputted to the F function unit 1321a. A key 1H, which is made up of the upper bits of the key 1 scheduled by the key scheduler 210, is also inputted to the F function unit 1321a. The F function unit 1321a nonlinear converts the upper data using the key 1H. Then, converted data is inputted to the EXOR circuit 1322a, and is XORed with the upper data divided from the lower input data.

Data outputted from the EXOR circuit 1322a is held in the arithmetic register 350 as intermediate data until a data processing is done in the EXOR circuit 1322b.

Then, a second round process will be explained. From the upper input data, the lower data divided is inputted to the F function unit 1321b. A key 1L, which is made up of the lower bits of the key 1 scheduled by the key scheduler 210, is also inputted to the F function unit 1321b. The F function unit 1321b performs a nonlinear conversion of the lower data using the key 1L. Then, converted data is inputted to the EXOR circuit 1322b.

Now, the intermediate data, which is the output data from the EXOR circuit 1322a and held in the arithmetic register 350, is to be inputted to the EXOR circuit 1322b. Then, the path from the arithmetic register 350 to the selector 310 is needed. More specifically, the path from the arithmetic register 350 to the selector 310 allows inputting the intermediate data held in the arithmetic register 350 to the selector 310. The selector 310 selects the intermediate data received. The intermediate data is then inputted to the main converter 320 via the arithmetic register 350, and then XORed with output data from the F function unit 1321b by the EXOR circuit 1322b. Output data from the EXOR circuit 1322b is inputted to the F function 1321c.

In this manner, the same process as that performed by the F function unit 1321a, the EXOR circuit 1322a, the F function unit 1321b, and the EXOR circuit 1322b is performed by an F function unit 1321c, an EXOR circuit 1322c, an F function unit 1321d, and an EXOR circuit 1322d, by an F function unit 1321e, an EXOR circuit 1322e, an F function unit 1321f, and an EXOR circuit 1322f, by an F function unit 1321g, an EXOR circuit 1322g, an F function unit 1321h, and an EXOR circuit 1322h, by an F function unit 1321i, an EXOR circuit 1322i, an F function unit 1321j, and an EXOR circuit 1322j, and by an F function unit 1321k, an EXOR circuit 1322k, an F function unit 1321l, and an EXOR circuit 1322l, respectively. After thus processing the 12-round nonlinear data conversion by the F function units (or repeating 12 times), converted data is outputted.

Problem 1.

With reference to the data conversion apparatuses of FIG. 56 and FIG. 60, the key generator 20 uses part of the main converter 320 and part of the sub converter 330 so as to generate a key used for data encryption/decryption. The purpose of using part of the main converter 320 and part of the sub converter 330 is to reduce the total size of the data conversion apparatus.

With this key generating operation discussed later in detail, in order to generate a key thus using part of the main converter 320 and part of the sub converter 330, a path is needed to input the intermediate key (Key KL) outputted from the key KL register 240 into the selector 310 as shown in FIG. 56. This increase of the path from the key KL register 240 to the selector 310 is a cause of preventing the data conversion apparatus from getting smaller.

This also increases the number of input signals to the selector 310 by way of the path from the key KL register 240 to the selector 310, which causes an increase in the number of selectors consisting of the selector 310. This is another cause of preventing the data conversion apparatus from getting smaller.

As aforementioned, the one-round F function based data conversion in two or more cycles is accompanied by the need of inputting the intermediate data held for a given period of time into the main converter 320. This increase of the path to transfer the intermediate data from the arithmetic register 350 to the selector 310 is still another cause of preventing the data conversion apparatus from getting smaller.

Additionally, the increase in the number of input signals to the selector 310 by way of the path from the arithmetic register 350 to the selector 310 causes an increase in the number of selectors consisting of the selector 310. This is still another cause of preventing the data conversion apparatus from getting smaller.

Problem 2.

With reference to the data scramblers 30 of the data conversion apparatuses shown in FIG. 56 and FIG. 60, the main converter 320 and the sub converter 330 are connected in series. This determines the operation frequency uniquely by the path from the main converter 320 through the sub converter 330, the selector 310, the arithmetic register 350 then back to the main converter 320, which prevents the operation frequency from being improved. Therefore, it has been a desire to increase the operation frequency by making a maximum path for data processing shorter in the data scrambler 30, thereby improving the throughput speed remarkably. Additionally, there is no path provided which allows data outputted from the selector 310 and then the arithmetic register 350 to go into the sub converter 330 without passing through the main converter 320. Therefore, a flexible response is not allowed to a change in the internal configuration of the data conversion apparatus, which results in little flexibility in the overall operation.

As aforementioned, in the case where the one-round F function based data conversion is performed in two or more cycles, it is part of input data (½ of the input data with ½ F function) that is converted in one cycle. This requires the path in the data scrambler 30 to transfer converted data of the part of input data to the arithmetic register 350 to be held therein and then transfer the converted data to the sub converter 330 after a given period of time. Or otherwise, the transfer path is required in the main converter 320 to transfer the converted data to the sub converter 330 passing through the main converter 320 after a given period of time.

Additionally, with the circuit shared by the data converter unit 50 and the data inverter unit 70 shown in FIG. 59, the path A→B→C→D→E→B→C . . . corresponds to a loop circuit. This requires the shared circuit designed not to become a transmission circuit in practical implementation when affected by signal racing caused by differences in the propagation delay of switching signals, noise, etc. Another problem is that logic synthetic tools are not applicable to such a circuit having a loop circuit (FEEDBACK-LOOP circuit), and therefore logic synthesis cannot be achieved efficiently.

It is an object of the present invention to downsize a data conversion apparatus.

It is another object of the present invention to improve the operation frequency of a data conversion apparatus.

DISCLOSURE OF THE INVENTION

A data conversion apparatus according to this invention receives a key and data, and performs data conversion for one of encryption and decryption of the data received using the key received.

The data conversion apparatus is characterized by including a data scrambler performing data conversion and a controller controlling a transfer signal indicating one of the key and the data to be transferred.

Then, the controller is characterized by outputting the transfer signal in a case of transferring the one of the key and the data.

Then, the data scrambler is characterized by including a sub converter performing the data conversion for the one of data encryption and data decryption by converting the data received using the key received, and transferring at least one of the key received and the data received without data conversion upon receipt of the transfer signal outputted by the controller.

The data scrambler is characterized by further including a main converter receiving the data and nonlinear converting the data received.

Then, the controller is characterized by outputting a data transfer signal as the transfer signal in a case of transferring the data.

Then, the sub converter is characterized by receiving the data transfer signal outputted from the controller and the data nonlinear converted by the main converter, and transferring the data received according to the data transfer signal received.

The data conversion apparatus is characterized by further including a key generator generating the key.

Then, the controller is characterized by outputting a key transfer signal as the transfer signal in a case of transferring the key.

Then, the sub converter is characterized by receiving the key transfer signal outputted from the controller and the key generated by the key generator, and transferring the key received according to the key transfer signal received.

The key generator is characterized by further including an intermediate key generator that receives a secret key and generates an intermediate key based on the secret key received.

Then, the sub converter is characterized by, upon receipt of the key transfer signal outputted from the controller, transferring the intermediate key generated by the intermediate key generator to the main converter according to the key transfer signal received.

Then, the main converter is characterized by repeating converting and outputting the intermediate key transferred by the sub converter at least once.

Then, the sub converter is characterized by repeating converting and outputting the intermediate key outputted from the main converter at least once.

Then, at least one of the main converter and the sub converter is characterized by repeating converting and outputting the intermediate key at least once.

Then, the main converter is characterized by outputting the intermediate key outputted from at least one of the main converter and the sub converter as an output key.

Then, the intermediate key generator is characterized by receiving the output key outputted from the main converter, thereby generating an extended key including the intermediate key and the output key.

The intermediate key generator is characterized by including a 6-1 KL selector selecting one key from among six keys received, and a key KL register holding the one key selected by the 6-1 KL selector as the intermediate key.

Then, the 6-1 KL selector is characterized by receiving a secret key, receiving six keys including the secret key, the intermediate key held in the key KL register, and four keys obtained through rotation shifts of the intermediate key held in the key KL register by four different numbers, and selecting one key from among the six keys received.

Then, the key KL register is characterized by holding a key selected by the 6-1 KL selector.

Then, the sub converter is characterized by, upon receipt of the key transfer signal outputted from the controller, receiving the key held in the key KL register as the intermediate key, and transferring the intermediate key received.

The intermediate key generator is characterized by including a 4-1 selector selecting one key from among four keys received, a 3-1 KL selector selecting one key from among three keys received, and a key KL register holding a key selected by the 3-1 KL selector as the intermediate key.

Then, the 4-1 selector is characterized by receiving four keys obtained through the rotation shifts of the intermediate key held in the key KL register by four different numbers, and selecting one key from among the four keys received.

Then, the 3-1 KL selector is characterized by receiving a secret key, receiving three keys including the secret key, the one key selected by the 4-1 selector, and the intermediate key held in the key KL register, and selecting one key from among the three keys received.

Then, the key KL register is characterized by holding a key selected by the 3-1 KL selector.

Then, the sub converter is characterized by, upon receipt of the key transfer signal outputted from the controller, receiving the key held in the key KL register as the intermediate key, and transferring the intermediate key received.

The key generator is characterized by further including a key scheduler receiving the extended key generated by the intermediate key generator and a predetermined constant, and scheduling a key for outputting one of the extended key received and the predetermined constant received to at least one of the main converter and the sub converter according to a predetermined condition.

The sub converter is characterized by including at least one of a data converter unit (FL) performing linear data conversion, and a data inverter unit ($FL^{-1}$) performing a data conversion that is inverse to that of the data converter unit (FL).

Then, at least one of the data converter unit (FL) and the data inverter unit ($FL^{-1}$) is characterized by performing the data conversion, and receiving the transfer signal outputted from the controller and transfers at least one of the data and the key without the data conversion according to the transfer signal received, in a case where the controller outputs the transfer signal.

The controller is characterized by outputting a key transfer signal and a mask signal as the transfer signals for transferring key received.

Then, at least one of the data converter unit (FL) and the data inverter unit ($FL^{-1}$) is characterized by transferring the key, upon receipt of the key transfer signal and the mask signal outputted from the controller, by nullifying the data received according to the key transfer signal received, and letting the key received pass through according to the mask signal received.

The controller is characterized by outputting a DATA TRANSFER signal that is a data transfer signal as the transfer signal for transferring the data received.

Then, at least one of the data converter unit (FL) and the data inverter unit ($FL^1$) is characterized by transferring the data, upon receipt of the DATA TRANSFER signal outputted from the controller, by nullifying the key received and letting the data received pass through according to the DATA TRANSFER signal received.

The sub converter is characterized by including a ½ sub converter unit implementing data conversion for linear data conversion and data inversion for data conversion that is inverse to the linear data conversion on a shared circuit, and the sub converter is characterized by converting the data by use of the ½ sub converter unit, receiving the transfer signal outputted by the controller in a case where the controller outputs the transfer signal, and transferring at least one of the key and the data according to the transfer signal received.

The sub converter is characterized by including a data converter unit (FL) performing linear data conversion and a data inverter unit ($FL^{-1}$) performing data conversion that is inverse to that of the data converter unit (FL), the data converter unit (FL) and the data inverter unit ($FL^{-1}$) being arranged in series.

Then, one of the data converter unit (FL) and the data inverter unit ($FL^{-1}$) is characterized by receiving one of the data converted by an other of the data converter unit (FL) and the data inverter unit ($FL^{-1}$), the key transferred, and the data transferred, and performing one of data conversion, key transfer, and data transfer by use of the one of the data converted, the key transferred, and the data transferred that is received.

The data conversion apparatus is characterized by receiving one of a 128-bit key, a 192-bit key, and a 256-bit key, and converts the data received using the keys received.

A data conversion method according to this invention is a data conversion method for receiving a key and data and performing data conversion for at least one of data encryption and data decryption of the data received using the key received.

Then, the data conversion method is characterized by:

outputting a transfer signal indicating one of the key received and the data received to be transferred in a case of transferring the one of the key received and the data received, and performing the data conversion for the one of data encryption and data decryption by converting the data received using the key received, and transferring at least one of the key received and the data received without the data conversion upon receipt of the transfer signal outputted.

A data conversion program according to this invention is a data conversion program for receiving a key and data, and performing data conversion for at least one of data encryption and data decryption of the data received using the key received.

Then, the data conversion program is characterized by making a computer execute the processes of:

outputting a transfer signal indicating one of the key received and the data received to be transferred in a case of transferring the one of the key received and the data received, and performing the data conversion for the one of data encryption and data decryption by converting the data received using the key received, and transferring at least one of the key received and the data received without the data conversion in a case of receiving the transfer signal outputted.

A computer readable storage medium having a data conversion program according to this invention is a computer readable storage medium recording having a data conversion program for receiving a key and data, and performing data conversion for at least one of data encryption and data decryption of the data received using the key received.

Then, the data conversion program is characterized by making a computer execute processes of:

outputting a transfer signal indicating one of the key received and the data received to be transferred in a case of transferring the one of the key received and the data received, and performing the data conversion for the one of data encryption and data decryption by converting the data received using the key received, and transferring at least one of the key received and the data received without the data conversion in a case of receiving the transfer signal outputted.

The data conversion apparatus is characterized by further includes a key generator for generating a key.

Then, the key generator is characterized by further including, an intermediate key generator receiving a secret key, generating an intermediate key based on the secret key received and generating an output key based on the intermediate key generated using the main converter and the sub converter.

The intermediate key generator is characterized by including a 6-1 KL selector receiving six keys, and selecting one key from among the six keys received, a key KL register holding the one key selected by the 6-1 KL selector as the intermediate key, a 6-1 KA selector selecting one key from among six keys, and a key KA register holding the one key selected by the 6-1 KA selector as the output key.

Then, the 6-1 KL selector is characterized by receiving a secret key, receiving six keys including the secret key, the intermediate key held in the key KL register, and four keys obtained through rotation shifts of the intermediate key held in the key KL register by four different numbers, and selecting one key from among the six keys received.

Then, the key KL register is characterized by holding a key selected by the 6-1 KL selector, as an intermediate key.

Then, the 6-1 KA selector is characterized by receiving an output key generated by using the main converter and the sub converter, receiving six keys including the output key received, the output key held in the key KA register, and four keys obtained through rotation shifts of the output key held in the key KA register by four different numbers, and selecting one key from among the six keys received.

Then, the key KA register is characterized by holding the one key selected by the 6-1 KA selector as an output key.

The intermediate key generator is characterized by including a 2-1 selector selecting one key from among two keys, a 4-1 selector selecting one key from among four keys, a 3-1 KL selector selecting one key from among three keys, a key KL register holding the one key selected by the 3-1 KL selector as an intermediate key, a 3-1 KA selector selecting one key from among three keys, and a key KA register holding the one key selected by the 3-1 KA selector as an output key.

Then, the 2-1 selector is characterized by selecting one key from among the intermediate key held in the key KL register and the output key held in the key KA register.

Then, the 4-1 selector is characterized by receiving four keys obtained through rotation shifts of the one key selected by the 2-1 selector by four different numbers, and selecting one key from among the four keys received.

Then, the 3-1 KL selector is characterized by receiving a secret key, receiving three keys including the secret key, the one key selected by the 4-1 selector, and the intermediate key held in the key KL register, and selecting one key from among the three keys.

Then, the key KL register is characterized by holding the one key selected by the 3-1 KL selector as an intermediate key.

Then, the 3-1 KA selector is characterized by receiving an output key generated by using the main converter and the sub converter, receiving three keys including the output key received, the one key selected by the 4-1 selector, and the output key held in the key KA register, and selecting one key from among the three keys.

Then, the key KA register is characterized by holding one key selected by the 3-1 KA selector as an output key.

The intermediate key generator is characterized by including a 2-1 KL selector selecting one key from among two keys, a key KL register holding the one key selected by the 2-1 KL selector, a 2-1 KA selector selecting one key from among two keys, a key KA register holding the one key selected by the 2-1 KA selector, a 2-1 selector selecting one key from among two keys, and a 8-1 selector selecting one key from among eight keys.

Then, the 2-1 KL selector is characterized by receiving a secret key, and selects one key from among the secret key received and the key held in the key KL register.

Then, the 2-1 KA selector is characterized by receiving an output key generated by using the main converter and the sub converter, and selecting one key from among the output key received and the key held in the key KA register.

Then, the 2-1 selector is characterized by selecting one key from among two keys selected by the 2-1 KL selector and the 2-1 KA selector.

Then, the 8-1 selector is characterized by receiving eight keys obtained through rotation shifts of the one key selected by the 2-1 selector by different eight numbers, and selecting one key from among the eight keys received.

A data conversion apparatus according to this invention is a data conversion apparatus that is provided with a data scrambler for converting data.

Then, the data scrambler is characterized by including a main converter for receiving data and performing nonlinear data conversion of the data received, and a sub converter for receiving data and performing linear data conversion of the data received, the main converter and the sub converter being arranged in parallel.

The main converter, receiving a key and data, is characterized by performing the nonlinear data conversion of the data received using the key received based on an F function that is a function used for the nonlinear data conversion, and outputting data processed through the nonlinear data conversion.

Then, the sub converter, receiving a key and data, is characterized by performing the linear data conversion of the data received using the key received, and outputting data processed through the linear data conversion.

Then, the main converter and the sub converter are characterized by repeating the data conversion by the main converter and the data conversion by the sub converter, and performing data conversion for at least one of data encryption and data decryption.

The main converter is characterized by including an F function unit that repeats performing the nonlinear data conversion of the data received based on the F function using the key received and outputting the data converted more than once.

The F function unit is characterized by repeating the nonlinear data conversion based on the F function more than once in such a manner as to complete the nonlinear data conversion based on the F function for one round by repeating $2^x$ times performing the nonlinear data conversions of the data received based on $\frac{1}{2}^x$ F function ($X \geq 0$) using the key received and outputting the data converted, and as to repeat outputting the data of which the nonlinear data conversion is completed more than once.

The F function unit is characterized by receiving one of upper data and lower data divided, performing the nonlinear data conversion of the one of upper data and lower data received, outputting one of the upper data and the lower data converted, XORing one of the upper data and the lower data outputted with an other of the upper data and the lower data, swapping XORed data and the other of the upper data and the lower data that was not received by the F function unit, and outputting swapped data.

The data conversion apparatus is characterized by further including a key generator for generating a key.

Then, the key generator is characterized by including an intermediate key generator, receiving a secret key, is characterized by generating an intermediate key based on the secret key received, and generating an output key based on the intermediate key using the main converter and the sub converter.

The key generator is characterized by further including a key scheduler receiving the intermediate key generated by the intermediate key generator, the output key and a predetermined constant, and scheduling a key to be used by the main converter and the sub converter for the data conversion, based on the intermediate key received, the output key received and the predetermined constant received according to a predetermined condition.

Then, the main converter and the sub converter each are characterized by receiving the key scheduled by the key scheduler, and performing the data conversion of the data respectively received based on the key respectively received.

The intermediate key generator is characterized by including a 6-1 KL selector receiving six keys, and selecting one key from among the six keys received, a key KL register holding the one key selected by the 6-1 KL selector as the intermediate key, a 6-1 KA selector selecting one key from among six keys, and a key KA register holding the one key selected by the 6-1 KA selector as the output key.

Then, the 6-1 KL selector is characterized by receiving a secret key, receiving six keys including the secret key, the intermediate key held in the key KL register, and four keys obtained through rotation shifts of the intermediate key held in the key KL register by four different numbers, and selecting one key from among the six keys received.

Then, the key KL register is characterized by holding a key selected by the 6-1 KL selector, as an intermediate key.

Then, the 6-1 KA selector is characterized by receiving an output key generated by using the main converter and the sub converter, receiving six keys including the output key received, the output key held in the key KA register, and four keys obtained through rotation shifts of the output key held in the key KA register by four different numbers, and selecting one key from among the six keys received.

Then, the key KA register is characterized by holding the one key selected by the 6-1 KA selector as an output key.

The intermediate key generator is characterized by including a 2-1 selector selecting one key from among two keys, a 4-1 selector selecting one key from among four keys, a 3-1 KL selector selecting one key from among three keys, a key KL register holding the one key selected by the 3-1 KL selector as an intermediate key, a 3-1 KA selector selecting one key from among three keys, and a key KA register holding the one key selected by the 3-1 KA selector as an output key.

Then, the 2-1 selector is characterized by selecting one key from among the intermediate key held in the key KL register and the output key held in the key KA register.

Then, the 4-1 selector is characterized by receiving four keys obtained through rotation shifts of the one key selected by the 2-1 selector by four different numbers, and selecting one key from among the four keys received.

Then, the 3-1 KL selector is characterized by receiving a secret key, receiving three keys including the secret key, the one key selected by the 4-1 selector, and the intermediate key held in the key KL register, and selecting one key from among the three keys.

Then, the key KL register is characterized by holding the one key selected by the 3-1 KL selector as an intermediate key.

Then, the 3-1 KA selector is characterized by receiving an output key generated by using the main converter and the sub converter, receiving three keys including the output key received, the one key selected by the 4-1 selector, and the output key held in the key KA register, and selecting one key from among the three keys.

Then, the key KA register is characterized by holding one key selected by the 3-1 KA selector as an output key.

The intermediate key generator is characterized by including a 2-1 KL selector selecting one key from among two keys, a key KL register holding the one key selected by the 2-1 KL selector, a 2-1 KA selector selecting one key from among two keys, a key KA register holding the one key selected by the 2-1 KA selector, a 2-1 selector selecting one key from among two keys, and a 8-1 selector selecting one key from among eight keys.

Then, the 2-1 KL selector is characterized by receiving a secret key, and selecting one key from among the secret key received and the key held in the key KL register.

Then, the 2-1 KA selector is characterized by receiving an output key generated by using the main converter and the sub converter, and selecting one key from among the output key received and the key held in the key KA register.

Then, the 2-1 selector is characterized by selecting one key from among two keys selected by the 2-1 KL selector and the 2-1 KA selector.

Then, the 8-1 selector is characterized by receiving eight keys obtained through rotation shifts of the one key selected by the 2-1 selector by different eight numbers, and selecting one key from among the eight keys received.

The sub converter is characterized by including at least one of a data converter unit (FL) performing linear data conversion, and a data inverter unit ($FL^{-1}$) performing data conversion that is inverse to that of the data converter unit (FL), and performing the data conversion by at least one of the data converter unit (FL) and the data inverter unit ($FL^{-1}$).

The sub converter is characterized by including a ½ sub converter unit implementing data conversion for linear data conversion and data inversion for data conversion that is inverse to the data conversion on a shared circuit on a shared circuit, and converting the data by use of the ½ sub converter unit.

The data conversion apparatus is characterized by receiving one of a 128-bit key, a 192-bit key and a 256-bit key, and performing data conversion for one of data encryption and data decryption of the data received using the key received.

A data conversion method according to this invention is characterized by:

performing a nonlinear data conversion of data received and outputting data processed through the nonlinear data conversion, by using a main converter arranged in parallel to a sub converter performing a linear data conversion, which receives a key and data, and performs the nonlinear data conversion using the key received based on an F function that is a function used for the nonlinear data conversion, and performing data conversion of data received using a key received for at least one of data encryption and data decryption, by repeating processes of receiving a key and data, of performing a linear data conversion of the data received using the key received by the sub converter arranged in parallel to the main converter, and of outputting the data processed through the linear data conversion.

A data conversion program according to this invention is characterized by making a computer execute the processes of:

performing a nonlinear data conversion of data received and outputting data processed through the nonlinear data conversion, by using a main converter arranged in parallel to a sub converter performing a linear data conversion, which receives a key and data, and performs the nonlinear data conversion using the key received based on an F function that is a function used for the nonlinear data conversion, and performing data conversion of data received using a key received for at least one of data encryption and data decryption, by repeating processes of receiving a key and data, of performing a linear data conversion of the data received using the key received by the sub converter arranged in parallel to the main converter, and of outputting the data processed through the linear data conversion.

A computer readable storage medium having a data conversion program according to this invention is characterized by a computer readable storage medium having a data conversion program for making a computer execute the processes of:

performing a nonlinear data conversion of data received and outputting data processed through the nonlinear data conversion, by using a main converter arranged in parallel to a sub converter performing a linear data conversion, which receives a key and data, and performs the nonlinear data conversion using the key received based on an F function that is a function used for the nonlinear data conversion, and performing data conversion of data received using a key received for at least one of data encryption and data decryption, by repeating processes of receiving a key and data, of performing a linear data conversion of the data received using the key received by the sub converter arranged in parallel to the main converter, and of outputting the data processed through the linear data conversion.

BEST MODE FOR CARRYING OUT THE INVENTION

EMBODIMENT 1

A description will be given of a data conversion apparatus according to this embodiment.

Data Conversion Apparatus

Figure 1:
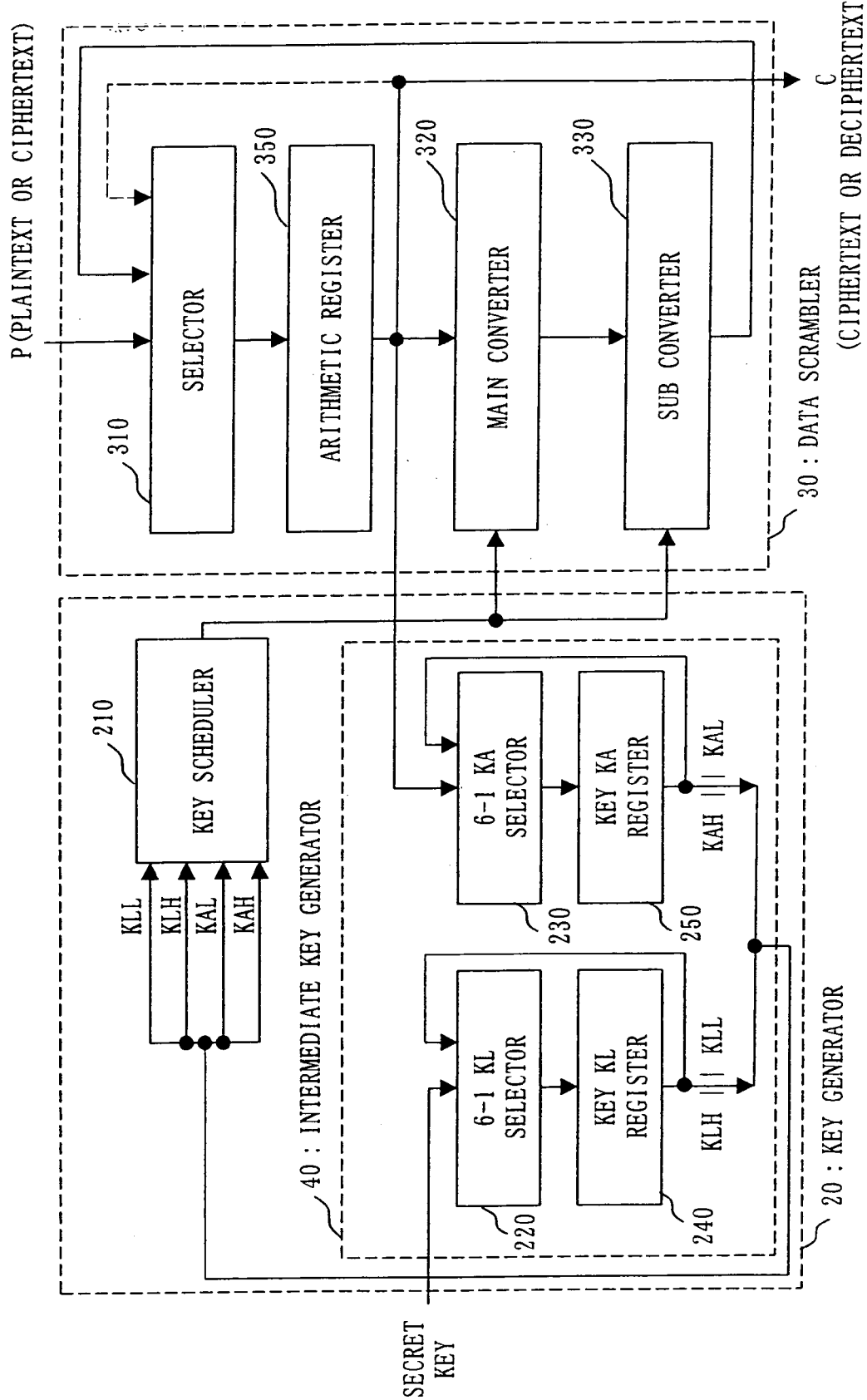
FIG. 1 is a diagram illustrating a configuration of a data conversion apparatus according to a first embodiment.

FIG. 1 is a diagram illustrating a configuration and operation of a data conversion apparatus according to this embodiment.

Figure 56:
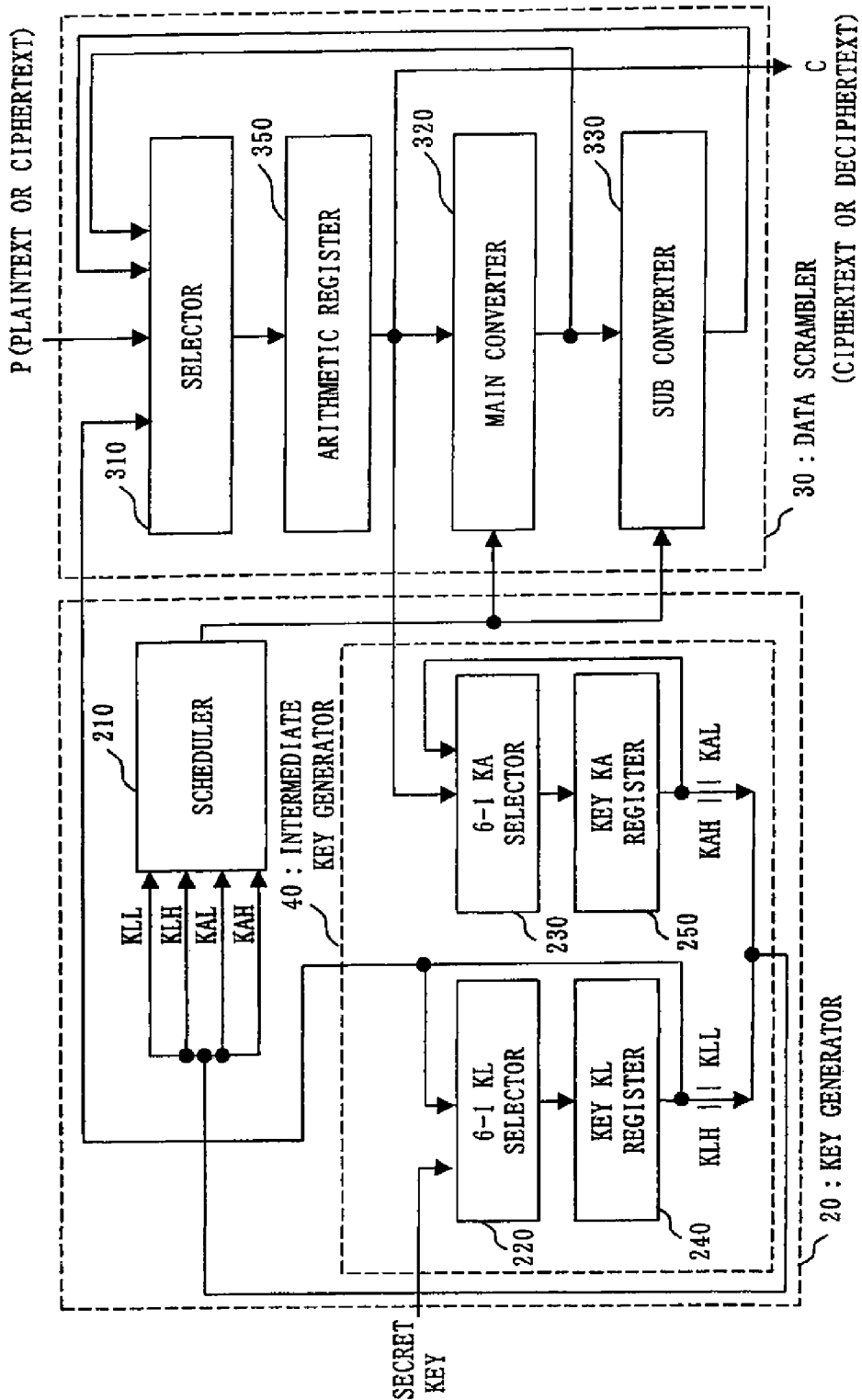
FIG. 56 is a diagram illustrating the configuration and operation of a related data conversion apparatus.
Figure 60:
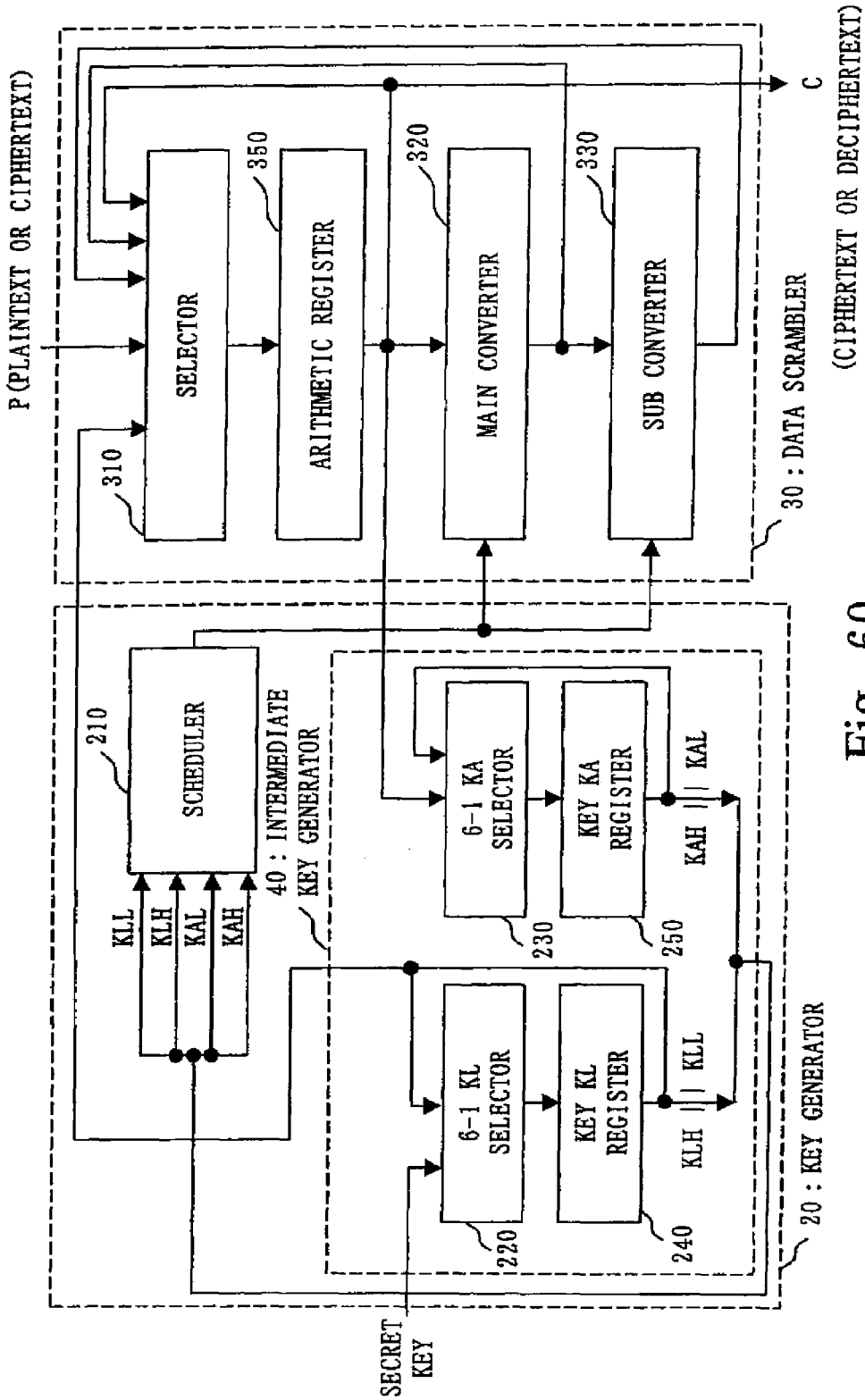
FIG. 60 shows another example of the configuration and operation of the related data conversion apparatus.

This embodiment does not include the "path to input the intermediate key (Key KL) that is outputted from the key KL register 240 into the selector 310" nor does it include the "path to input data that is outputted from the main converter 320 into the selector 310", the paths being shown in FIG. 56 and FIG. 60. The reason is that a sub converter 330 of this embodiment is provided with an extra key/data transfer function in addition to its primary and original function to convert data.

A description will be given below of key generation and data encryption/decryption by use of the key/data transfer function of the sub converter 330. Other components and operations are the same as those discussed with reference to FIG. 56 and FIG. 60, and therefore will not be discussed here.

With this embodiment, the intermediate key (Key KL) outputted from the key KL register 240 is not directly inputted to the selector 310 but inputted to the sub converter 330 via the key scheduler 210 by way of the conventional path from the key KL register 240 to the key scheduler 210. The sub converter 330, provided with a "data conversion mode" and a "key/data transfer mode", switches to the "key/data transfer mode" upon receipt of a key, and transfers the input key to the selector 310.

Further, according to this embodiment, data that is nonlinear converted by the main converter 320 is not directly inputted to the selector 310 but inputted to the sub converter 330 first. The sub converter 330, upon receipt of the data nonlinear converted by the main converter 320, switches to the "key/data transfer mode", and transfers the input data to the selector 310.

The transfer operations thus carried out by the sub converter 330 allow making the two paths shown in FIG. 56 and FIG. 60 redundant.

Note that a dotted line shown in FIG. 1 indicates a "path to transfer the intermediate data from the arithmetic register 350 to the selector 310", which is required for inputting into the main converter 320 the intermediate data held for a given period of time, in the case where the main converter 320 performs an F function based data conversion for one round in two or more cycles, as aforementioned. On the other hand, the "path from the arithmetic register 350 to the selector 310" indicated by the dotted line is not required in the case where the main converter 320 performs an F function based data conversion for one round in one cycle. The same applies to a path indicated by a dotted line shown in FIG. 6 in a later discussion.

Key Generation Method

A description will now be given of an intermediate key and output key generation method of the intermediate key generator 40.

Figure 2:
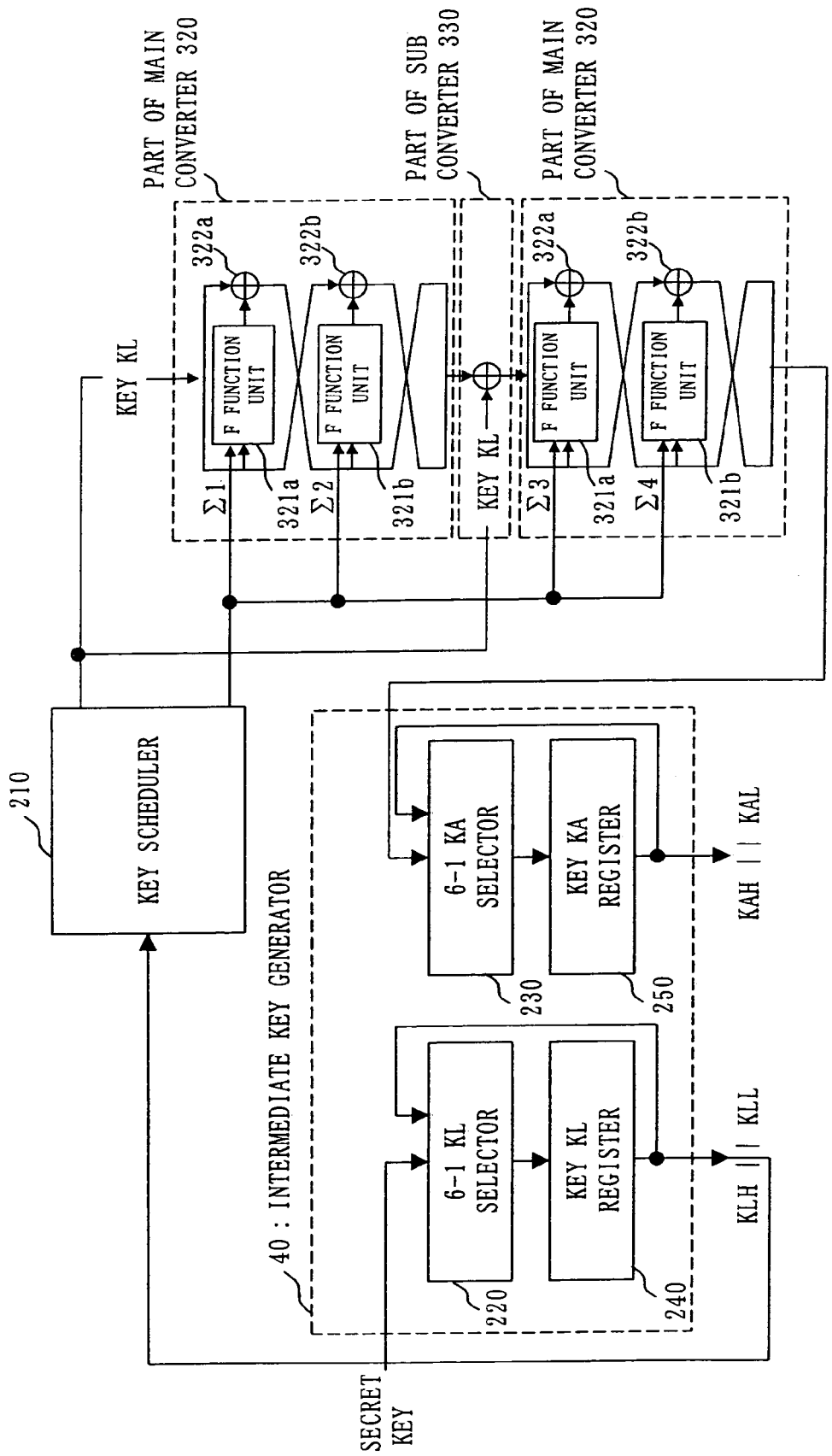
FIG. 2 is a diagram illustrating an operation of an intermediate key generator 40 generating an output key from an intermediate key with a 128-bit key.

FIG. 2 illustrates an operation of the intermediate key generator 40 for generating an output key from an intermediate key.

First, a secret key is inputted to the intermediate key generator 40, and held in the key KL register 240 as the intermediate key (Key KL) by way of the 6-1 KL selector 220. The secret key held in the key KL register 240 is inputted to the main converter 320 as the intermediate key (Key KL) by way of the key scheduler 210. In the first F function unit 321a of the main converter 320, the upper bits of the intermediate key (Key KL) inputted are nonlinear converted by use of a constant $\Sigma 1$ that is outputted from the key scheduler 210, then XORed with the lower bits of the intermediate key (Key KL) at the EXOR circuit 322a, and then inputted to the F function unit 321b. Likewise, in the F function unit 321b, a key outputted from the EXOR circuit 322a is nonlinear converted by use of a constant $\Sigma 2$ that is outputted from the key scheduler 210, and then XORed with the lower bits of the intermediate key (Key KL) at the EXOR circuit 322b. Then, the resultant output key as the upper bits of the key and the key outputted from the EXOR circuit 322a as the lower bits of the key are outputted to the sub converter 330.

The sub converter 330 receives these pieces of data, and XORs between the upper bits and the lower bits of the key by means of two exclusive OR operators (EXORs) included in the data converter unit 50 and two exclusive OR operators (EXORs) included in the data inverter unit 70 within the sub converter 330. Then, the resultant output data is inputted to the main converter 320 again.

The main converter 320 performs the process of two-stage conversion involving the F function unit 321a, the EXOR circuit 322a, the F function unit 321b and the EXOR circuit 322b in the main converter 320, in the same manner as that of the aforementioned process by use of the part of the main converter 320, then swaps the upper bits and the lower bits of the converted key, and outputs the swapped.

The output data is inputted to the 6-1 KA selector 230 of the intermediate key generator 40, and held in the Key KA register 250 as the output key (Key KA). The intermediate key generator 40 thus generates the output key (Key KA) from the intermediate key (Key KL) using part of the main converter 320 and part of the sub converter 330 as components executing data encryption/decryption. Four keys, including the key KLH of the upper bits and the key KLL of the lower bits of the intermediate key (Key KL) generated, and the key KAH of the upper bits and the key KAL of the lower bits of the output key (Key KA) generated, are inputted to the key scheduler 210 and used as a key for data encryption/decryption (called an extended key). Then, the thus generated output key (Key KA) and intermediate key (Key KL) are used to generate another intermediate key and another output key in each given period by the same process.

Key Scheduling

A description will now be given of an internal configuration and an operation of the key scheduler 210.

Figure 3:
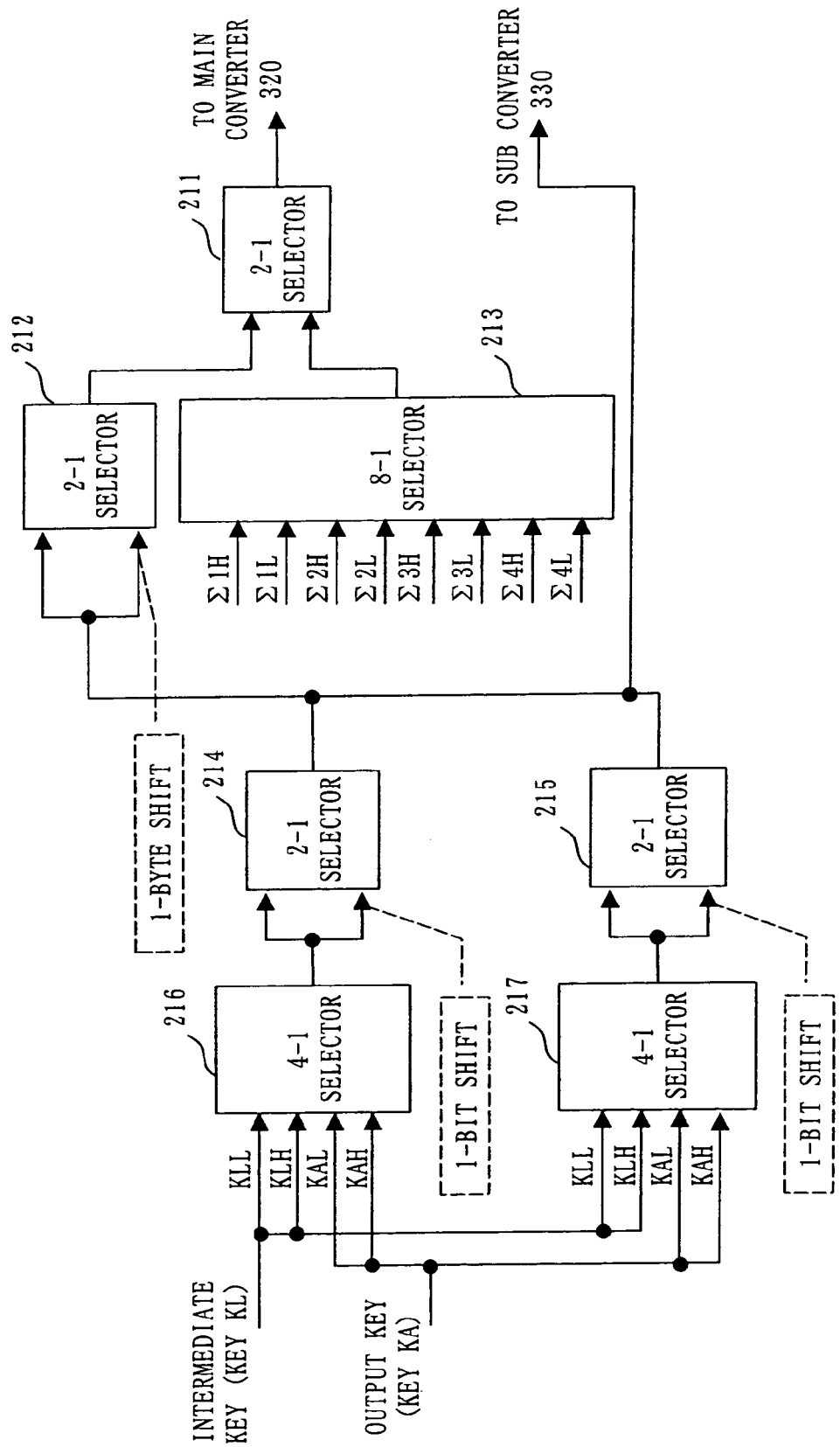
FIG. 3 is a diagram illustrating an internal configuration and operation of a key scheduler 210.

FIG. 3 is a diagram illustrating an internal configuration and an operation of the key scheduler 210.

The intermediate key (Key KL) outputted from the intermediate key generator 40 is divided into the Key KLH of upper bits, and the Key KLL of lower bits, and inputted to a 4-1 selector 216 and a 4-1 selector 217. The output key (Key KA) outputted from the intermediate key generator 40 is also divided into the Key KAH and the Key KAL, and inputted to the 4-1 selector 216 and the 4-1 selector 217 likewise. The 4-1 selector 216 and the 4-1 selector 217 select one key from among the four keys. Then, a signal selected by the 4-1 selector 216, 217 and a signal obtained through a one-bit right rotation shift of the selected signal are inputted to a 2-1 selector 214, 215, respectively. The reason why the signal is subject to the one-bit right rotation is as follows. As discussed earlier, the sub converter 330 is used in generating the output key (Key KA) by the intermediate key generator 40. In that event, the signal is subject to a one-bit rotation shift to the left by a rotation shifter in the sub converter 330. Therefore, assuming that the signal will be subject to a one-bit rotation shift to the left, the signal is subject to a one-bit rotation shift to the right in advance so that there is no effect of the rotation shift on the outcome. Accordingly, the key scheduler 210 does not always perform the one-bit right rotation shift. It depends on the number of bits and the direction of a rotation shift that the rotation shifter of the sub converter 320 will make for a signal. In other words, the key scheduler 210 is to make an advance rotation shift for the signal by the same number of bits as that in the direction opposite to that of a rotation shift that will be made for the signal by the rotation shifter of the sub converter 330. Therefore, the 2-1 selector 214 and the 2-1 selector 215, which are to select a signal relating to a key out of these two signals, always select a key obtained through the advance rotation shift by a predetermined number of bits, and outputs the key to the sub converter 330, when outputting a key to the sub converter 330 for generating the output key (Key KA).

Keys outputted from the 2-1 selector 214 and the 2-1 selector 215 are inputted to the sub converter 330 in the case where the sub converter 330 is used in generating the output key (Key KA), and inputted to a 2-1 selector 212 in the case where the main converter 320 is used in generating the output key (Key KA) and in the process of encrypting/decrypting data. Then, a key subjected to a one-byte left or right rotation shift is inputted to the 2-1 selector 212. The reason why the key subjected to the one-byte left or right rotation shift key is inputted to the 2-1 selector 212 is that the process of data encryption/data decryption requires that key in the case where the F function unit is made up of parts processing the F function of less than one such as ½, ¼ and ⅛, which will be discussed later in detail.

The 212 selects one key out of these two keys, and inputs a selected key to a 2-1 selector 211. A 8-1 selector 213 receives constants Σ1 through Σ4 divided into upper data and lower data, selects one signal out of these eight input signals, and inputs a selected signal to the 2-1 selector 211. The 2-1 selector 211 selects one signal out of the two input signals, and outputs a select signal to the main converter 320 as a key.

Data Encryption/Decryption

A description will now be given of data encryption/decryption performed by the data scrambler 30.

Figure 4:
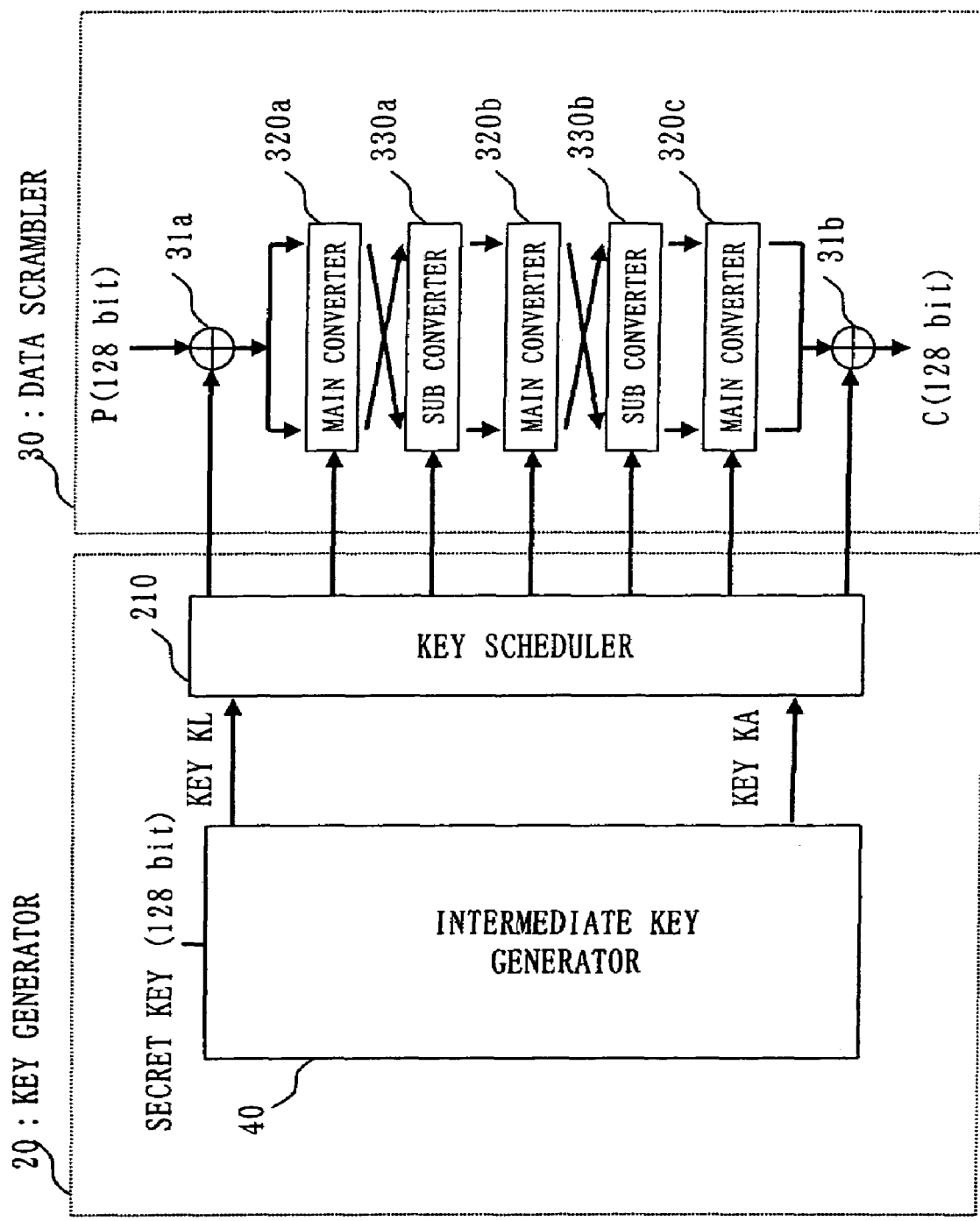
FIG. 4 is a diagram illustrating an operation of a data scrambler 30 for encryption/decryption.

FIG. 4 is a diagram illustrating an operation of the data scrambler 30 for encryption/decryption.

First, P (plaintext or ciphertext) is inputted. It is assumed here that P (plaintext or ciphertext) is 128 bits long. The input data, P, is inputted to an EXOR circuit 31a and XORed with a secret key (128 bits long) that is inputted to and then outputted from the key generator 20 via the intermediate key generator 40 and the key scheduler 210. Note that the secret key is inputted to the intermediate key generator 40 first, then selected by the 6-1 KL selector 220, then held in the key KL register 240 as the intermediate key (Key KL), and then inputted to the key scheduler 210 as the intermediate key (Key KL).

Figure 58:
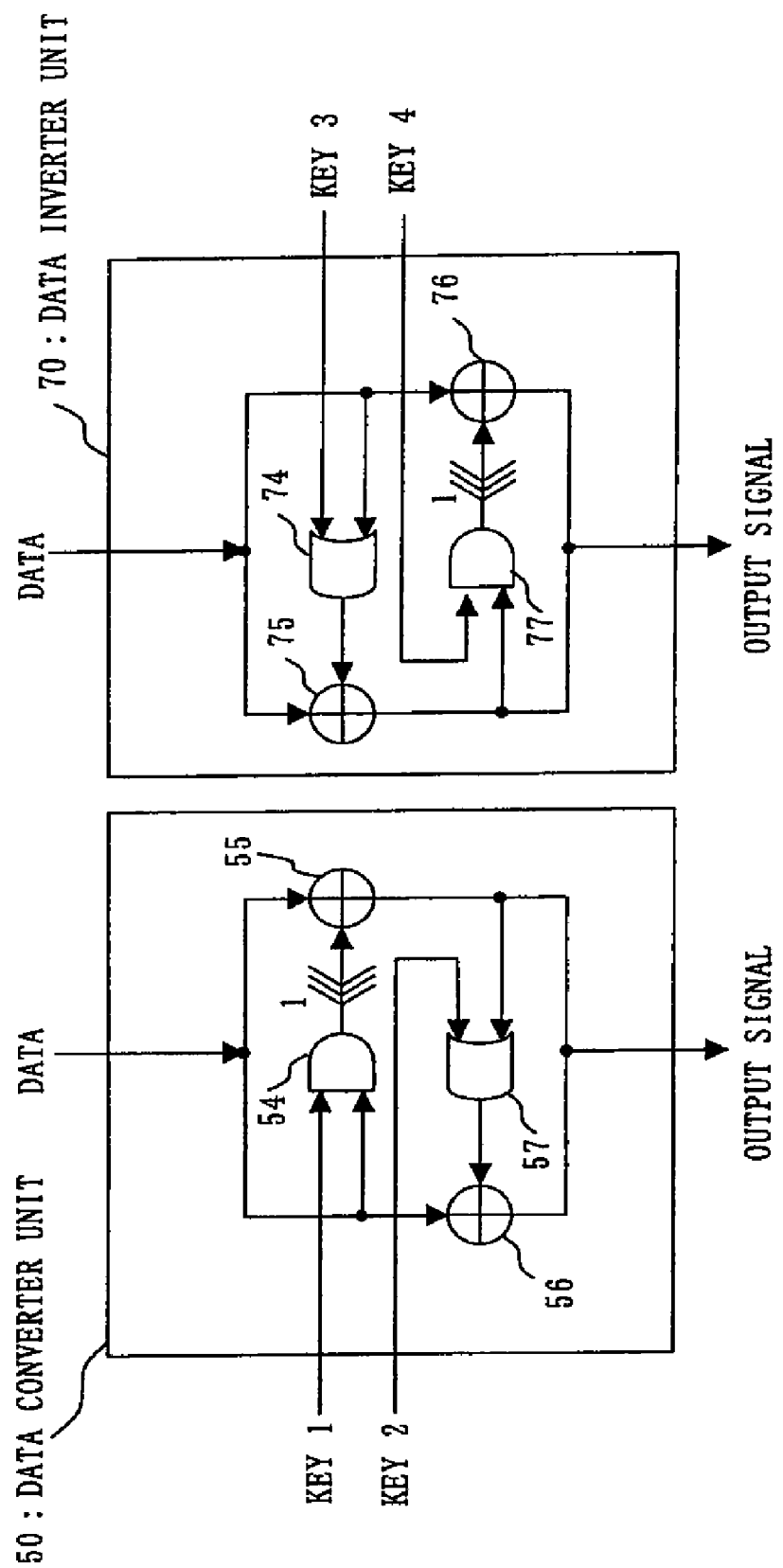
FIG. 58 is a diagram illustrating the circuit that makes up the sub converter 330.

With CAMELLIA (camellia) designed for block cipher process with common key, exclusive OR operators in the sub converter 330 are used for the EXOR circuit 31a and an EXOR circuit 31b. More particularly, as shown in FIG. 58, input data is divided into upper data of upper bits and lower data of the lower bits. Then, each piece of divided data and an input key are XORed at the EXOR circuit 55 and the EXOR circuit 56 of the data converter unit 50 or at the EXOR circuit 75 and the EXOR circuit 76 of the data inverter unit 70, and outputted.

Output data is converted by the main converter 320 and the sub converter 330 by use of one of extended keys outputted from the key scheduler 210. With FIG. 4, data conversion is carried out alternately in the order of: the main converter 320a, a sub converter 330a, a main converter 320b, a sub converter 330b, and a main converter 320c.

The data thus converted is XORed with a key outputted from the key scheduler 210 at the EXOR circuit 31b of the sub converter 330, and outputted as C (ciphertext or deciphertext).

A description will now be given of an operation of data conversion of CAMELLIA performed by the main converter 320 and the sub converter 330 in the data scrambler 30 in detail with reference to FIG. 1 and FIG. 4.

Data outputted from the EXOR circuit 31a is divided into upper data and lower data, and inputted to the main converter 320a respectively. In the main converter 320a, each piece of the input data is nonlinear converted, and upper data and lower data are swapped as shown in FIG. 4 such that converted lower data is treated as upper data and converted upper data is treated as lower data, and then inputted to the sub converter 3301.

In the sub converter 330a, input data is linear converted. As shown in FIG. 1, converted data is inputted to the selector 310, then held in the arithmetic register 350, and then inputted to the main converter 320 (shown as the main converter 320b in FIG. 4).

The main converter 320b and the sub converter 330b perform the same processes as those performed by the main converter 320a and the sub converter 330, respectively. The same process as that performed by the main converter 320a is repeated again in the main converter 320c. Output data from the main converter 320c, which is obtained through the series of repetitions, is XORed with key data outputted from the key scheduler 210 at the EXOR circuit 31b, and then outputted as C. With CAMELLIA, an exclusive logic operator included in the sub converter 330 is used for the 31b like the EXOR circuit 31a. Also, with CAMELLIA, data conversion is carried out by using the same main converter 320 for each of the main converters 320a, 320b, and 320c and by repeating the same process. Alternatively, however, it is also possible that the main converters 320a, 320b, and 320c are made up separately of the same internal configuration. The same applies to the sub converter 330a and the sub converter 330b.

Figure 57:
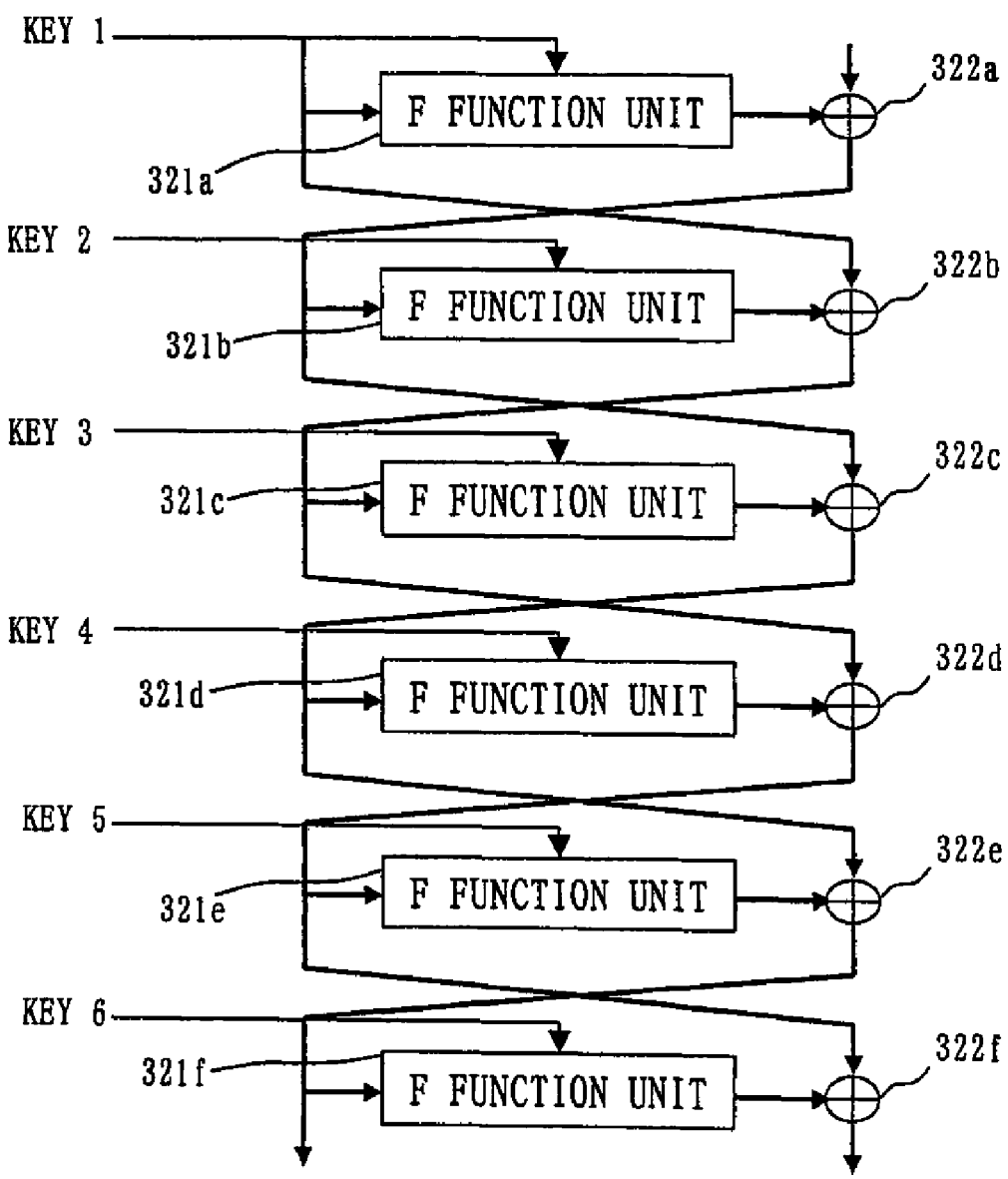
FIG. 57 shows an example of the internal configuration of the main converter 320.

Note here that in the case where the main converter 320 is provided with part for processing the F function for one round and then performs a six-round F function based data conversion as shown in FIG. 57, the process of the main converter 320 is repeated six times, thereby completing the process of the six-round F function based data conversion. This, with reference to FIG. 1, means that the main converter 320 completes the six-round F function based data conversion by repeating the use of the loop path from the main converter 320 through the selector 310, the arithmetic register 350, then back to the main converter 320 six times. Therefore, the related art shown in FIG. 56 and FIG. 60 requires the "path to input data which is outputted from the main converter 320, to the selector 310."

However, according to this embodiment, the sub converter 330 has a transfer function, which will be discussed later, and therefore data outputted from the main converter 320 can be inputted to the selector 310 with being transferred by the sub converter 330. Thus, according to the data conversion apparatus of this embodiment, the use of the "path to input data outputted from the main converter 320 to the selector 310 with being transferred by the sub converter 330" eliminates the necessity of the "path to input data outputted from the main converter 320 to the selector 310".

Main Conversion—Main Converter 320.

The internal configuration and the operation of the main converter 320 have been discussed earlier with reference to FIG. 57 and FIG. 61.

As aforementioned, the structure for nonlinear conversion of the main converter 320 characterized below is called FEISTEL Structure. Specifically, the structure for nonlinear conversion includes dividing input data into upper data of the upper bits and lower data of the lower bits, nonlinear converting one of the divided upper data and lower data using the F function, generating data to be inputted to the F function based on one of the upper data and the lower data nonlinear converted and the other of the upper data and the lower data, dividing generated data as the input data into upper data and lower data, and converting again using the F function and repeating the aforementioned processes.

Main Conversion—Main Converter 320—F Function Unit 321.

A description will now be given of an internal configuration and an operation of the F function unit 321 included in the main converter 320.

Figure 5:
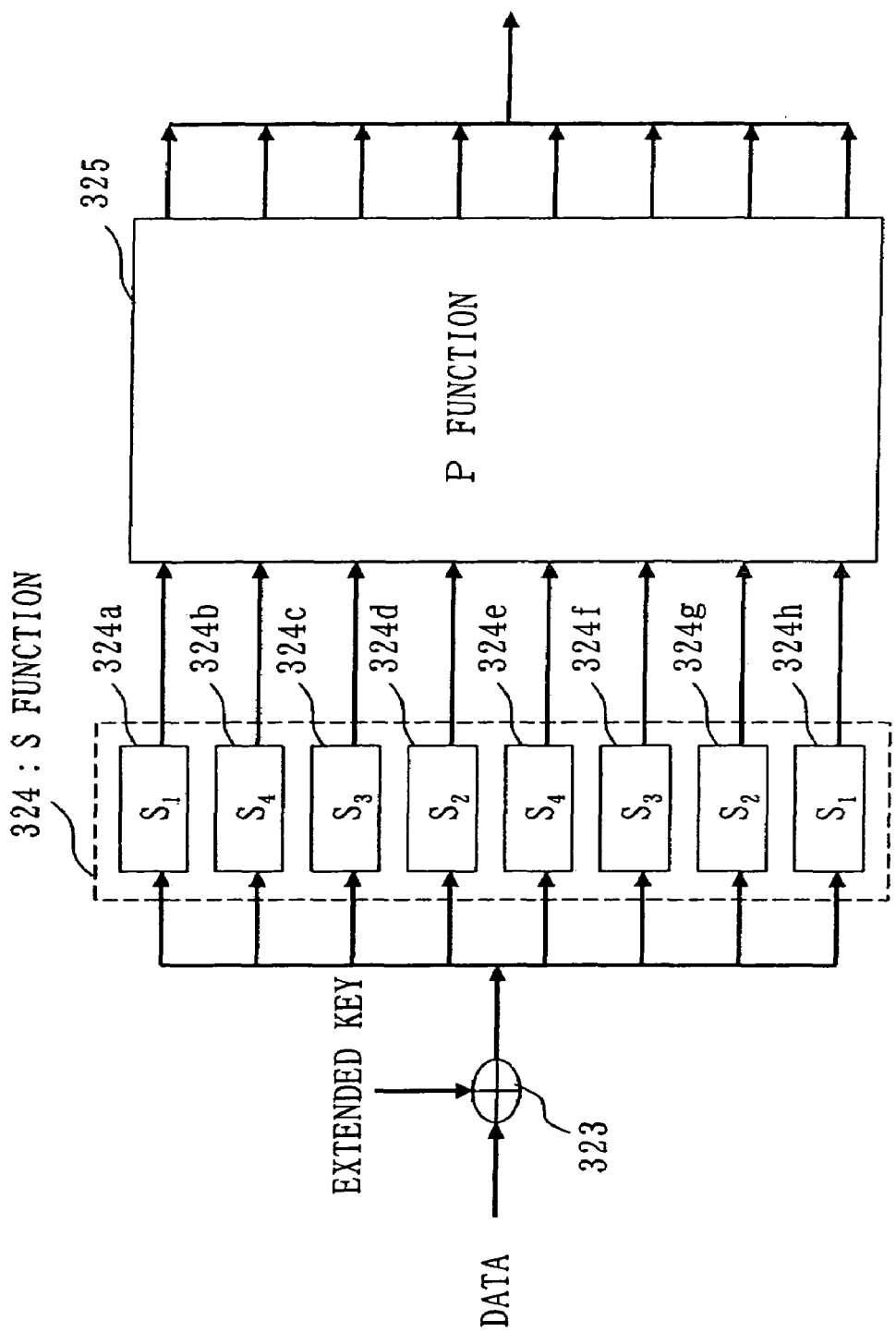
FIG. 5 is a diagram illustrating an internal configuration and operation of an F function unit 321.

FIG. 5 is a diagram illustrating an internal configuration and an operation of an F function unit 321.

Firstly, input data is XORed with an extended key at an EXOR circuit 323, then divided into eight pieces, and inputted to an S function 324. The extended key is defined as a combined key of the output key (Key KA) and the intermediate key (Key KL), which are generated from the secret key by the intermediate key generator 40. With CAMELLIA of a 128-bit long secret key, the extended key is 256 bits long. The intermediate key (Key KL) is divided into a key KLH of the upper bits and a key KLL of the lower bits, and the output key (Key KA) is also divided into a key KAH of the upper bits and a key KAL of the lower bits. Then, one key scheduled by the key scheduler 210 out of those four keys is inputted to the EXOR circuit 323. The S function 324 is a synthesized function ($S_1$ through $S_4$) of an inverse arithmetic operation of GAF ($2^8$) and an affine conversion, and performs a bytewise nonlinear conversion. Converted and then outputted data is inputted to a P function 325, then scrambled by the P function 325 performing a linear conversion and then outputted.

A description will now be given of an operation in a case that an F function unit is made up of a part processing for ½ of the F function (½ F function).

The part processing for ½ of the F function in the F function unit is made up of the EXOR circuit 323, four S-boxes $S_4$ 324e through $S_1$ 324h, and approximately half of the P function unit of FIG. 5. With this configuration, a ½ of F function based data conversion for one round is performed first. Then, the same process is repeated to complete the F function process for one round. In the first process, a key and data that are subjected to the one-byte left or right rotation shift discussed earlier in the key scheduler 210 are used. The one-byte left or right rotation shift of the key and data can effect the same as that of shifting an S-box by one byte without changing the arrangement of the S-boxes $S_1$ through $S_4$. More specifically, as shown in FIG. 5, the same process can be performed as arranging the S-boxes in the order of $S_2$, $S_3$, $S_4$, $S_1$ indicated by $S_1$ 324a through $S_4$ 324d by inputting a key and data that are subjected to the one-byte rotation shift without changing the arrangement of the S-boxes $S_1$, $S_2$, $S_3$, $S_4$ indicated by $S_4$ 324e through $S_1$ 324h.

Through those operations, the one-round F function process is completed in two cycles.

Data Conversion Apparatus with Main Converter 320 and Sub Converter 330 Arranged in Reverse.

Figure 6:
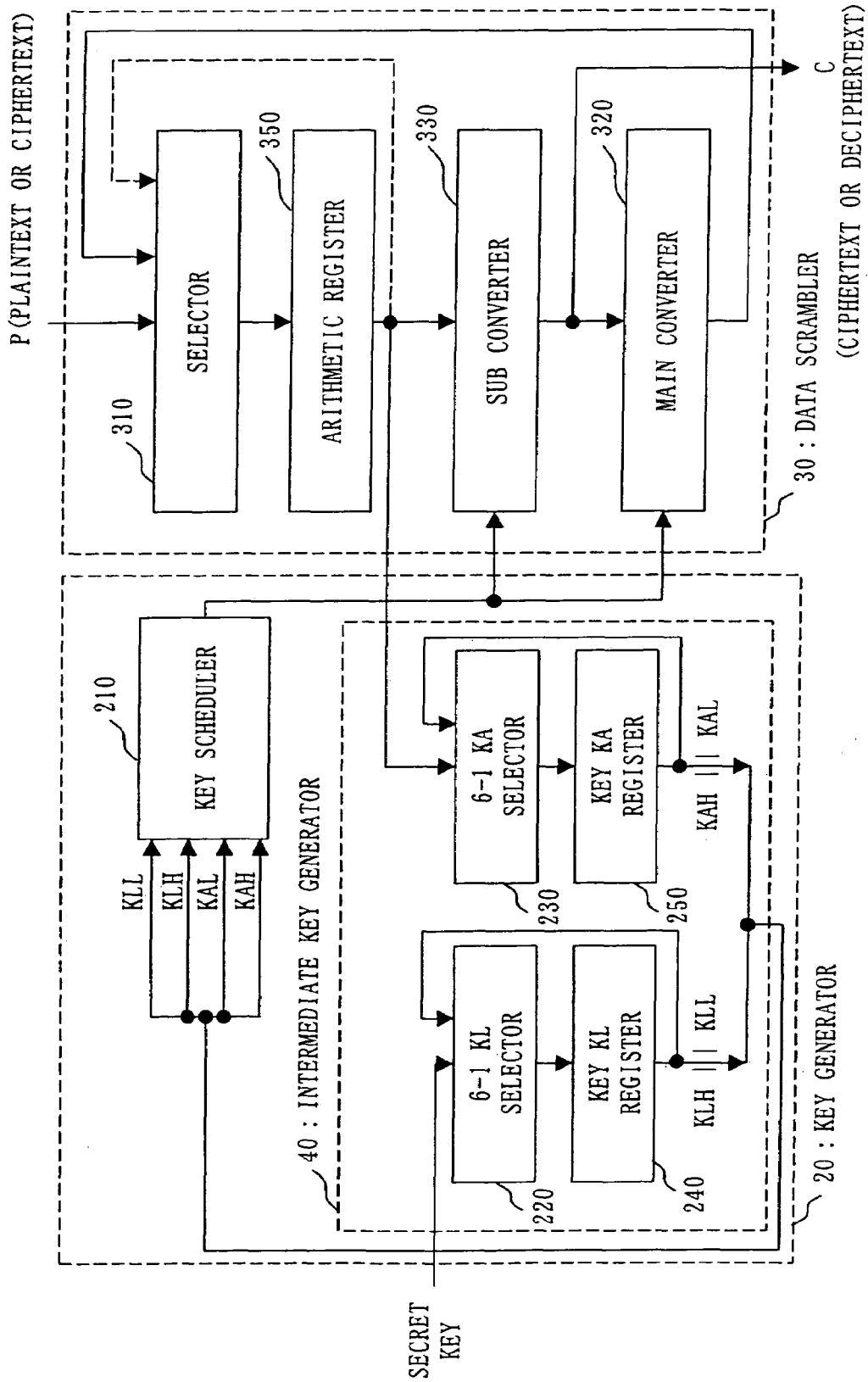
FIG. 6 is a diagram illustrating a configuration of a data conversion apparatus in which a main converter 320 and a sub converter 330 of FIG. 1 are arranged in reverse.

FIG. 6 is a diagram illustrating a configuration and an operation of a data conversion apparatus in which the main converter 320 and the sub converter 330 of FIG. 1 are arranged in reverse.

Even in the case where the data conversion apparatus has the main converter 320 and the sub converter 330 in reverse position, the sub converter 330 uses the transfer function to transfer and output data to the main converter 320, just like the case of the data conversion apparatus shown in FIG. 1. The use of such a path allows the main converter 320 to complete the six-round F function based data conversion. Thus, the "path to input data outputted from the sub converter 330 to the selector 310" is made redundant.

The intermediate key (Key KL) outputted from the key KL register 240 is not directly inputted to the selector 310 but inputted to the sub converter 330 via the key scheduler 210 by use of the path from the key KL register 240 to the key scheduler 210. The sub converter 330, upon receipt of a key, transfers the input key to the main converter 320 using the transfer function.

The transfer operation thus performed by the sub converter 330 allows eliminating the necessity of the two paths of the "path to input the intermediate key (Key KL) outputted from the key KL register 240 to the selector 310" and two paths and the "path to input data outputted from the main converter 320 to the selector 310" or the "path to input data outputted from the sub converter 330 to the selector 310" shown in FIG. 56 and FIG. 60.

Data Conversion Apparatus with Main Converter 320 and Sub Converter 330 arranged in Parallel.

Figure 7:
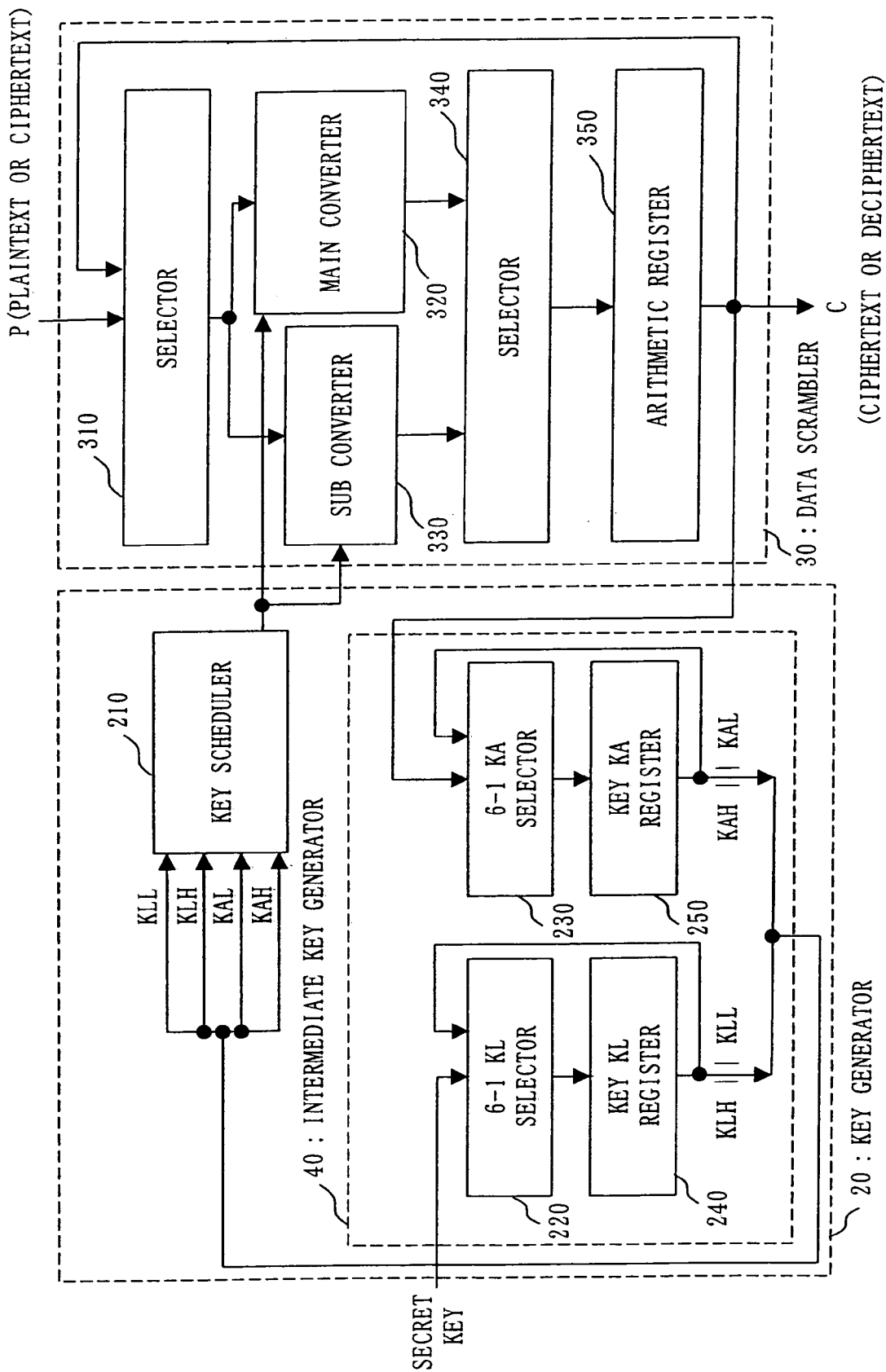
FIG. 7 is a diagram illustrating a configuration of a data conversion apparatus, in which the main converter 320 and the sub converter 330 are arranged in parallel.

FIG. 7 is a diagram illustrating a data conversion apparatus, which is different from those of FIG. 1 and FIG. 6 such that the main converter 320 and the sub converter 330 are disposed in parallel and there is a selector 340 that selects one output signal from among two input signals.

Other elements than the mentioned above are the same as those of FIG. 1 and FIG. 6.

The data conversion apparatus thus configured, having the main converter 320 and the sub converter 330 in a parallel arrangement, requires the selector 340 for selecting one of the signals outputted from the main converter 320 and the sub converter 330. Accordingly, the main converter 320 and the sub converter 330 receives a signal that is selected by the selector 310 from among a signal selected by the selector 340 and passed through the arithmetic register 350 and P (plaintext or ciphertext).

On the other hand, the intermediate key (Key KL) outputted from the key KL register 240 is not directly inputted to the selector 310 at the time of generating the output key (Key KA). The intermediate key (Key KL) is inputted to the sub converter 330 via the key scheduler 210 by way of a path from the key KL register 240 to the key scheduler 210. The sub converter 330, upon receipt of the key, transfers the key received to the main converter 320 by means of the transfer function. Thus, the necessity of the "path to input the intermediate key outputted from the key KL register 240 to the selector 310" can be eliminated.

Furthermore, the necessity of the two paths of the "path to input data outputted from the main converter 320 to the selector 310" or the "path to input data outputted from the sub converter 330 to the selector 310" can also be eliminated.

Internal Configuration of Intermediate Key Generator 40

A description will now be given of an internal configuration of the 6-1 KL selector 220 and the 6-1 KA selector 230 in the intermediate key generator 40.

Figure 8:
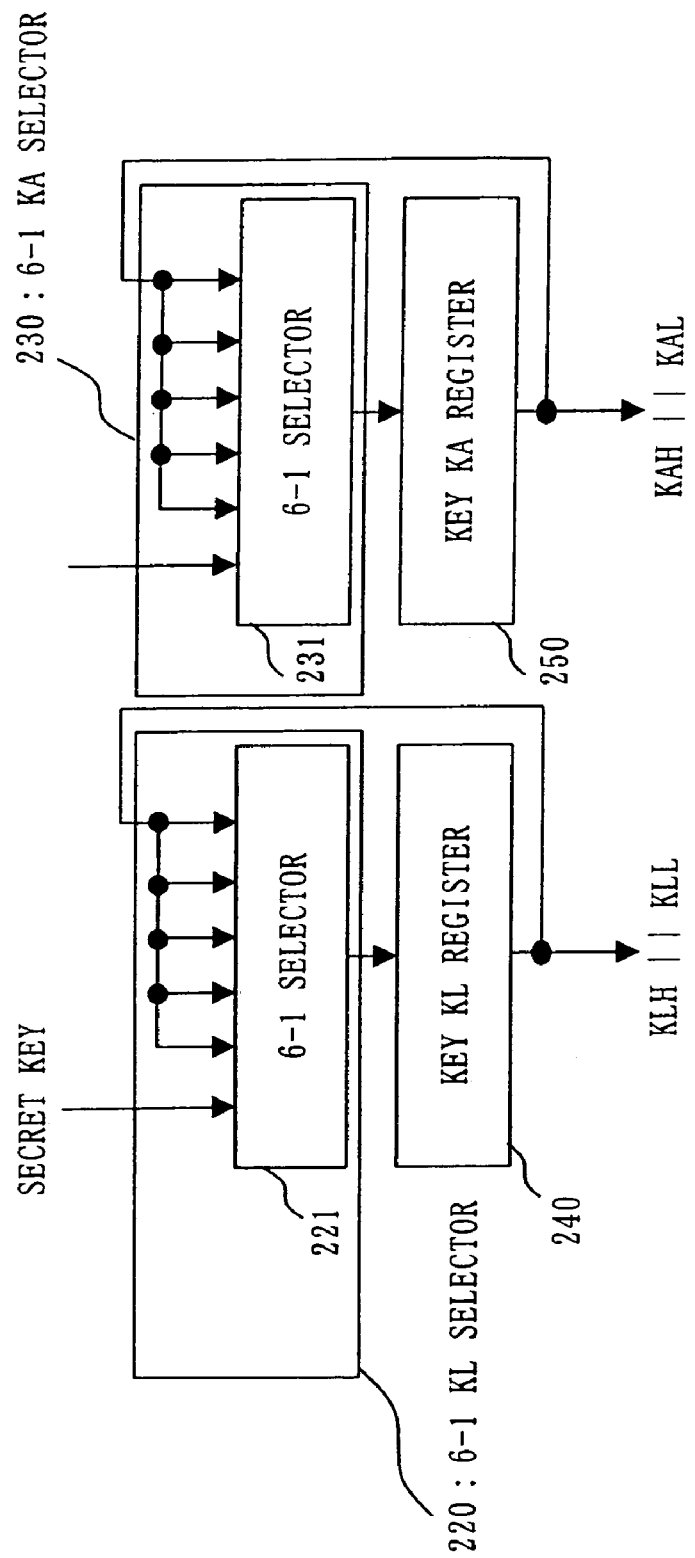
FIG. 8 is a diagram illustrating an internal configuration of a 6-1 KL selector 220 and a 6-1 KA selector 230 in the intermediate key generator 40.

FIG. 8 is a diagram illustrating an internal configuration of the 6-1 KL selector 220 and the 6-1 KA selector 230 in the intermediate key generator 40.

The intermediate key (Key KL) that is held at the key KL register 240 in the intermediate key generator 40 is outputted to the key scheduler 210 and also inputted to the 6-1 KL selector 220 again. The 6-1 KL selector 220 includes a 6-1 selector 221.

In the 6-1 KL selector 220, the intermediate key (Key KL) inputted and also four signals obtained through rotation shifts of the intermediate key (Key KL) by arbitrary four different numbers are inputted to the 6-1 selector 221. The four signals to be inputted thereto may possibly be obtained through the rotation shifts of the intermediate key by 17 and 15 bits to the left and right, respectively, which is not shown in the figure. The six signals of the intermediate key (Key KL), the four signals subjected to rotation shifts, and the secret key are treated as six input signals, the 6-1 selector 221 selects one output signal out of the six input signals, and has the key KL register 240 hold the output signal selected as a new intermediate key (Key KL).

The method of generating a new output key (Key KA) from the output key (Key KA) is same as generating a new intermediate key (Key KL) from the intermediate key (Key KL).

Figure 9:
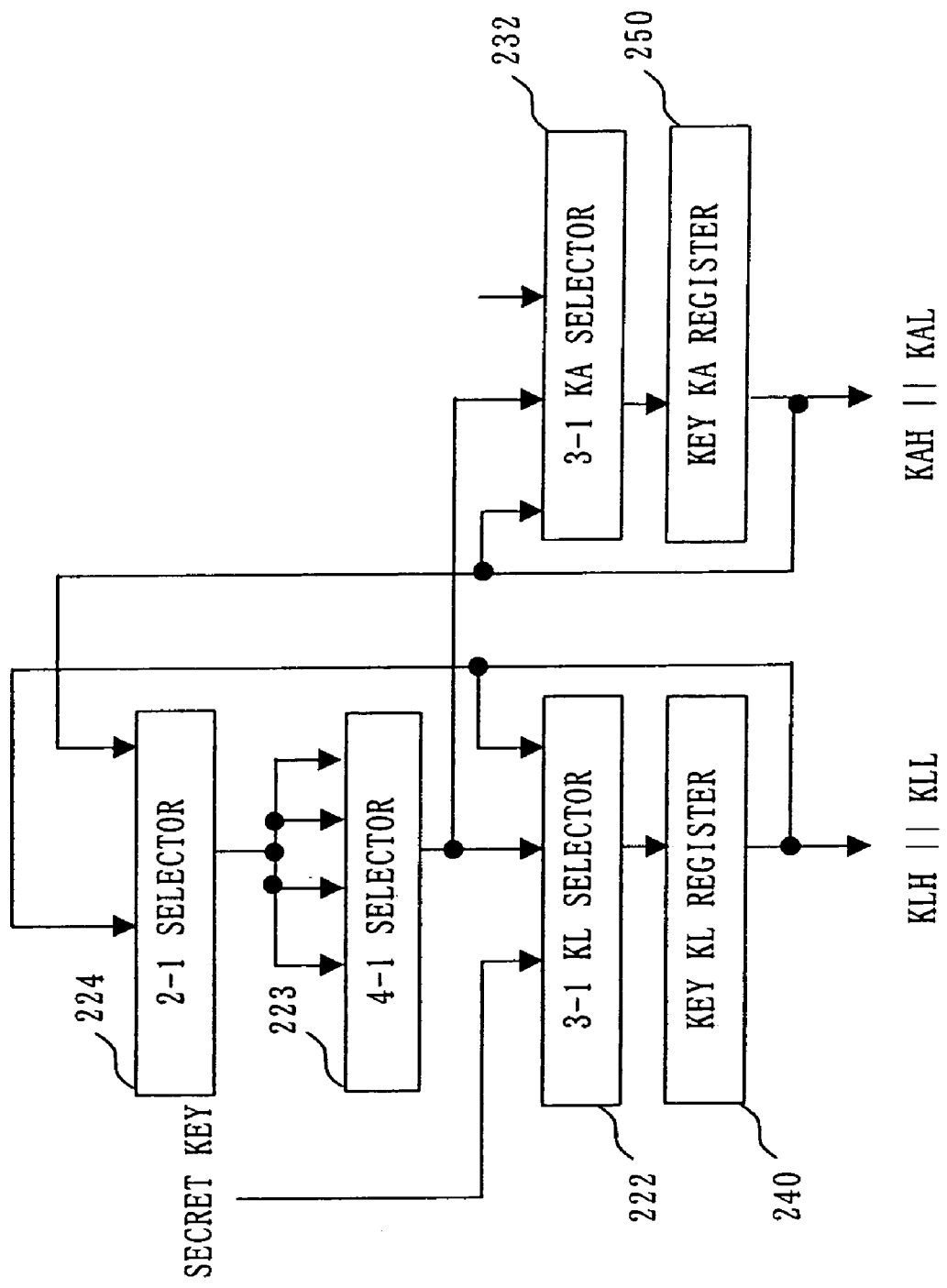
FIG. 9 is a diagram illustrating another configuration example of the intermediate key generator 40.

FIG. 9 is a diagram illustrating another configuration of the intermediate key generator 40.

FIG. 9, in contrast with FIG. 8, shows the sharing of a selector indicated by a 4-1 selector 223. Specifically, the intermediate key (Key KL) outputted from the key KL register 240 and the output key (Key KA) outputted from the key KA register 250 are inputted to a 2-1 selector 224. The 2-1 selector 224 selects one of the two keys, then generates four signals by the rotation shifts of a selected key by four different numbers, and then outputs the four signals to the 4-1 selector 223. The 4-1 selector 223 selects one signal out of the four signals and then outputs a selected signal to a 3-1 KL selector 222 or a 3-1 KA selector 232.

The 3-1 KL selector 222 selects one key from among a key selected by the 4-1 selector 223, the secret key, and the intermediate key (Key KL) that was held in the Key KL register 240, and the key KL register 240 holds a selected key as a new intermediate key Similarly, the 3-1 KA selector 232 selects one key from among the key selected by the 4-1 selector 223, the output key (Key KA) generated, and the output key (Key KA) that was held in the key KA register 250, and the key KL register 240 holds a selected key as a new output key (Key KA).

In contrast with the configuration shown in FIG. 8 where ten units of 2-1 selectors are needed, the configuration shown in FIG. 9 needs only eight units of 2-1 selectors. Therefore, compared to the intermediate key generator 40 of the configuration shown in FIG. 8, that of the configuration shown in FIG. 9 can save two units of 2-1 selectors. Thus, the circuit size may be reduced.

Note that the configuration of the intermediate key generator 40 of FIG. 8 is also applicable to the data conversion apparatus of every embodiment of the present invention. Additionally, the configuration of the intermediate key generator 40 of FIG. 9 is also applicable to the data conversion apparatus of every embodiment of the present invention.

Still more, the configuration of the intermediate key generator 40 of FIG. 51 in a later discussion is also applicable to the data conversion apparatus of every embodiment of the present invention.

Subordinate Conversion—Sub Converter 330.

A description will now be given of an internal configuration and an operation of the sub converter 330.

Here, a description will be given of the case where at least one of the data converter unit 50 and the data inverter unit 70 has the key transfer function according to this embodiment.

Subordinate Conversion—Sub Converter 330—Data Converter Unit 50 with Key Transfer Function.

Figure 10:
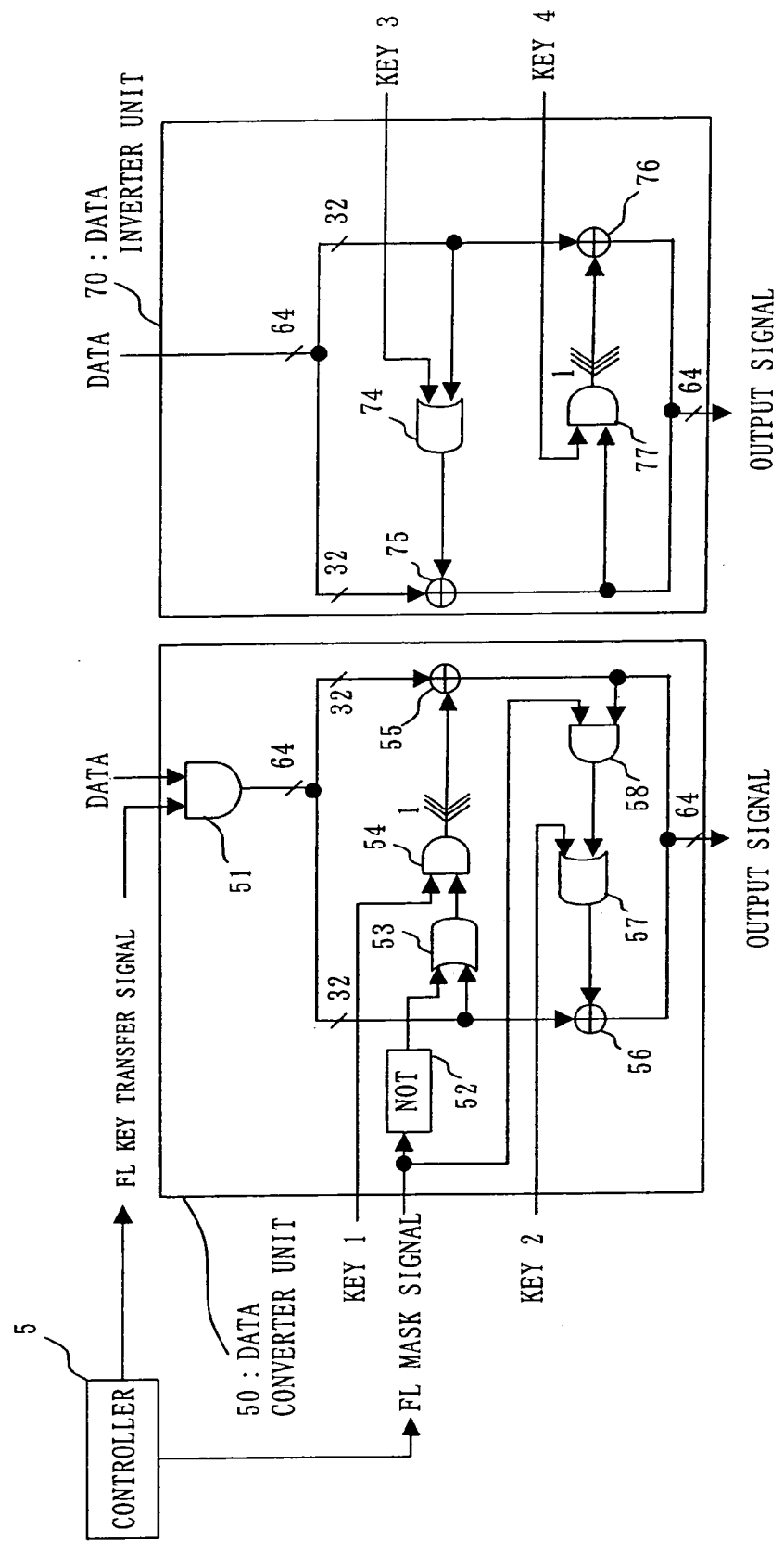
FIG. 10 is a diagram illustrating an internal configuration of the sub converter 330 in which the data converter unit 50 is provided with a key transfer function.

FIG. 10 is a diagram illustrating an internal configuration and an operation of the sub converter 330.

In contrast with the configuration of the data converter unit 50 and that of the data inverter unit 70 of the related art discussed with reference to FIG. 58, those of this embodiment include a transfer signal for transferring a key or data and circuits accompanied with the transfer signal, in addition.

With FIG. 10, the data converter unit 50 has the function to transfer an input key.

Specifically, a transfer signal for transferring a key is inputted to the data inverter 50. The data converter unit 50, upon receipt of the transfer signal, transfers the key received based on the transfer signal.

More specifically, the transfer signals are controlled by a controller 5. In the case of transferring a key, the controller 5 outputs an FL key transfer signal and an FL mask signal. The data converter unit 50 receives the FL key transfer signal and the FL mask signal outputted from the controller 5.

Concrete descriptions will now be given of a key transfer process performed by the data converter unit 50 using these transfer signals.

In the case of transferring a key, the FL key transfer signal is set to 0, and inputted to an AND circuit 51. The AND circuit 51 also receives target data to be encrypted/decrypted.

Since the FL key transfer signal is 0, input data is inhibited by the AND circuit of the AND circuit 51 and thereby nullified. In other words, whatever value input data is assigned, the output data from the AND circuit 51 becomes 0.

The upper bits of the data assigned a value of 0 outputted from the AND circuit 51 are inputted to an OR circuit 53 and the lower bits are inputted to the EXOR circuit 55.

In the meantime, the FL mask signal is inputted to a NOT circuit 52. In the case of transferring a key, the controller 5 sets the FL mask signal to 0, so that the output signal from the NOT circuit 52 becomes 1. Therefore, an output signal from the OR circuit 53 thus receiving signals 0 and 1 becomes 1. The AND circuit 54 receives 1 which is a value outputted from the OR circuit 53, and the information of the key 1, so that output data from the AND circuit 54 is always the key 1.

The key 1 outputted from the AND circuit 54 is subject to a one-bit rotation shift to the left, and then inputted to the EXOR circuit 55. The key 1 has already been subject to one-bit left rotation shift to the right in advance in the key scheduler 210 as shown in FIG. 3. Therefore, the key 1 outputted from the AND circuit 54 can restore its original value to be transferred by thus subjected to the one-bit rotation shift to the left.

The EXOR circuit 55 receives the lower bits, assigned a value of 0, outputted from the AND circuit 51, so that an arithmetic operation of the AND circuit 55 outputs the key 1 as it is. This becomes the lower bits of the output signal.

Thus, the data converter unit 50 can output the key 1 as it is as the output signal based on the KL key transfer signal and the FL mask signal.

Likewise, with the FL key transfer signal and the FL mask signal, the key 2 is transferred as it is as the output signal. The operation will be discussed below.

The FL mask signal is 0 as previously mentioned. Therefore, an AND circuit 58 receives 0 and the key 1 outputted from the EXOR circuit 55, and always outputs 0.

The OR circuit 57 receives the key 2 and 0, and therefore its output value is always the key 2.

The key 2 is inputted to the EXOR circuit 56 where XORed with 0 which is the upper data outputted by the AND circuit 51, so that an output from the EXOR circuit 56 is always the key 2. This becomes the upper bits of the output signal.

Thus, the FL key transfer signal and the FL mask signal are inputted and the key 1 and the key 2 as they are can be transferred Note that, although the controller 5 for controlling the FL key transfer signal and the FL key mask signal which are both the transfer signal, is not shown in FIGS. 11, 12, and 14 through 33, the transfer signals are to be controlled by the controller 5 like the case shown in FIG. 10.

Subordinate Conversion—Sub Converter 330—Data Inverter Unit 70 with Key Transfer Function.

A description will now be given of the case where the data inverter unit 70 is provided with the function to transfer an input key.

Figure 11:
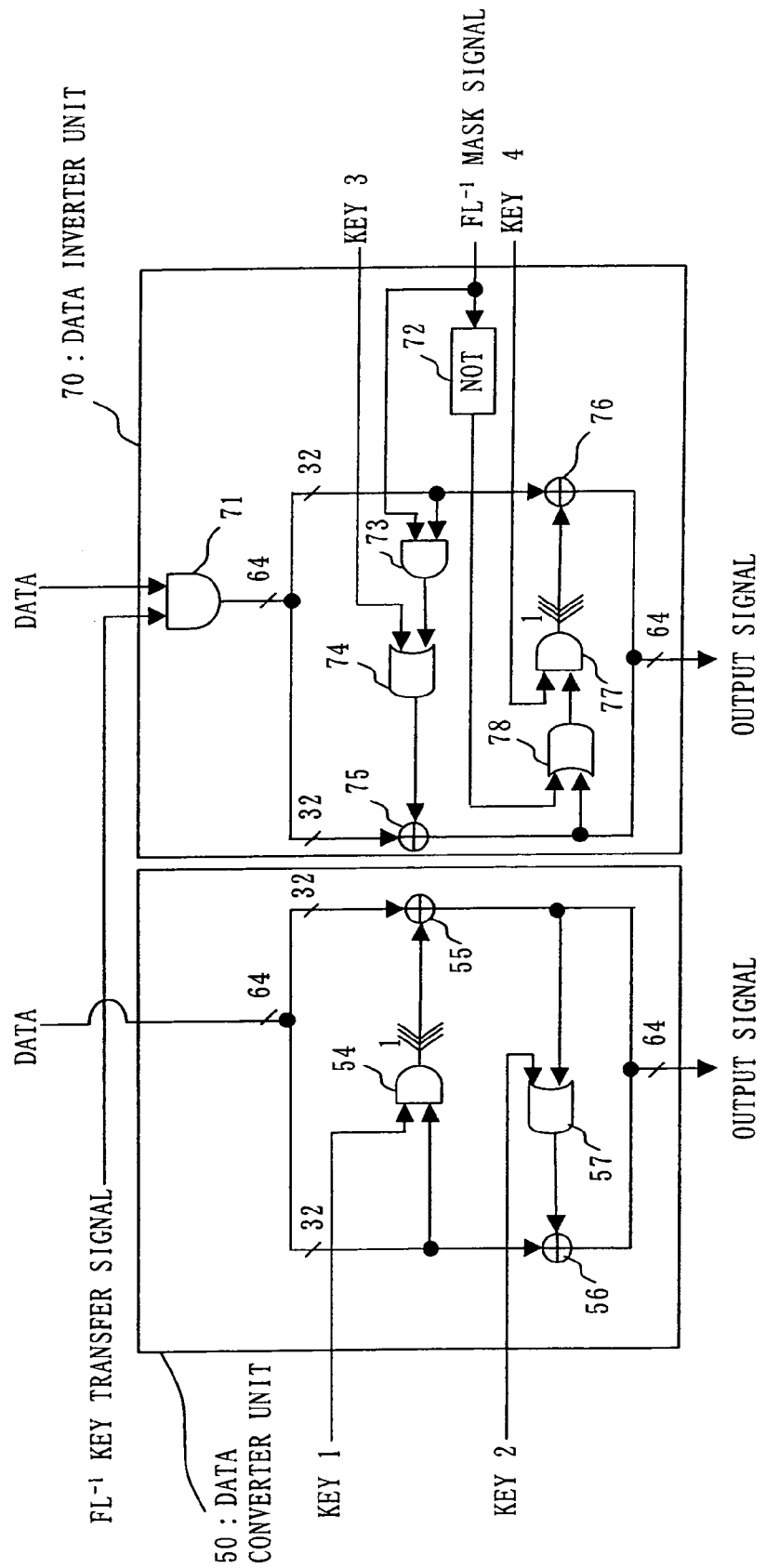
FIG. 11 is a diagram illustrating an internal configuration of the sub converter 330 in which the data inverter unit 70 is provided with the key transfer function.

FIG. 11 is a diagram illustrating the case where the data inverter unit 70 has the key transfer function.

An AND circuit 71 receives an $FL^{-1}$ key transfer signal and data.

Like the FL key transfer signal mentioned above, the $FL^{-1}$ key transfer signal holds 0, and therefore data inputted to the AND circuit 71 is inhibited and thus nullified, so that output data from the AND circuit 71 is fixed to 0.

Like the FL mask signal mentioned above, the $FL^{-1}$ mask signal is 0, and therefore both the signals inputted to an AND circuit 73 are 0, so that output data from the AND circuit 73 is fixed to 0.

The OR circuit 74, receiving the output data from the AND circuit 73, 0, and the key 3, outputs the key 3.

The EXOR circuit 75, receiving the upper bits, 0, of the output data, 0, from the AND circuit 71, and therefore outputs the key 3. This becomes the upper bits of the output signal.

An OR circuit 78, receiving a value 1, which is an inverted value of the $FL^{-1}$ mask signal 0 by a NOT circuit 72, and the key 3, and therefore outputs 1. The AND circuit 77, receiving the output data 1 from the OR circuit 78 and the key 4, and therefore outputs the key 4. The key 4 is subject to a one-bit rotation shift to the left, and then inputted to the EXOR circuit 76. Here, again, the key 4 has already been subjected to the advance one-bit rotation shift to the right by the key scheduler 210, and then inputted to the data inverter unit 70. Therefore, the key 4 can restore its original value by thus subjected to the one-bit rotation shift to the left here.

The EXOR circuit 76, receiving the lower bits, 0, of output data from the AND circuit 71 and the key 4, outputs the key 4. This becomes the lower bits of the output data.

Thus, the data inverter unit 70 can output an input key (key 3, key 4) as it is upon receipt of the transfer signals, the $FL^{-1}$ key transfer signal and the $FL^{-1}$ mask signal.

Subordinate Conversion—Sub Converter 330—Data Converter Unit 50 and Data Inverter Unit 70 Both with the Key Transfer Function.

A description will now be given of the case where both the data converter unit 50 and the data inverter unit 70 are provided with the function to transfer an input key.

Figure 12:
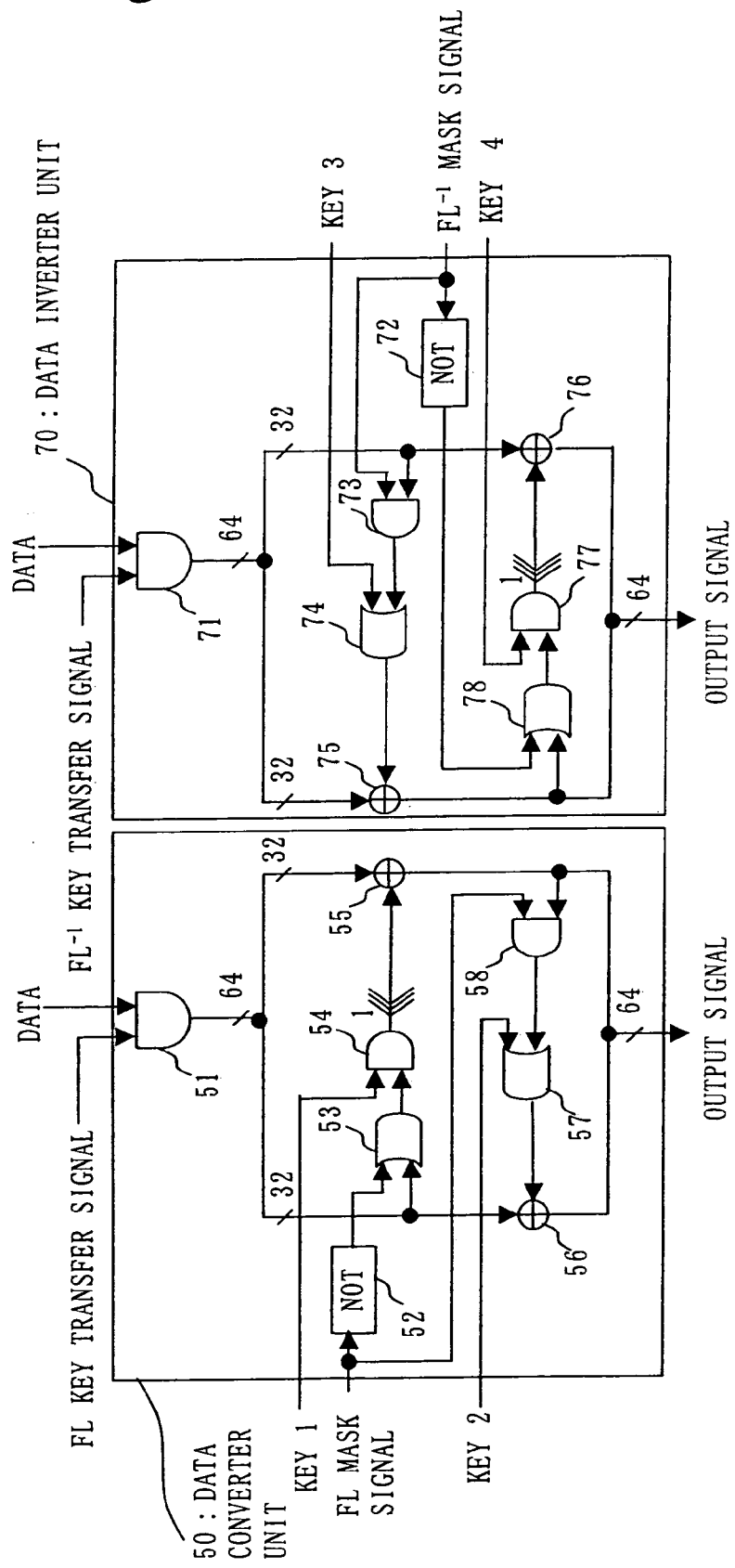
FIG. 12 is a diagram illustrating an internal configuration of the sub converter 330 in which the data converter unit 50 and the data inverter unit 70 are both provided with the key transfer function.

FIG. 12 is a diagram illustrating an internal configuration of the sub converter 330 in the case where the data converter unit 50 and the data inverter unit 70 are provided with the key transfer function.

The configuration and the operation of the data converter unit 50 is the same as that of the data converter unit 50 of FIG. 10, and the configuration and the operation of the data inverter unit 70 is the same as that of the data inverter unit 70 of FIG. 11, and therefore will not be discussed here in detail.

At least one of the data converter unit 50 and the data inverter unit 70 thus provided with the key transfer function allows eliminating the necessity of the path to transfer a key from the key KL register 240 to the selector 310 shown in FIG. 56 and FIG. 60, so that the key can be inputted to the sub converter 330 from the key KL register 240 via the key scheduler 210. Additionally, the transfer signal to transfer a key being inputted into the sub converter 330 allows the sub converter 330 to transfer the key to the selector 310.

By making the key transfer thus possible using the path, a total number of selectors in the data conversion apparatus may be reduced. More particularly, according to the data conversion apparatus of this embodiment, the function is shared by generating the extended key by the intermediate key generator 40 and by performing data conversion by the main converter 320 and the sub converter 330 as shown in FIG. 2 in order to implement a compact data conversion apparatus. Then, the use of the "path to transfer the intermediate key (Key KL) from the key KL register 240 to the selector 310 via the key scheduler 210 by the sub converter 330, and then to the main converter 320 via the arithmetic register 350" of this embodiment can curb the increase in the number of selectors, in place of the use of the "path to transfer the intermediate key (Key KL) from the Key KL register 240 to the selector 310, and then to the main converter 320 via the arithmetic register 350" shown in FIG. 56 and FIG. 60.

Thus curbing the increase in the number of selectors in the data scrambler of the data conversion apparatus for block cipher, and thereby reducing the total number of gates in the circuits allows reducing the size of all the circuit chips and the power consumption. Hence, the data conversion apparatus for block cipher of this embodiment can be implemented effectively even on mobile devices such as cellular phones for which downsizing together with low power consumption is strongly desired.

With reference to FIG. 10 through FIG. 33, the input keys may be different from one another, or otherwise the same. The FL key transfer signal and the $FL^{-1}$ key transfer signal may also be the same signals. The FL mask signal and the $FL^{-1}$ mask signal may also be the same signals.

EMBODIMENT 2

In this embodiment, a description will be given of the case where at least one of the data converter unit 50 and the data inverter unit 70 is provided with the data transfer function.

Subordinate Conversion—Sub Converter 330—Data Converter Unit 50 with Data Transfer Function.

In this embodiment, a description will be given of the case where the sub converter 330 is provided with the data transfer function.

Figure 13:
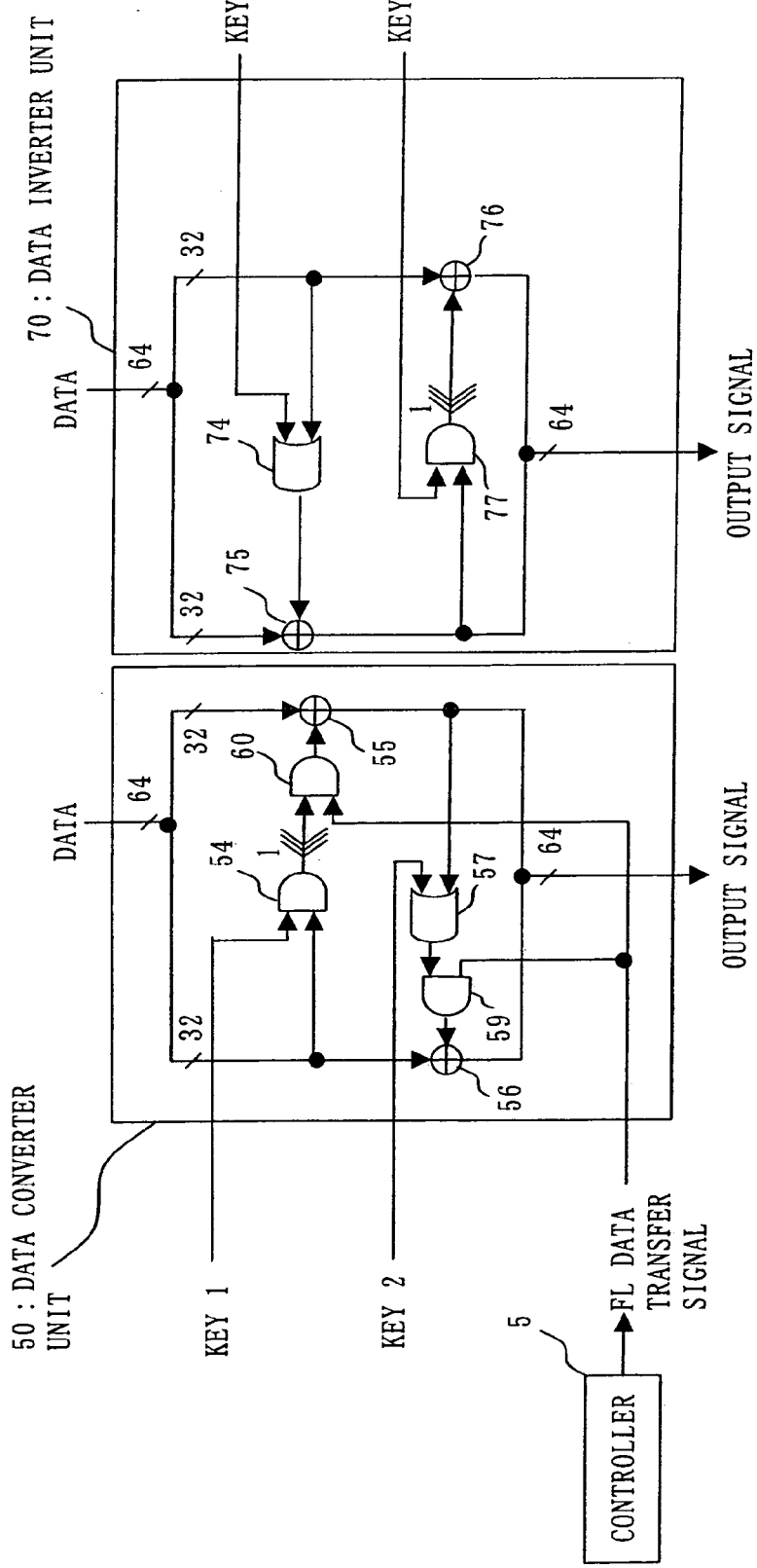
FIG. 13 is a diagram illustrating an internal configuration of the sub converter 330 in which the data converter unit 50 is provided with a data transfer function according to a second embodiment.

FIG. 13 is a diagram illustrating an internal configuration of the sub converter 330 in which the data converter unit 50 is provided with the data transfer function.

The controller 5 inputs the FL data transfer signal to the data converter unit 50 as a signal for transferring data. The FL data transfer signal inputted to the data converter unit 50 is assigned a value 0. This signal is inputted to an AND circuit 59 and an AND circuit 60.

An AND circuit 54 receives the upper bits of input data and the key 1. Output data from the AND circuit 54 is unspecified, depending on the value of the input data. On the other hand, an output signal from the AND circuit 60 is always 0, regardless of the value of the output signal from the AND circuit 54, even with input data obtained through a one-bit rotation shift to the left of the output data, because the other input signal, the FL data transfer signal, holds a value of 0. The output data, 0, from the AND circuit 60 is inputted to the EXOR circuit 55, where the input data and the lower bits are XORed. Since the output from the AND circuit 60 is 0, the lower bits of the input data is outputted at the EXOR circuit 55 as the lower data of the output signal.

In the meantime, the output data from the EXOR circuit 55 and a key are inputted to the OR circuit 57 as input signals. Note here that an output signal from the OR circuit 57 is unspecified, but the FL data transfer signal is fixed to 0, so that an output signal from an AND circuit 59 is 0. At the EXOR circuit 56, the upper bits of input data and the output data, 0, from the AND circuit 59 are XORed. Therefore, the upper bits of the input data are outputted as the upper data of an output signal.

Thus, the data converter unit 50, upon receipt of the FL data transfer signal as the transfer signal, can output data received as it is, regardless of the input of the key.

Note that the configuration of the data inverter unit 70 of FIG. 13 is the same as that of the data inverter unit 70 shown in FIG. 57, and therefore will not be discussed here in detail.

Subordinate Conversion—Sub Converter 330—Data Inverter Unit 70 with Data Transfer Function.

Figure 14:
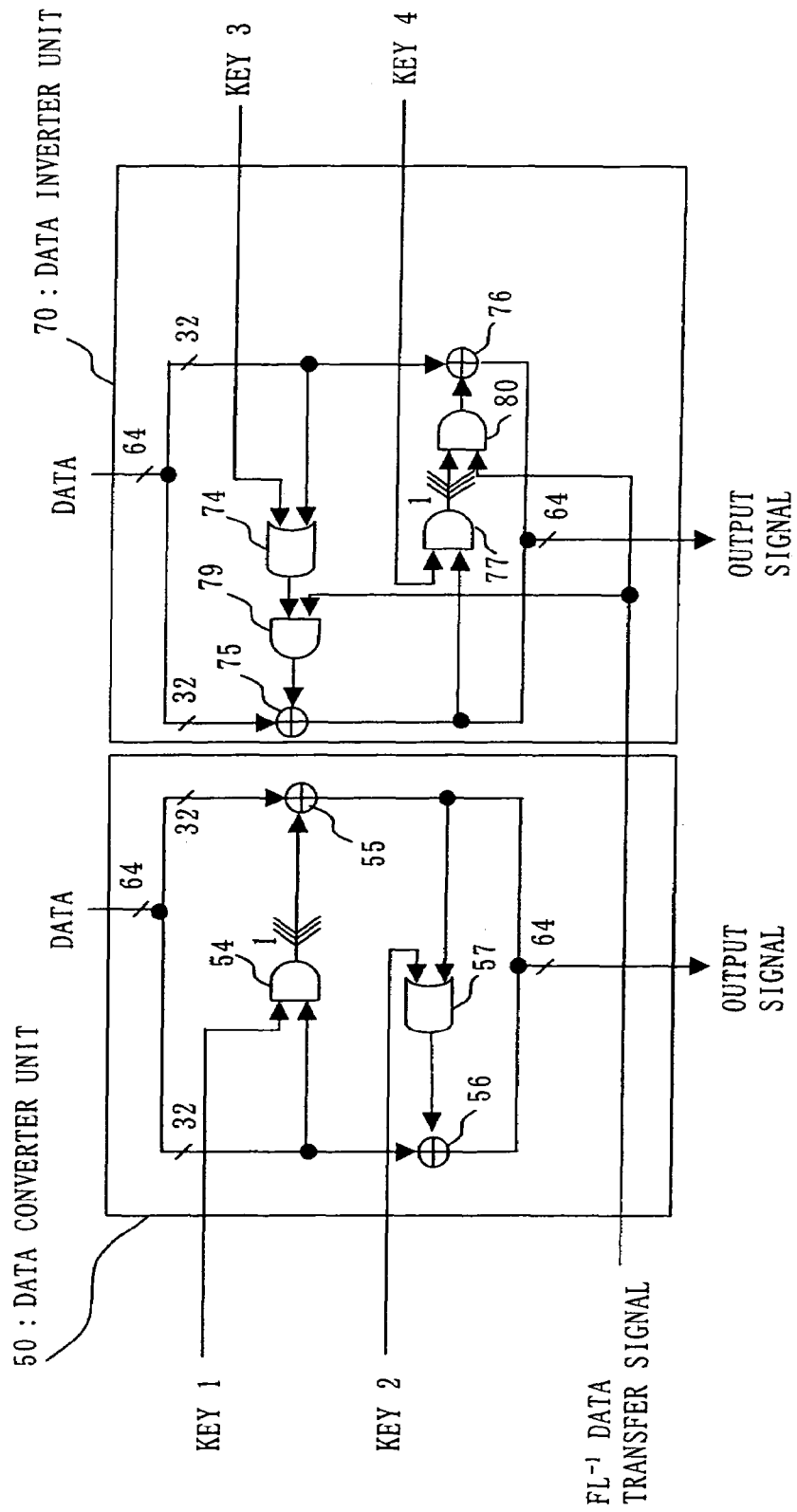
FIG. 14 is a diagram illustrating an internal configuration of the sub converter 330 in which the data inverter unit 70 is provided with the data transfer function.

FIG. 14 is a diagram illustrating an internal configuration of the sub converter 330 in which the data inverter unit 70 has the data transfer function.

The data inverter unit 70 receives the $FL^{-1}$ data transfer signal for transferring data. In the case of transferring data, the $FL^{-1}$ data transfer signal is assigned 0, so that an AND circuit 79 outputs 0 whatever value an output signal from the OR circuit 74 is assigned. Therefore, the EXOR circuit 75 outputs the upper bits of input data as it is as the upper data of the output signal.

The $FL^{-1}$ data transfer signal is inputted to an AND circuit 80, so that an output signal from the AND circuit 80 is 0, regardless of the value of an output signal from the AND circuit 77. Thus, the lower bits of input data are outputted as it is at the EXOR circuit 76 as the lower data of the output signal.

Thus, the data inventor unit 70 can transfer data as it is as the output signal.

Subordinate Conversion—Sub Converter 330—Data Converter Unit 50 and Data Inverter Unit 70 Both with Data Transfer Function.

Figure 15:
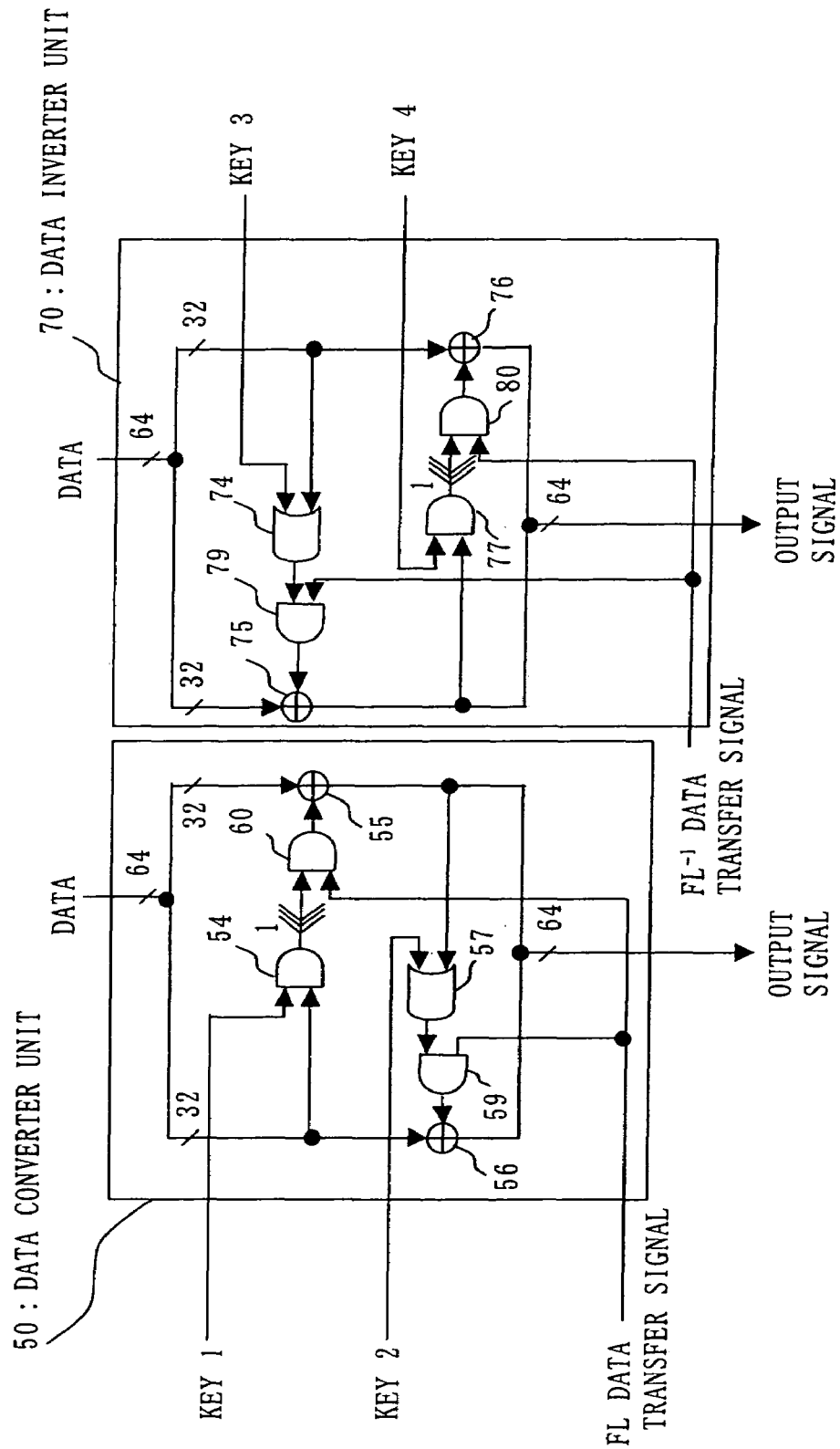
FIG. 15 is a diagram illustrating an infernal configuration of the sub converter 330 in which the data converter unit 50 and the data inverter unit 70 are both provided with the data transfer function.

FIG. 15 is a diagram illustrating an internal configuration of the sub converter 330 in which the data converter unit 50 and the data inverter unit 70 are both provided with the data transfer function.

The data converter unit 50 is the same in configuration as the data conversion apparatus of FIG. 13, and the data inverter unit 70 is the same in configuration as the data inverter unit 70 of FIG. 14. Therefore, the data converter unit 50 and the data inverter unit 70 of FIG. 15 can respectively output data inputted as it is.

The sub converter 330 thus having the function to transfer input data as it is to the selector 310 can eliminate the necessity of the path to transfer output data from the main converter 320 to the selector 310 shown in FIG. 56.

As shown in FIG. 60, in the process of data encryption/decryption, in the case where the main converter 320 has the F function for less than one round, the intermediate data is to be held in the arithmetic register 350 for a given period of time in order for the main converter 320 to process the F function based nonlinear conversion for one round, which was discussed earlier. This indicates that the main converter 320 needs its own loop path, which corresponds to the loop path of FIG. 60 to output the intermediate data outputted from the main converter 320 to the arithmetic register 350 via the selector 310.

The use of the data transfer function of the sub converter 330 of this embodiment, on the other hand, can eliminate the necessity of the above-mentioned loop path. More particularly, intermediate data outputted from the main converter 320 is transferred by the sub converter 330 and inputted to the selector 310. The selector 310 selects the intermediate data received, and thereby the intermediate data is transferred to the main converter 320.

The use of this data path allows reducing the number of input signals to the selector 310, in contrast with the number of input signals to the selector 310 shown in FIG. 56 or FIG. 60. Hence, the increase of selectors may be curbed and thus the number of selectors may be reduced.

Similarly, the data conversion apparatuses of FIG. 6 and FIG. 7 is allowed eliminating the necessity of the path from the main converter 320 to the selector 310, thereby allowing the device to become compact. Additionally, the reduction in the number of selectors allows achieving low power consumption.

Note that the FL data transfer signal and the $FL^{-1}$ data transfer signal may be the same signals.

EMBODIMENT 3

In this embodiment, a description will be given of the case where at least one of the data converter unit 50 and the data inverter unit 70 is provided with the key transfer function and the data transfer function.

Subordinate Conversion—Sub Converter 330—Data Converter Unit 50 with Key Transfer Function and Data Transfer Function and Data Inverter Unit 70 with Key Transfer Function.

Figure 16:
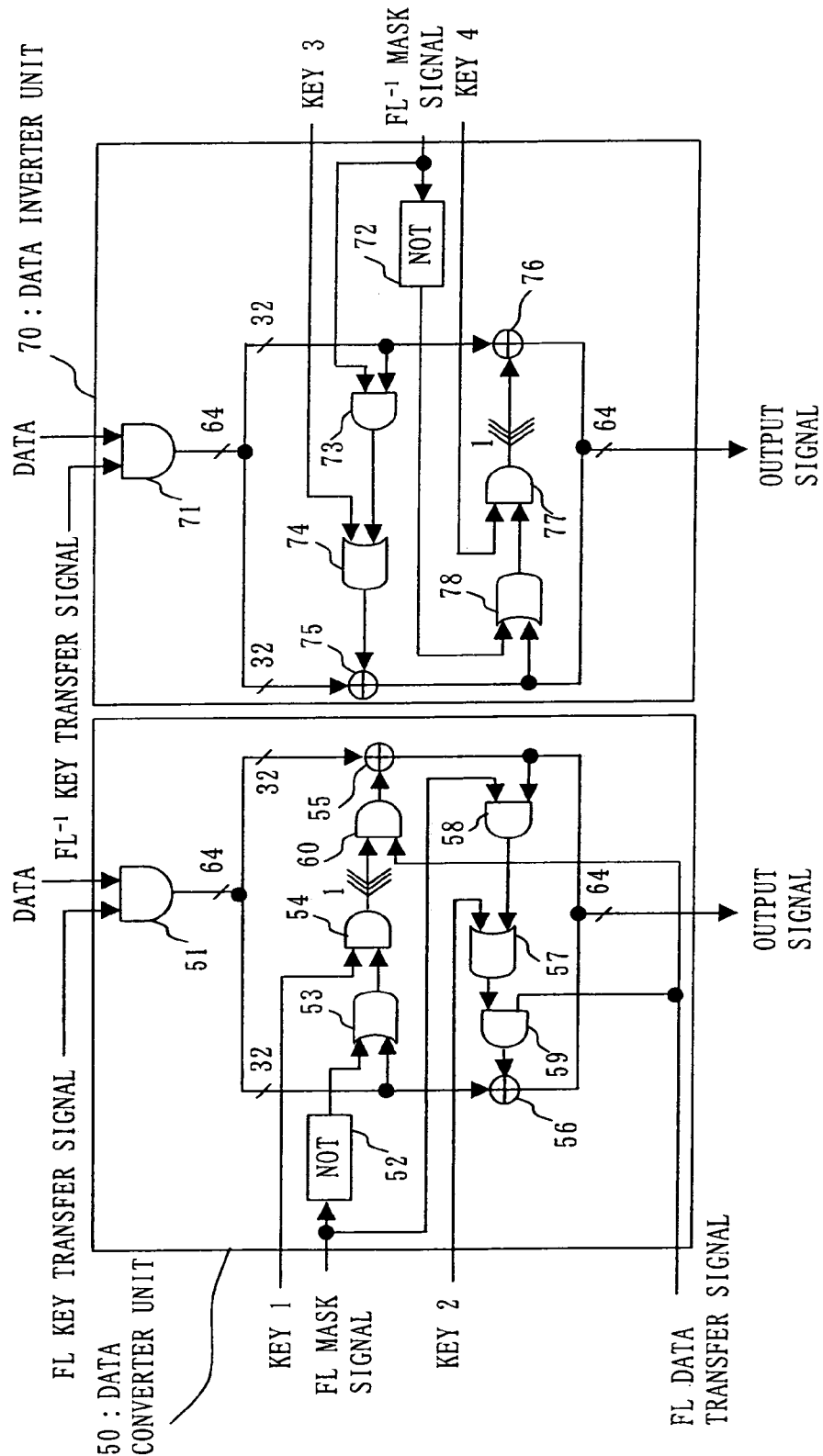
FIG. 16 is a diagram illustrating an internal configuration of the sub converter 330 in which the data converter unit 50 is provided with the key transfer function and the data transfer function, and the data inverter unit 70 is provided with the key transfer function according to a third embodiment.

FIG. 16 is a diagram illustrating an internal configuration of the sub converter 330 in which the data converter unit 50 is provided with the key transfer function and the data transfer function and the data inverter unit 70 is provided with the key transfer function.

The configuration and the operation of the data inverter unit 70 is the same as those of the data inverter unit 70 of FIG. 11 with the key transfer function, and therefore will not be discussed here.

The configuration and the operation of the data converter unit 50 correspond to the combination of those of the data converter unit 50 of FIG. 10 with the key transfer function and those of the data converter unit 50 of FIG. 13 with the data transfer function, and therefore will not be discussed here.

With the data converter unit 50, the FL key transfer signal has the function to inhibit and thus nullify input data and the FL mask signal has the function to let an input key pass through.

The FL data transfer signal has the function to nullify an input key so as to let data pass through.

Accordingly, in the case where both the FL key transfer signal. and the FL mask signal both hold 0 as the transfer signal for transferring a key, data cannot be transferred, so that the FL data transfer signal cannot hold 0 as a transfer signal for transferring data. Similarly, in the case where the FL data transfer signal holds 0 as the transfer signal for transferring data, a key cannot be transferred, so that the FL key transfer signal and the FL mask signal cannot hold 0 as the transfer signal for transferring a key.

Then, in the case where none of the FL key transfer signal, the FL mask signal, the FL data transfer signal, an $FL^{-1}$ key transfer signal, and an $FL^{-1}$ mask signal hold 0 as the transfer signal, the data converter unit 50 and the data inverter unit 70 perform a linear conversion of input data, which they are supposed to do.

First, a description will be given of an operation of the data converter unit 50 for transferring a key.

The data converter unit 50 receives 0 as the FL key transfer signal and 0 as the FL mask signal. Since data is not to be transferred, the FL data transfer signal remains unchanged having 1.

First, the AND circuit 51 inhibits and thus nullify data by the FL key transfer signal. The key 1 passes through the AND circuit 54 directly, then, is subject to a one-bit rotation shift to the left, and then inputted to the AND circuit 60. Since the FL data transfer signal is 1, the key 1 passes through the AND circuit 60 directly. At the EXOR circuit 55, the key 1 is XORed with 0, which is the lower bits of output data from the AND circuit 51. The key 1 is outputted as the lower data of the output signal.

The key 2 passes through the OR circuit 57 by 0, which is outputted from the AND circuit 58, passes through the AND circuit 59 by the FL data transfer signal, then XORed with 0 which is the lower bit of the output data outputted from the AND circuit 51 at the EXOR circuit 56, thereby also passing through the XOR circuit 56, and become the upper data of the output signal. The data converter unit 50 can thus transfer a key (key 1, key 2) as it is.

Next, a description will now be given of an operation of the data converter unit 50 for transferring data.

The input signal of the FL data transfer signal is 0. The FL key transfer signal and the FL mask signal continue to have 1.

The AND circuit 51 lets data pass through, and the lower bits of the data passed through is inputted to the EXOR circuit 55. The AND circuit 60 receives 0 of the FL data transfer signal, so that 0 is outputted from the AND circuit 60. The lower bits of the data inputted to the EXOR circuit 55 passes through the EXOR circuit 55 and is then outputted as the lower data of the output signal.

Similarly, the AND circuit 59 outputs 0 because the FL data transfer signal is 0. The lower bits of data inputted to the EXOR circuit 56 passes through the EXOR circuit 56 and is then outputted as the upper data of the output signal.

In this manner, the data converter unit 50 can transfer data as it is.

Thus, the key transfer signal, such as the FL key transfer signal and the $FL^{-1}$ key transfer signal, and the mask signal having the FL mask signal and the $FL^{-1}$ mask signal, transfer a key, and the FL data transfer signal transfers data.

Subordinate Conversion—Sub Converter 330—Data Converter Unit 50 with Key Transfer Function and Data Inverter Unit 70 with Key Transfer Function and Data Transfer Function.

Figure 17:
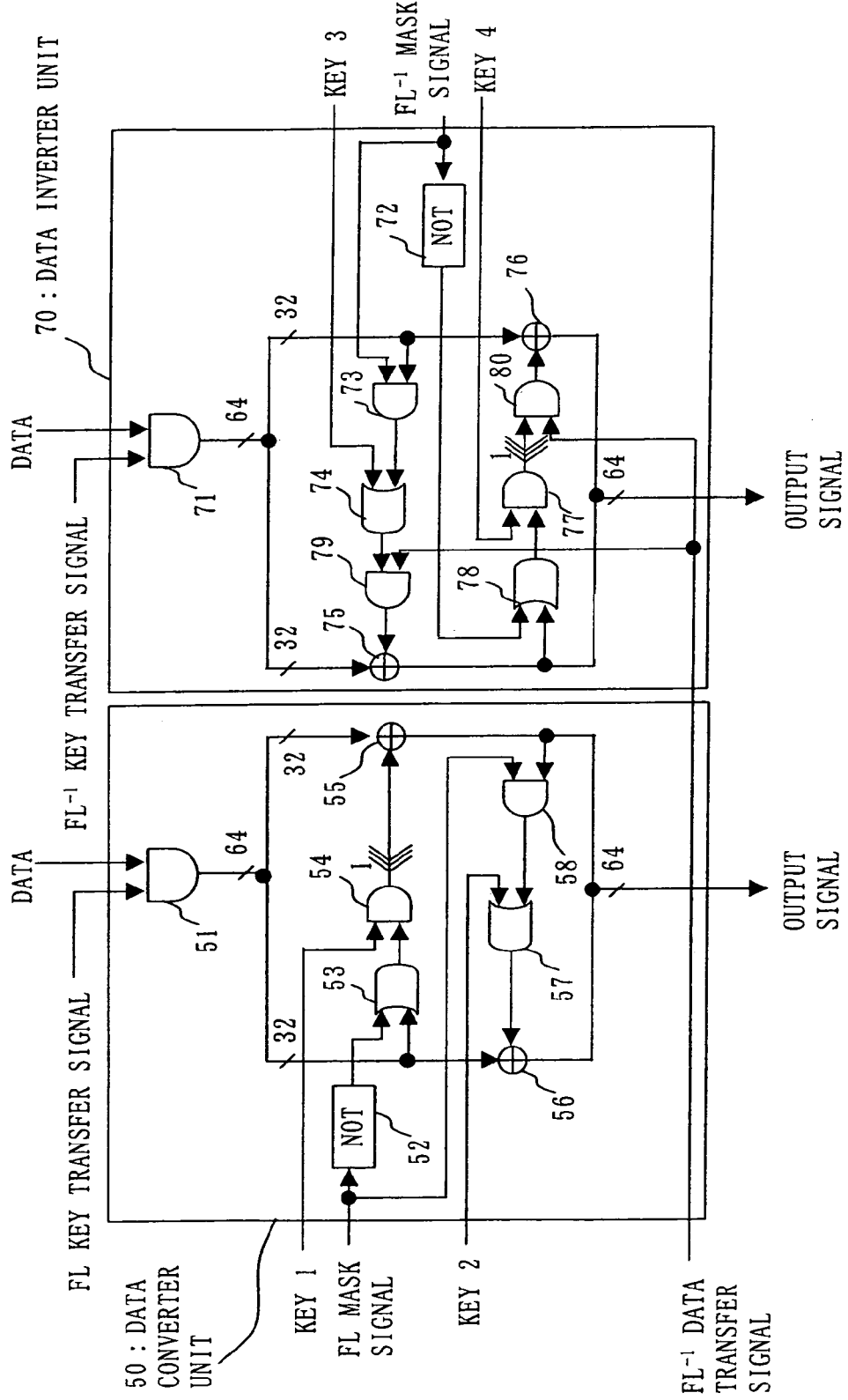
FIG. 17 is a diagram illustrating an internal configuration of the sub converter 330 in which the data inverter unit 70 is provided with the key transfer function and the data transfer function, and the data converter unit 50 is provided with the key transfer function.

FIG. 17 is a diagram illustrating an internal configuration of the sub converter 330 in which the data converter unit 50 is provided with the key transfer function and the data inverter unit 70 is provided with the key transfer function and the data transfer function.

The configuration and the operation of the data converter unit 50 is the same as those of the data conversion apparatus of FIG. 10 with the key transfer function, and therefore will not be discussed here.

The data inverter unit 70 operates the same as the data converter unit 50 of FIG. 16 does. Thus, the operation of the data inverter unit 70, discussed earlier, will not be reiterated here in detail.

Subordinate Conversion—Sub Converter 330—Data Converter Unit 50 and Data Inverter Unit 70 Both with Key Transfer Function and Data Transfer Function.

Figure 18:
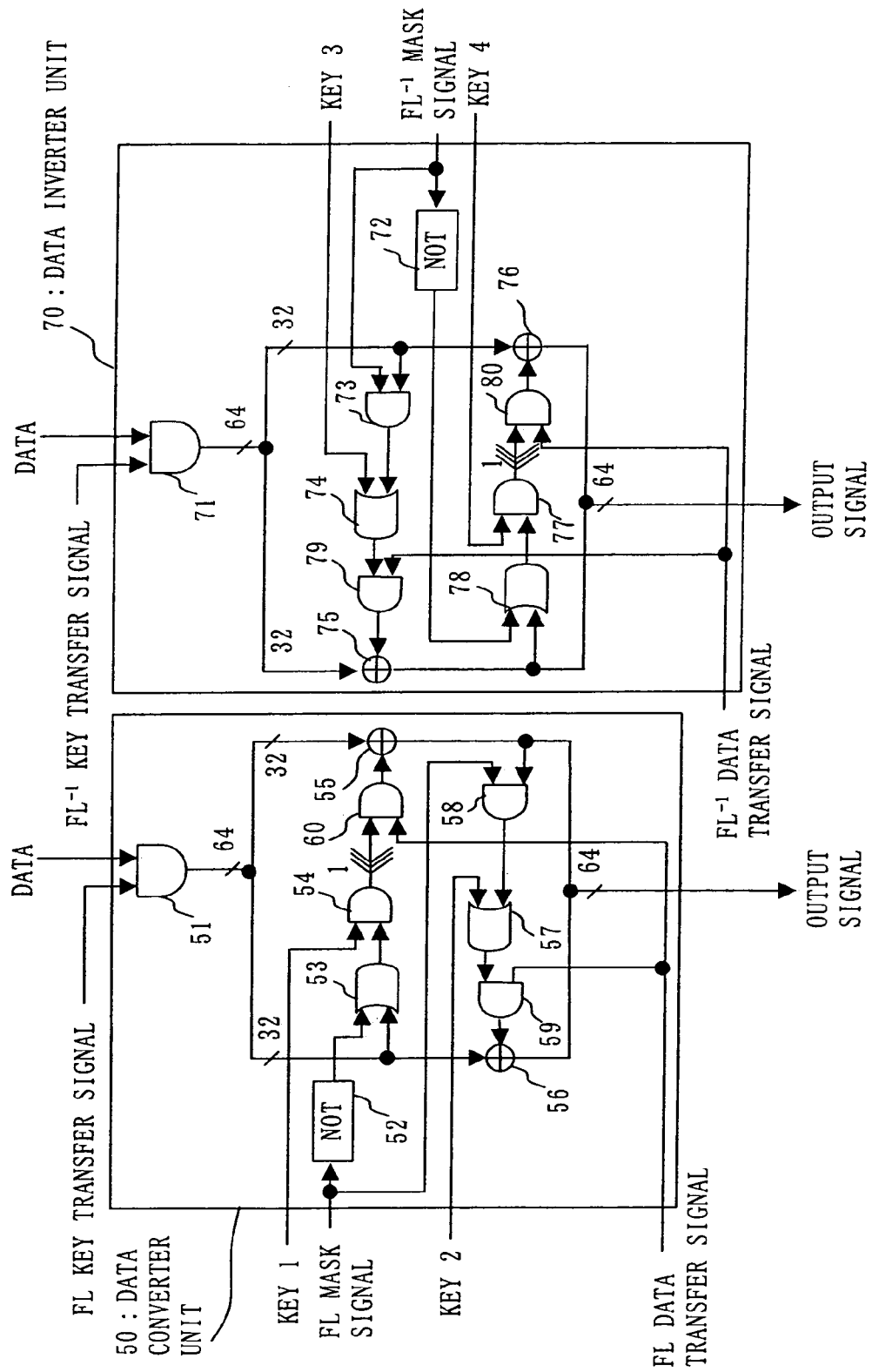
FIG. 18 is a diagram illustrating an internal configuration of the sub converter in which the data converter unit 50 and the data inverter unit 70 are both provided with the key transfer function and the data transfer function.

FIG. 18 is a diagram illustrating a configuration of the sub converter in which the data converter unit 50 and the data inverter unit 70 are both provided with the key transfer function and the data transfer function.

The transfer operations performed by the data converter unit 50 and the data inverter unit 70, discussed earlier, will not be reiterated here. In this embodiment, both the data converter unit 50 and the data inverter unit 70 are provided with the key transfer function and the data transfer function, so that the data conversion apparatus is allowed to perform a sophisticated process of transferring a key and data.

Subordinate Conversion—Sub Converter 330—Data Converter Unit 50 with Key Transfer Function and Data Transfer Function.

Figure 19:
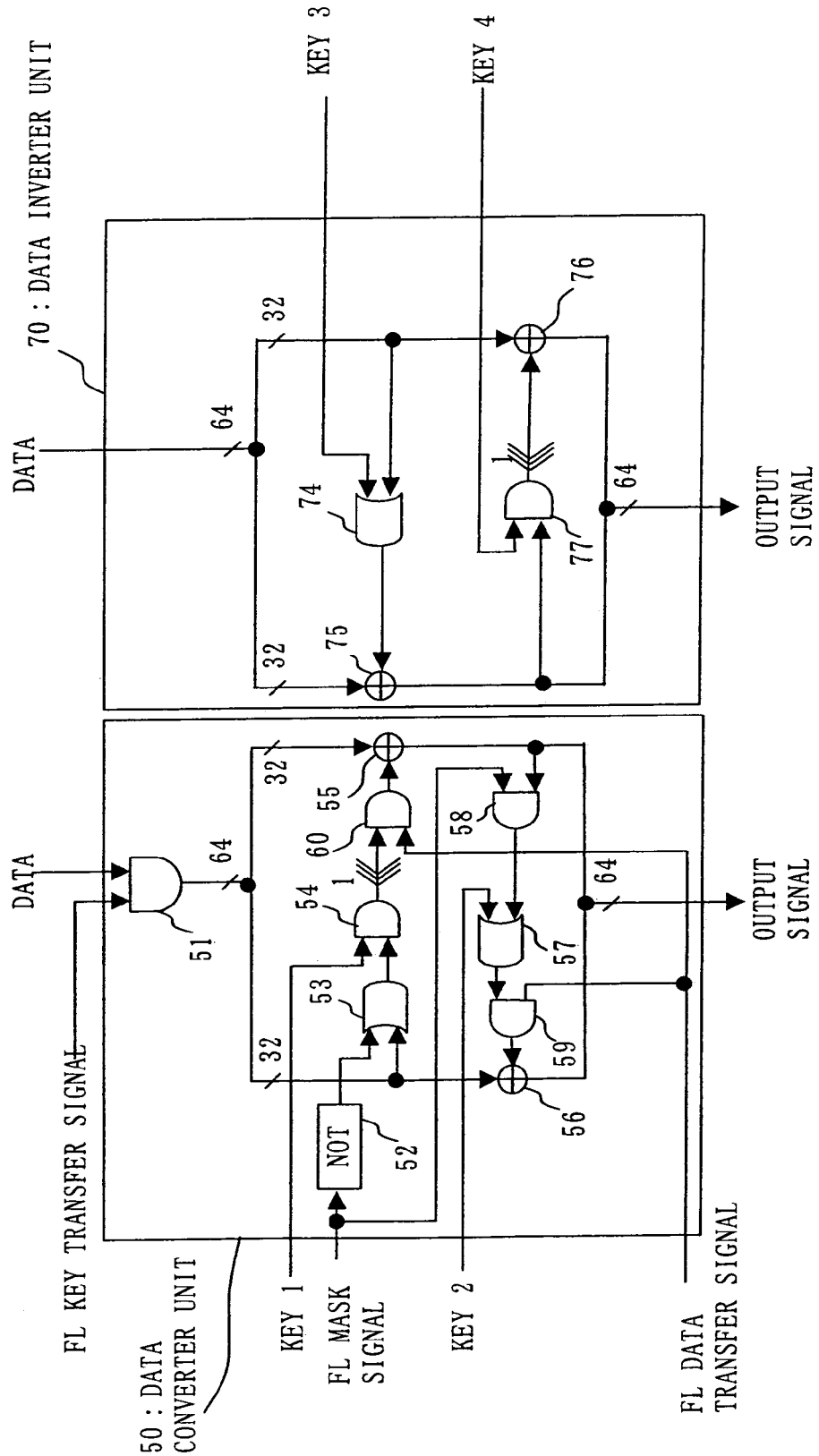
FIG. 19 is a diagram illustrating an internal configuration of the sub converter 330 in which the data converter unit 50 is provided with the key transfer function and the data transfer function.

FIG. 19 is a diagram illustrating a configuration of the sub converter 330 in which the data converter unit 50 is provided with the key transfer function and the data transfer function, and the data inverter unit 70 has none of those transfer functions.

The operations of the data converter unit 50 and the data inverter unit 70, discussed earlier, will not be reiterated here.

Subordinate Conversion—Sub Converter 330—Data Inverter unit 70 with Key Transfer Function and Data Transfer Function.

Figure 20:
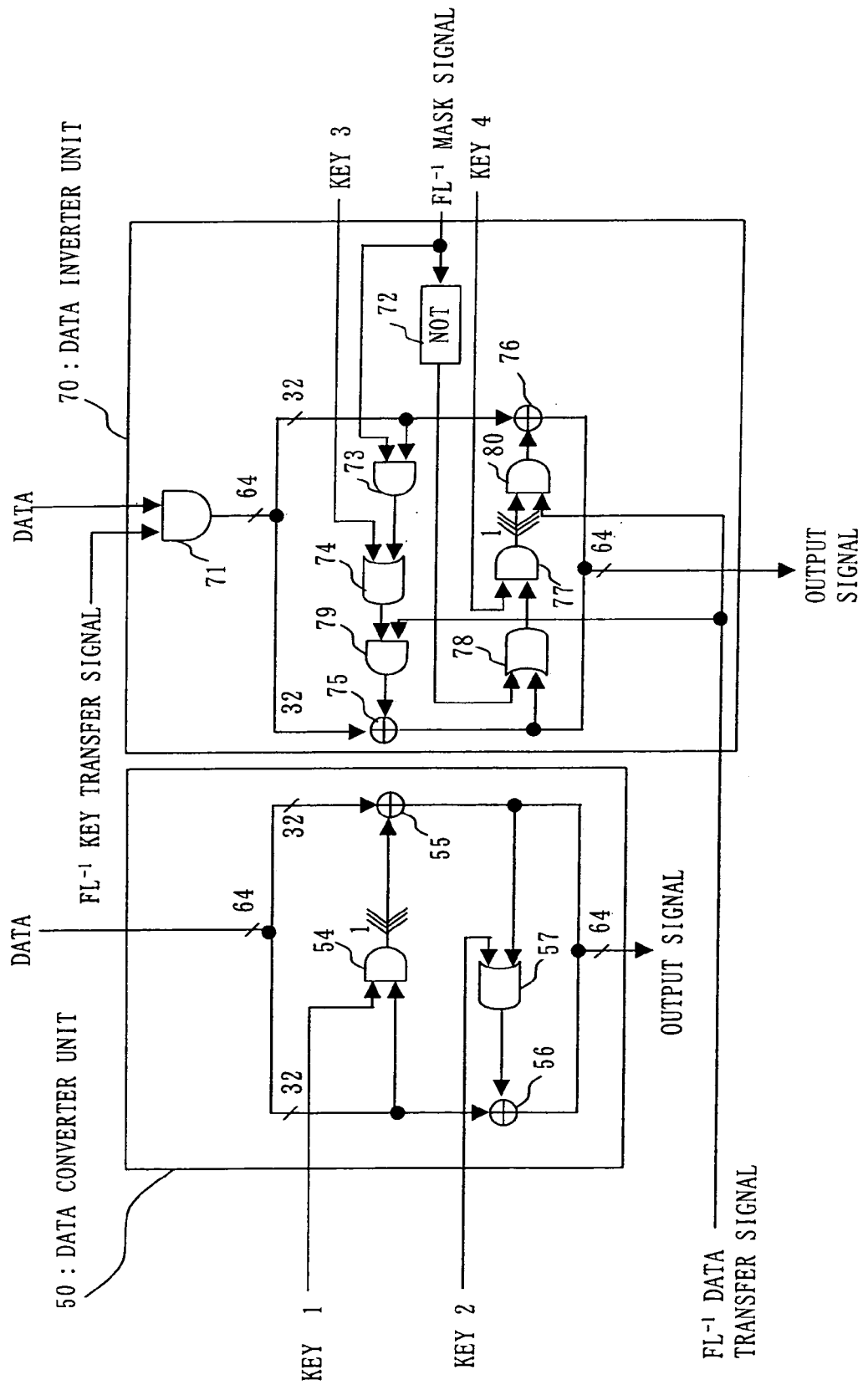
FIG. 20 is a diagram illustrating an internal configuration of the sub converter 330 in which the data inverter unit 70 is provided with the key transfer function and the data transfer function.

FIG. 20 is a diagram illustrating a configuration of the sub converter 330 in which the data inverter unit 70 is provided with the key transfer function and the data transfer function, and the data converter unit 50 is provided with none of those transfer functions.

The detailed operations of the data converter unit 50 and the data inverter unit 70, discussed earlier, will not be reiterated here.

Subordinate Conversion—Sub Converter 330—Data Converter Unit 50 with Key Transfer Function and Data Transfer Function and Data Inverter Unit 70 with Data Transfer Function.

Figure 21:
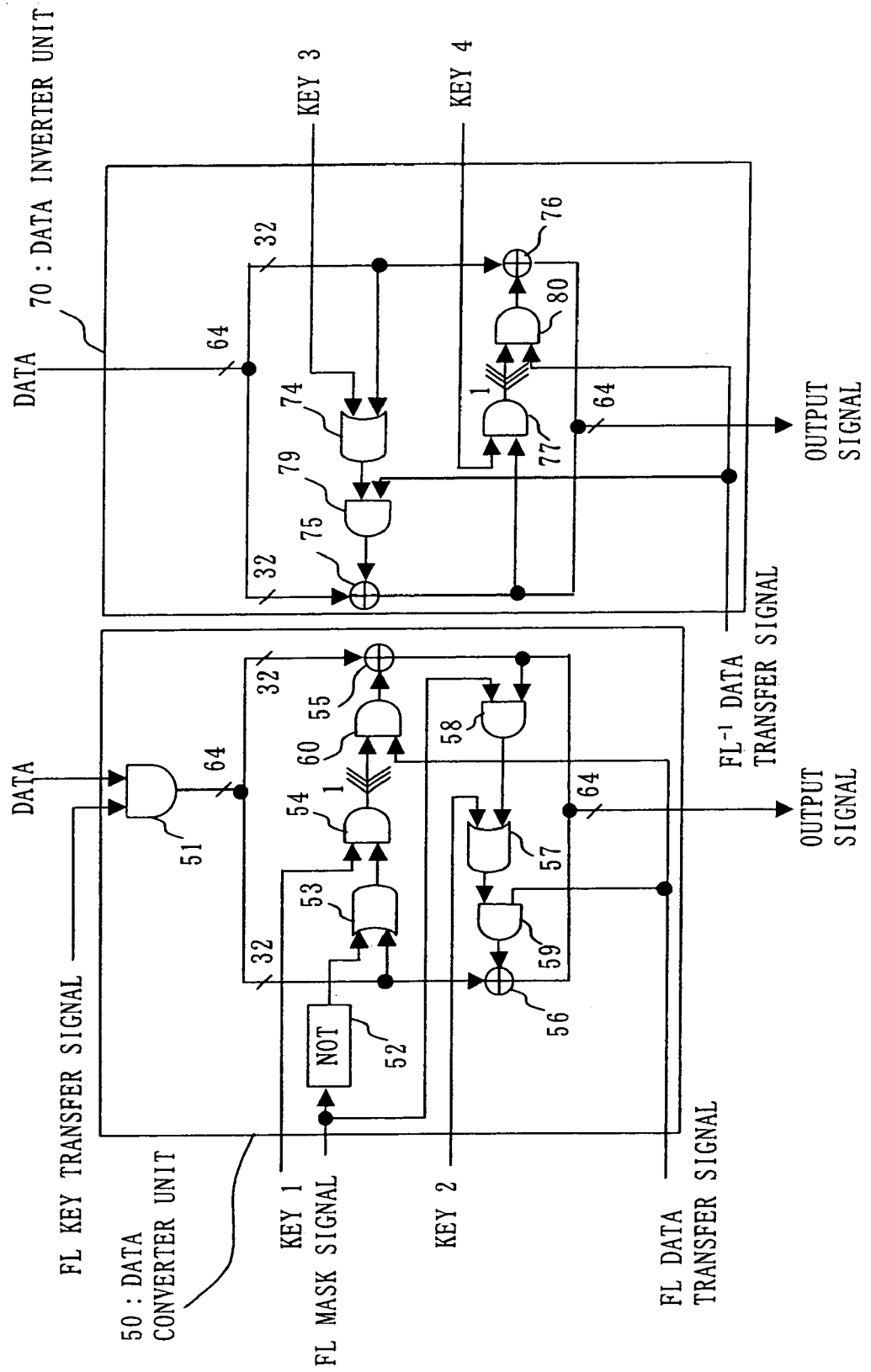
FIG. 21 is a diagram illustrating a configuration of the sub converter 330 in which the data converter unit 50 is provided both with the key transfer function and the data transfer function, and the data inverter unit 70 is provided with the data transfer function.

FIG. 21 is a diagram illustrating a configuration of the sub converter 330 in which the data converter unit 50 is provided both with the key transfer function and the data transfer function and the data inverter unit 70 is provided with the data transfer function.

The operations of the data converter unit 50 and the data inverter unit 70, discussed earlier, will not be reiterated here.

Subordinate Conversion—Sub Converter 330—Data Inverter Unit 70 with Key Transfer Function and Data Transfer Function and Data Converter Unit 50 with Data Transfer Function.

Figure 22:
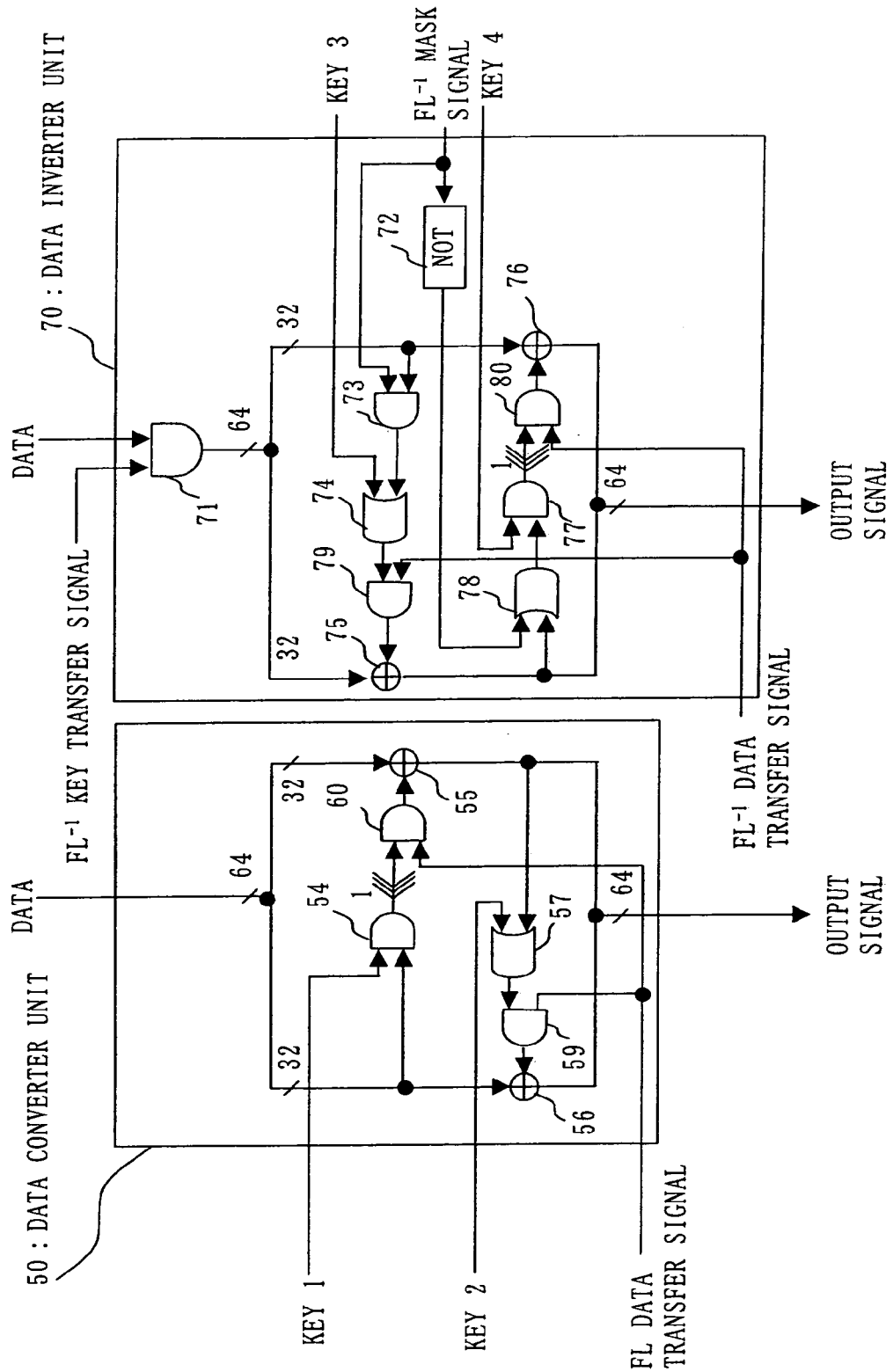
FIG. 22 is a diagram illustrating a configuration of the sub converter 330 in which the data inverter unit 70 is provided with the key transfer function and the data transfer function, and the data converter unit 50 is provided with the data transfer function.

FIG. 22 is a diagram illustrating a configuration of the sub converter 330 in which the data converter unit 50 is provided with the data transfer function and the data inverter unit 70 is provided with the key transfer function and the data transfer function.

The operations of the data converter unit 50 and the data inverter unit 70, discussed earlier, will not be reiterated here.

Subordinate Conversion—Sub Converter 330—Data Converter Unit 50 with Data Transfer Function and Data Inverter Unit 70 with Key Transfer Function.

Figure 23:
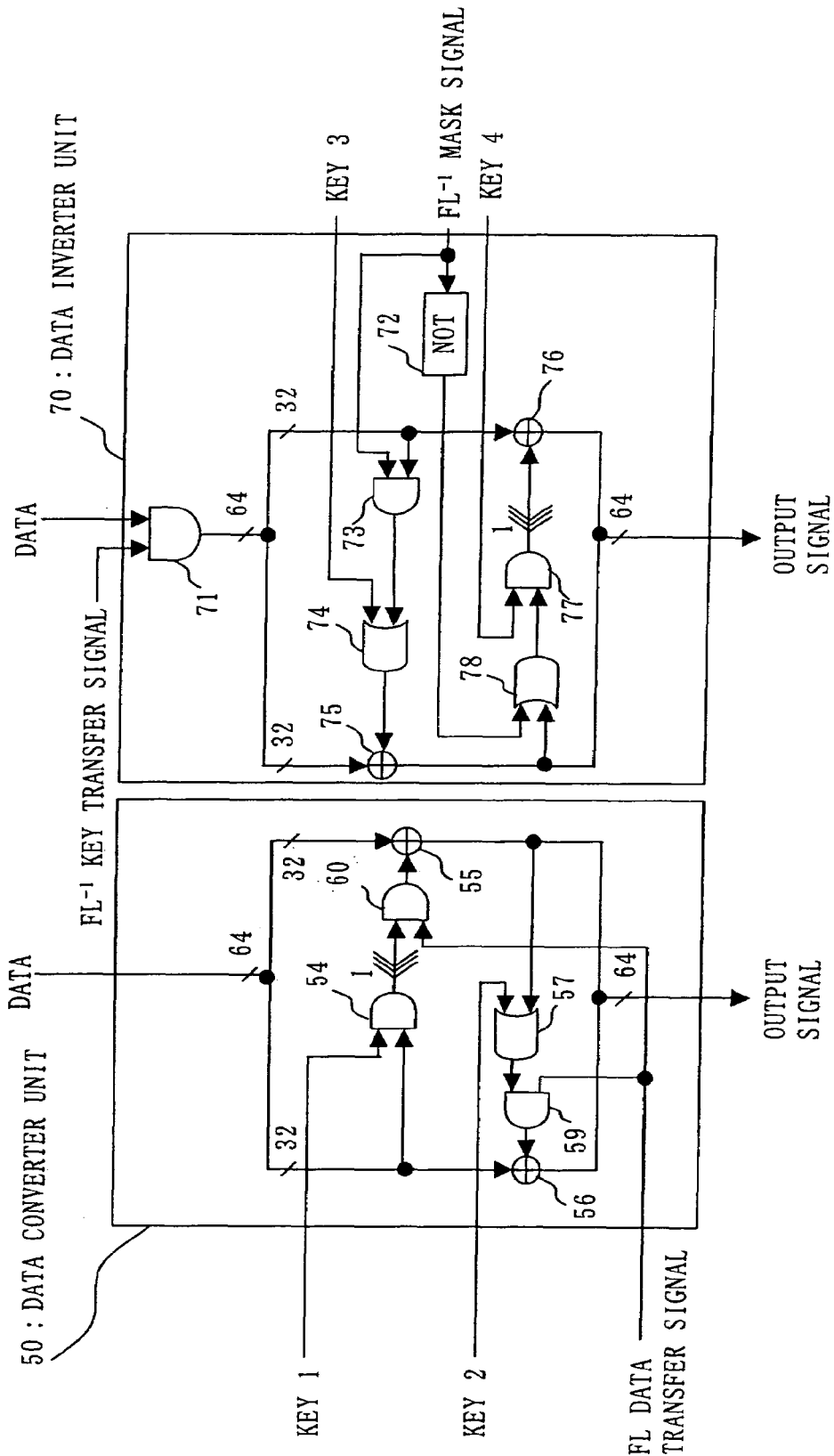
FIG. 23 is a diagram illustrating a configuration of the sub converter 330 in which the data converter unit 50 is provided with the data transfer function, and the data inverter unit 70 is provide with the key transfer function.

FIG. 23 is a diagram illustrating a configuration of the sub converter 330 in which the data converter unit 50 is provided with the data transfer function and the data inverter unit 70 is provide with the key transfer function.

The respective operations thereof, discussed earlier, will not be reiterated here.

Subordinate Conversion—Sub Converter 330—Data Converter Unit 50 with Key Transfer Function and Data Inverter Unit 70 with Data Transfer Function.

Figure 24:
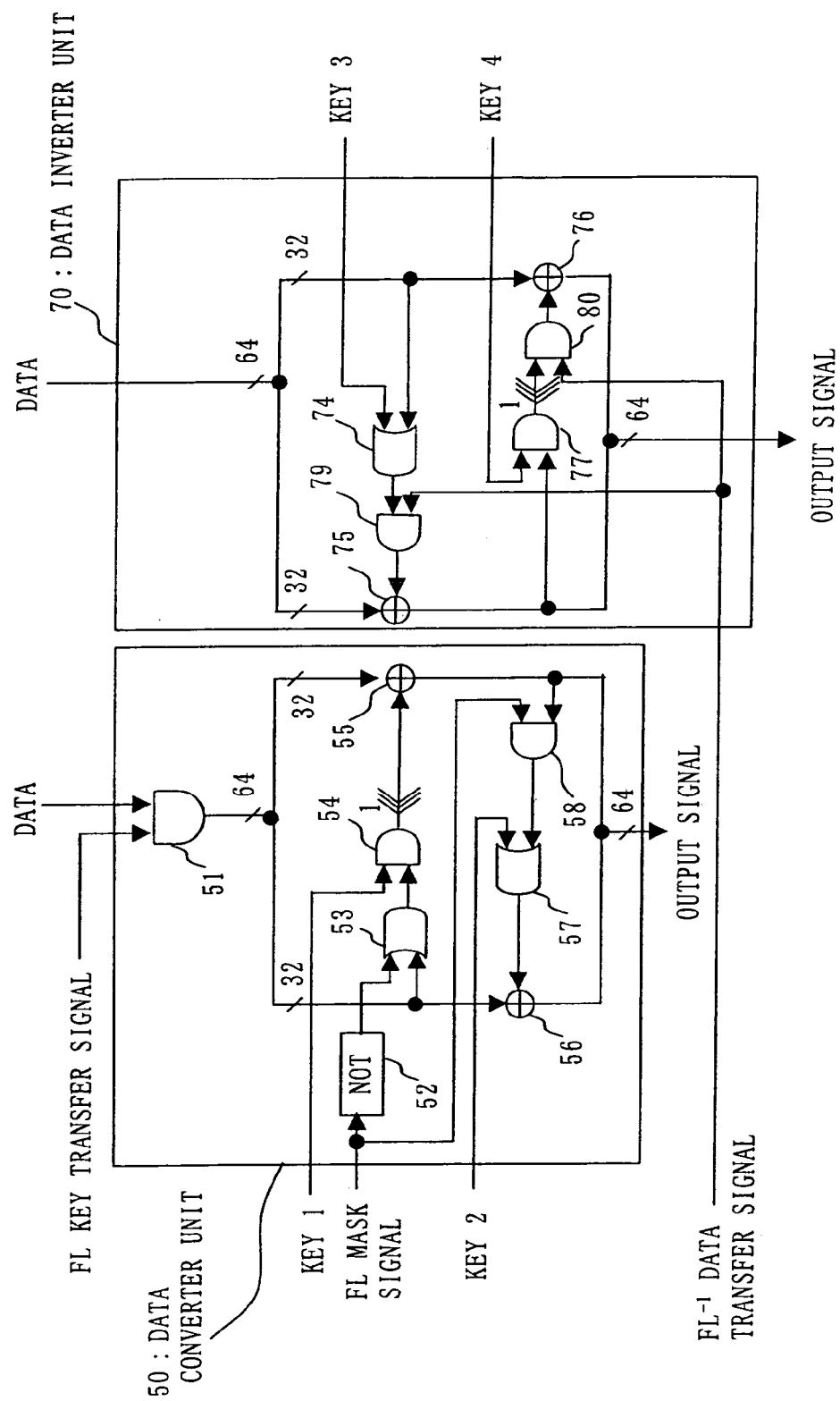
FIG. 24 is a diagram illustrating a configuration of the sub converter 330 in which the data converter unit 50 is provided with the key transfer function, and the data inverter unit 70 is provided with the data transfer function.

FIG. 24 is a diagram illustrating a configuration of the sub converter 330 in which the data converter unit 50 is provided with the key transfer function and the data inverter unit 70 is provided with the data transfer function.

The respective operations thereof, discussed earlier, will not be reiterated here.

Subordinate Conversion—Sub Converter 330—Data Inverter Unit 70 and Data Converter Unit 50 connected in series—Data converter unit 50 and Data Inverter Unit 70 Both with Data Transfer Function.

Figure 25:
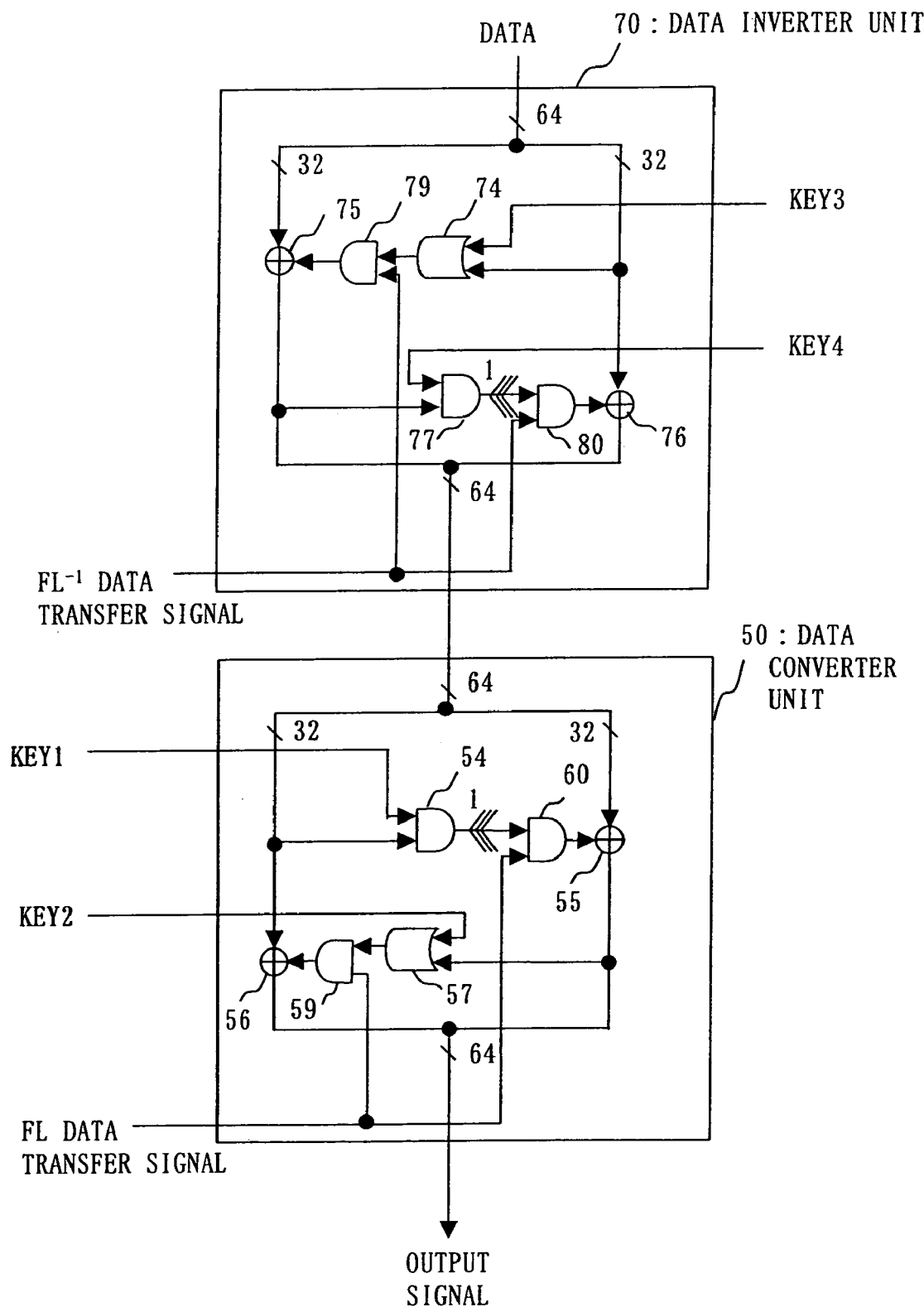
FIG. 25 is a diagram illustrating a configuration of the sub converter 330 in which the data inverter unit 70 and the data converter unit 50 are connected in series, and the data converter unit 50 and the data inverter unit 70 are both provided with the data transfer function.

FIG. 25 is a diagram illustrating a configuration in which the data inverter unit 70 and the data converter unit 50 are connected in series, and the data inverter unit 70 is provided with the data transfer function, and the data converter unit 50 is also provided with the data transfer function.

The respective internal operations thereof, discussed earlier, will not be reiterated here.

With the configuration shown in FIG. 25, data transferred by the data inverter unit 70 is inputted to the data converter unit 50, and then outputted as the output signal that is further transferred by the data converter unit 50.

The data inverter unit 70 and the data converter unit 50 thus arranged in series and connected in series allows the linear data conversion not only performed by both the data converter unit 50 and the data inverter unit 70 but also performed by the data inverter unit 70 alone, or by the data converter unit 50 alone. More particularly, it is possible that data linear converted by the data inverter unit 70 is inputted to the data converter unit 50, where received data is transferred without performing a linear conversion. It is also possible that the data inverter unit 70 transfers data received to the data converter unit 50, and the data converter unit 50 alone performs a linear data conversion.

Accordingly, this is the configuration that is effective for the case where data is to be converted by the data converter unit 50 alone or the data inverter unit 70 alone. The same effect can be achieved by the sub converters 330 shown in FIG. 26 through FIG. 30 in later discussions.

Subordinate Conversion—Sub Converter 330—Data Converter Unit 50 and Data Inverter Unit 70 Connected in Series—Data Converter Unit 50 and Data Inverter Unit 70 Both with Data Transfer Function.

Figure 26:
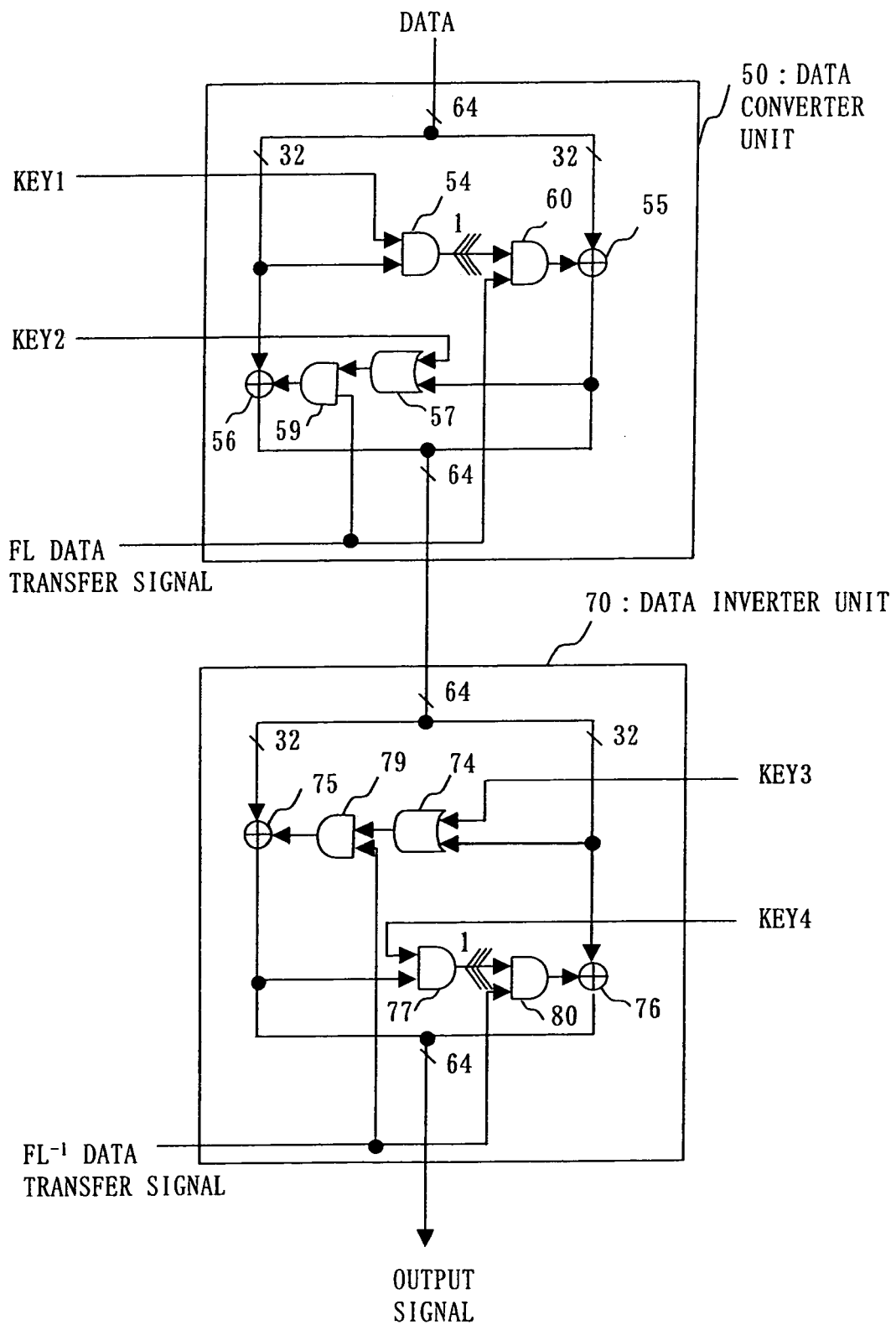
FIG. 26 shows a configuration of the sub converter 330 in which the data converter unit 50 and the data inverter unit 70 of FIG. 25 switch the position thereof.

FIG. 26 shows a configuration of the sub converter 330 in which the data converter unit 50 and the data inverter unit 70 of FIG. 25 reverse the position.

The operation and the effect thereof is the same as those of the sub converter 330 of FIG. 25, and therefore will not be discussed here.

Subordinate Conversion—Sub Converter 330—Data Converter Unit 50 and Data Inverter Unit 70 Connected in Series—Data Converter Unit 50 with Key Transfer Function and Data Transfer Function and Data Inverter Unit 70 Both with Data Transfer Function.

Figure 27:
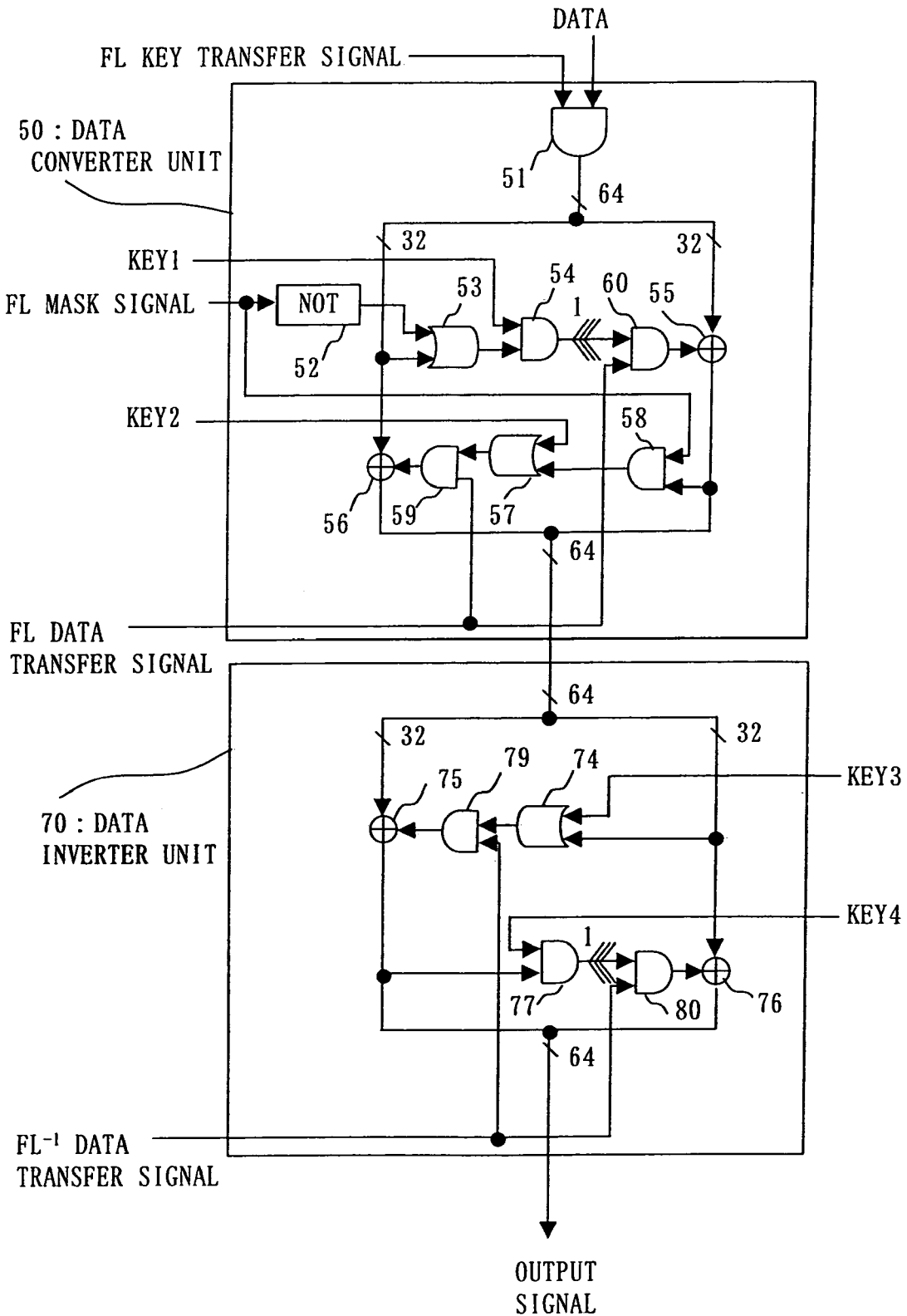
FIG. 27 is a diagram illustrating a configuration of the sub converter 330 in which the data converter unit 50 and the data inverter unit 70 are connected in series, and the data converter unit 50 is provided with the key transfer function and the data transfer function, and the data inverter unit 70 is provided with the data transfer function.

FIG. 27 is a diagram illustrating a configuration of the sub converter 330 in which the data converter unit 50 of FIG. 26 is added with the key transfer function.

The internal configurations and operations of the data converter unit 50 and the data inverter unit 70, discussed earlier, will not be reiterated here.

Subordinate Conversion—Sub Converter 330—Data Inverter Unit 70 and Data Converter Unit 50 Connected in Series—Data Converter Unit 50 with Key Transfer Function and Data Transfer Function and Data Inverter Unit 70 Both with Data Transfer Function.

Figure 28:
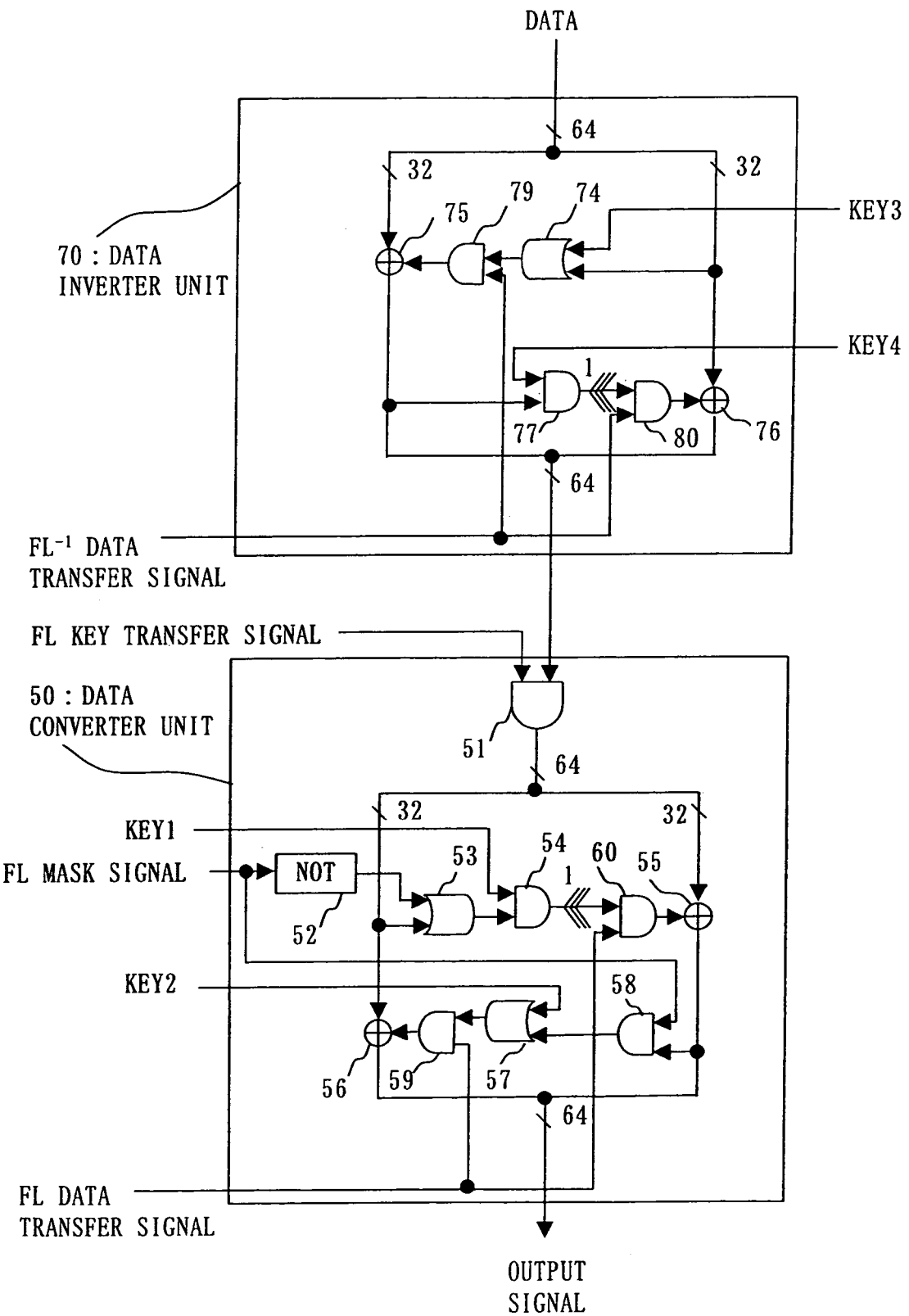
FIG. 28 is a diagram illustrating a configuration of the sub converter 330 in which the data converter unit 50 and the data inverter unit 70 of FIG. 27 switch the position thereof.

FIG. 28 shows a configuration of the sub converter 330 in which the data converter unit 50 and the data inverter unit 70 reverse the position.

The internal configurations and the operations of the data converter unit 50 and the data inverter unit 70, discussed earlier, will not be reiterated here.

Subordinate Conversion—Sub Converter 330—Data Converter Unit 50 and Data Inverter Unit 70 Connected in Series—Data Converter Unit 50 with Data Transfer Function, and Data Inverter Unit 70 with Key Transfer Function and Data Transfer Function.

Figure 29:
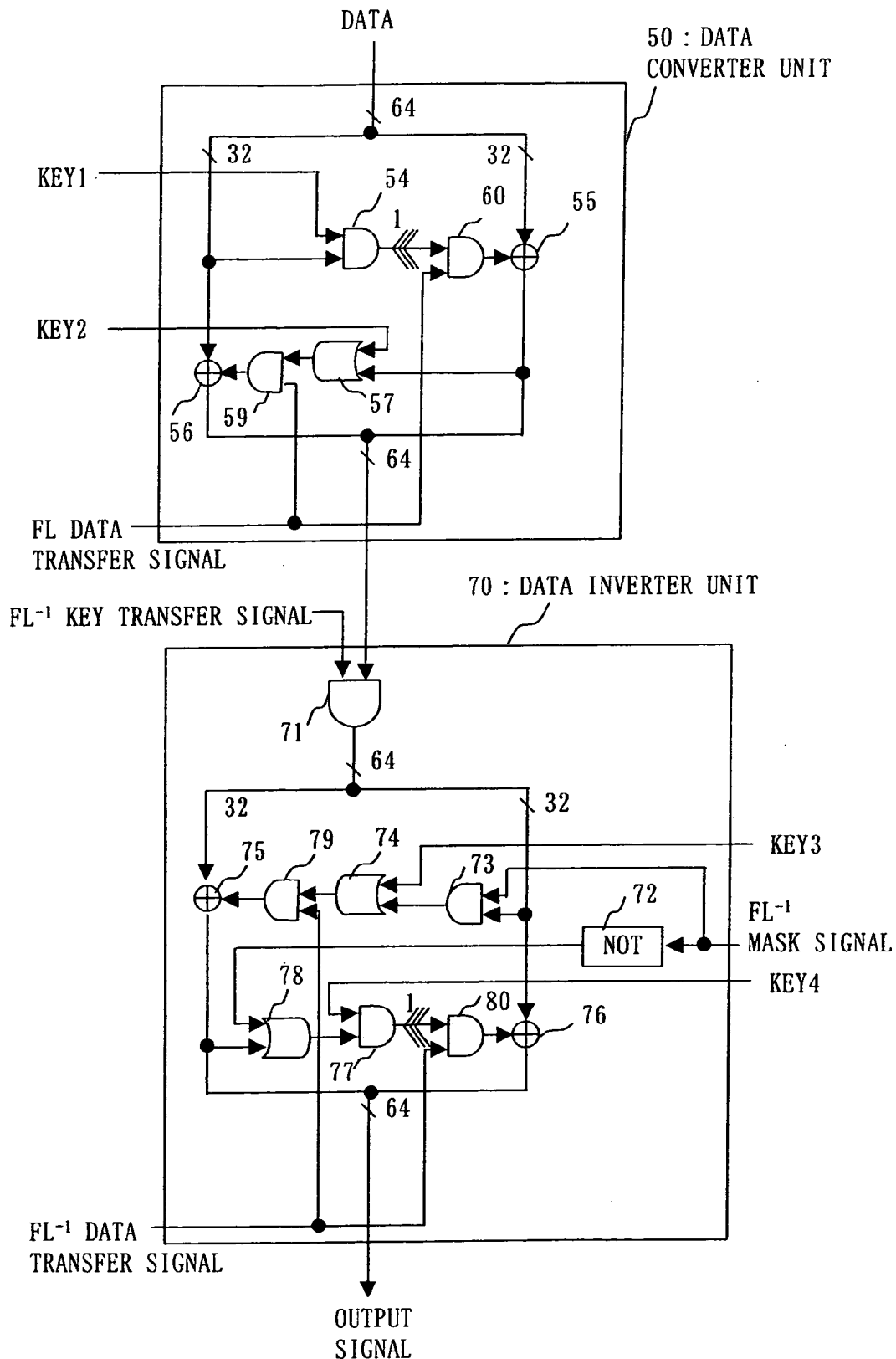
FIG. 29 is a diagram illustrating a configuration of the sub converter 330 in which the data converter unit 50 and the data inverter unit 70 are connected in series, and the data converter unit 50 is provided with the data transfer function, and the data inverter unit 70 is provided with the key transfer function and the data transfer function.

FIG. 29 is a diagram illustrating a configuration in which the data inverter unit 70 of FIG. 26 is added with the key transfer function.

The configurations and operations of the data converter unit 50 and the data inverter unit 70, discussed earlier, will not be reiterated here.

Subordinate Conversion—Sub Converter 330—Data Inverter Unit 70 and Data Converter Unit 50 Connected in Series—Data Converter Unit 50 with Data Transfer Function and Data Inverter Unit 70 with Key Transfer Function and Data Transfer Function.

Figure 30:
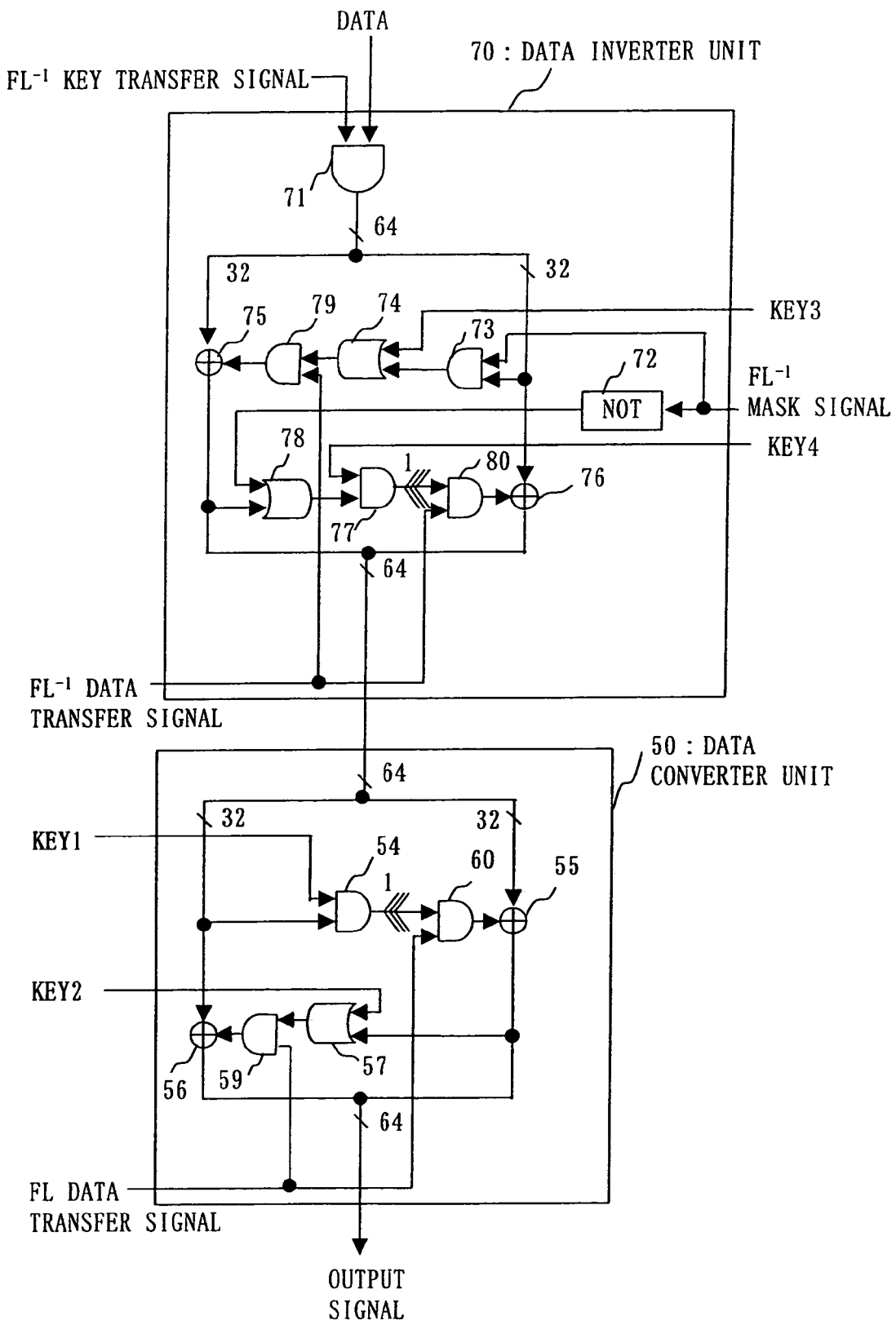
FIG. 30 is a diagram illustrating a configuration of the sub converter 330 in which the data converter unit 50 and the data inverter unit 70 of FIG. 29 switch the order thereof.

FIG. 30 shows a configuration of the sub converter 330 in which the data converter unit 50 and the data inverter unit 70 of FIG. 29 reverse the position.

The internal configurations and the operations thereof, discussed earlier, will not be reiterated here.

Thus, the FL key transfer signal and the $FL^{-1}$ key transfer signal have the function to inhibit and thus nullify input data, and the FL mask signal and the $FL^{-1}$ mask signal have the function to let an input key pass through.

Then, the FL data transfer signal and the $FL^{-1}$ data transfer signal have the function to nullify an input key so as to let data pass through.

All of the six signals mentioned above are transfer signals. Upon no receipt of those transfer signals, the data converter unit 50 and the data inverter unit 70 perform the linear data conversion which they are supposed to do, as shown in the related art.

Subordinate Conversion—Sub Converter 330—Data Converter Unit 50 and Data Inverter Unit 70 Connected in Series—Data Converter Unit 50 and Data Inverter Unit 70 Both with Key Transfer Function and Data Transfer Function.

Figure 62:
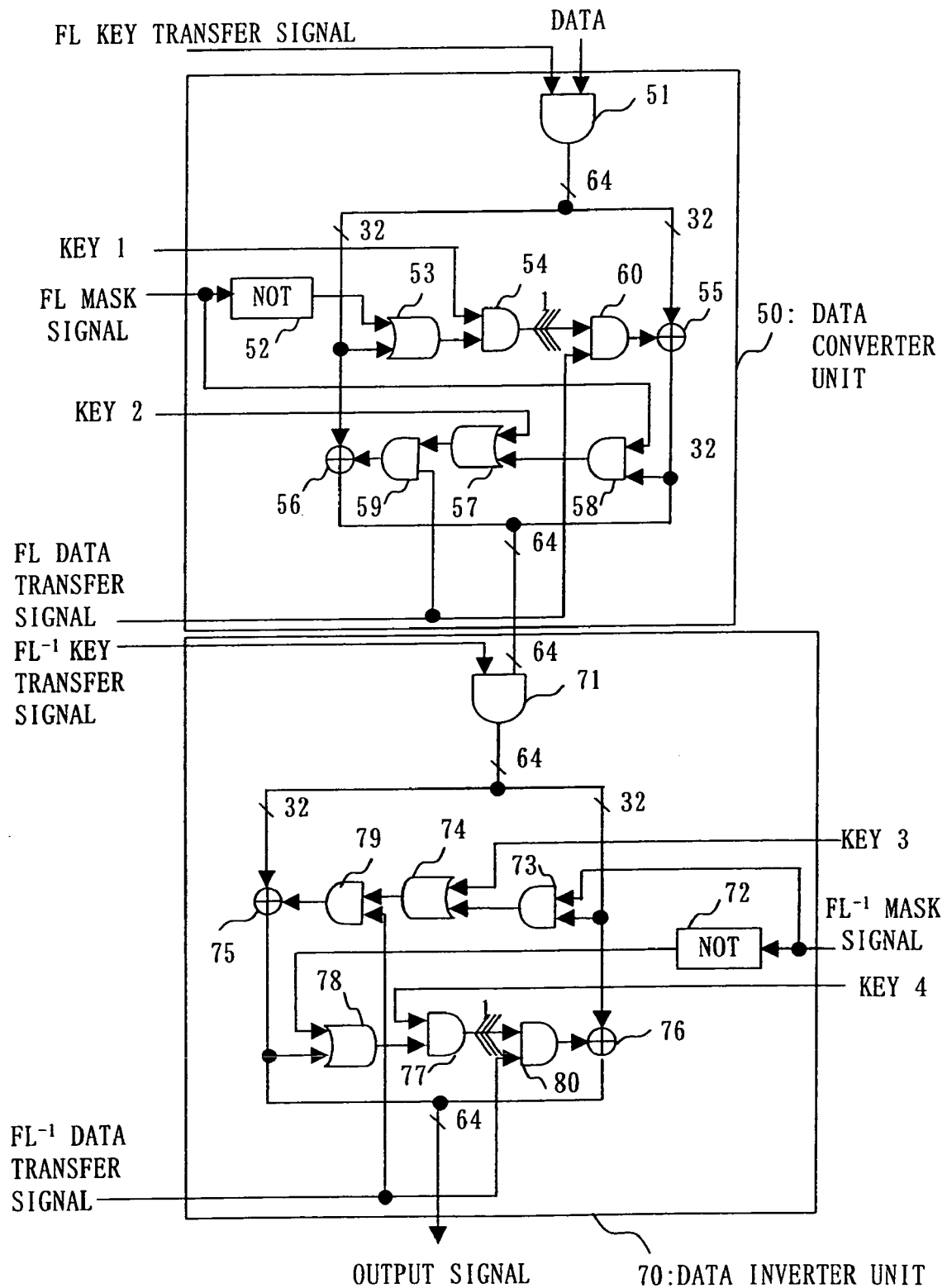
FIG. 62 is a diagram illustrating a configuration of the sub converter 330 in which the data converter unit 50 and the data inverter unit 70 are connected in series, and the data converter unit 50 and the data inverter unit 70 are both provided with the key transfer function and the data transfer function.

FIG. 62 includes the configuration of the data converter unit 50 shown in FIG. 27 and the configuration of the data inverter unit 70 shown in FIG. 29. More particularly, the data converter unit 50 and the data inverter unit 70 connected in series are both provided with the key transfer function and the data transfer function.

The configurations and the operations of the data converter unit 50 and the data inverter unit 70, discussed earlier, will not be reiterated here.

Subordinate Conversion—Sub Converter 330—Data Inverter Unit 70 and Data Converter Unit 50 Connected in Series—Data Converter Unit 50 and Data Inverter Unit 70 Both with Key Transfer Function and Data Transfer Function.

Figure 63:
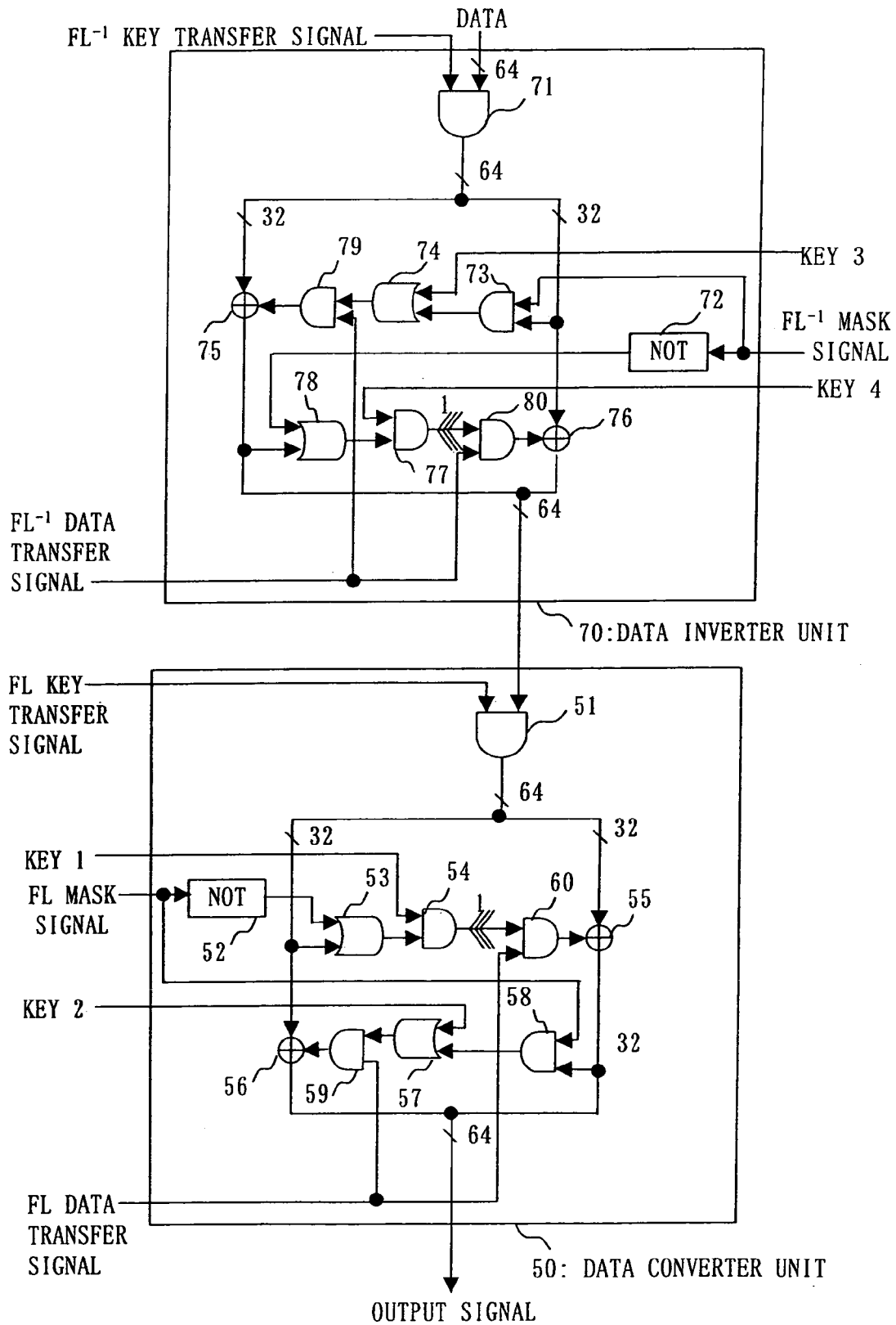
FIG. 63 is a diagram illustrating a configuration of the sub converter 330 in which the data converter unit 50 and the data inverter unit 70 of FIG. 62 switch the position thereof.

FIG. 63 shows a configuration of the sub converter 330 in which the data converter unit 50 and the data inverter unit 70 of FIG. 62 reverse the position.

The internal configurations and the operations thereof, discussed earlier, will not be reiterated here.

EMBODIMENT 4

In this embodiment, a description will be given of a configuration and an operation of a ½ sub converter unit 90, in which the data converter unit 50 and the data inverter unit 70 are implemented on a shared circuit, which is provided with the key transfer function and the data transfer function.

Subordinate Conversion—Sub Converter 330—½ Sub Converter Unit 90 with Key Transfer Function and Data Transfer Function.

Figure 31:
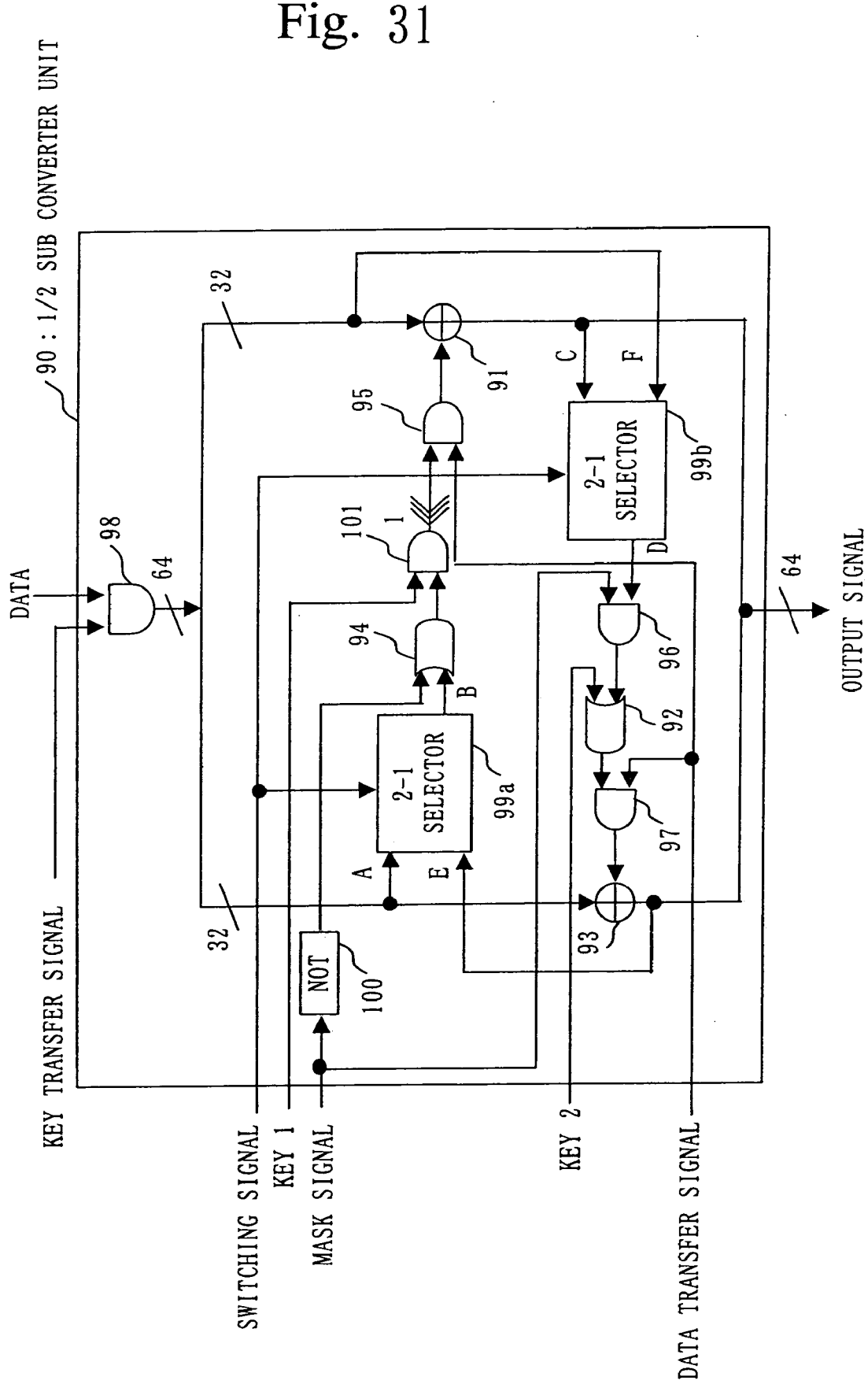
FIG. 31 is a diagram illustrating a configuration of the sub converter 330 in which a ½ sub converter unit 90 is added with the key transfer function and the data transfer function according to a fourth embodiment.

FIG. 31 is a diagram illustrating a configuration of the sub converter 330 in which the ½ sub converter unit 90 is added with the key transfer function and the data transfer function.

Figure 59:
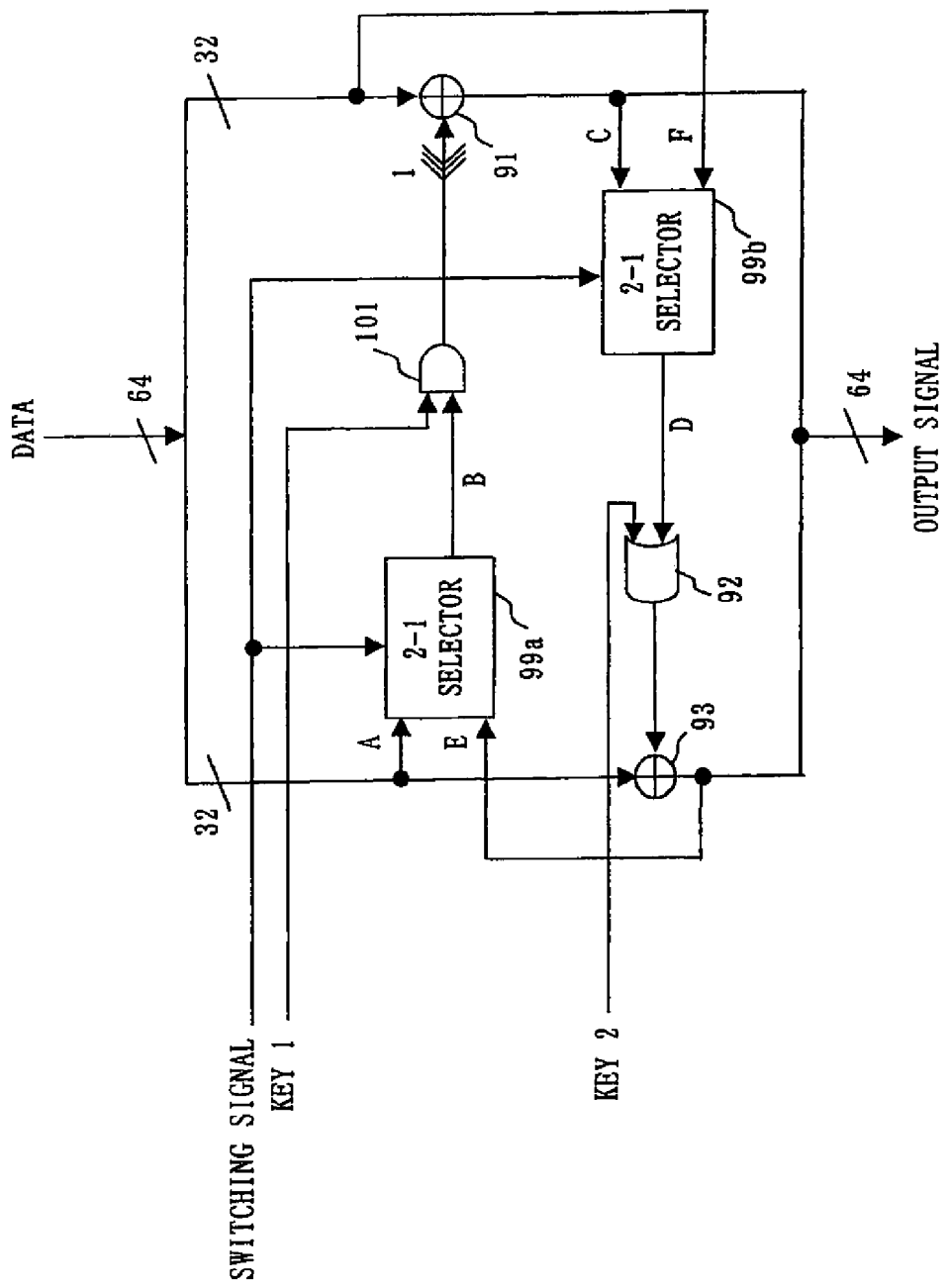
FIG. 59 is a diagram illustrating a circuit shared by the data converter unit 50 and the data inverter unit 70 that make up the sub converter 330.

In contrast with FIG. 59 explained in the related art, the key transfer signal, the mask signal, and the data transfer signal are added. Then, in connection with those transfer signals being inputted, additional circuits are provided for transferring a key and data.

First, a switching signal is a signal for switching between the data converter unit 50 and the data inverter unit 70. In the case where the signal A is selected by the switching signal from among the signal A and the signal E inputted to the 2-1 selector 99*a*, and then outputted as the output signal B, and the signal C is selected by the switching signal from among the signal C and the signal F inputted to the 2-1 selector 99*b*, and then outputted as the output signal D, the ½ sub converter unit 90 performs the same data conversion as that performed by the data converter unit 50.

On the other hand, in the case where the 2-1 selector 99*a* selects the signal E as the output signal B by the switching signal, and the 2-1 selector 99*b* selects the signal F as the output signal B by the switching signal, the ½ sub converter unit 90 performs the same data conversion as that performed by the data inverter unit 70.

In the case where the ½ sub converter unit 90 functions as the data converter unit 50 by the switching signal, the operation illustrated in FIG. 31 is the same as that performed by the data converter unit 50 shown in FIG. 18. Specifically, the key transfer signal corresponds to the FL key transfer signal of FIG. 18, the mask signal corresponds to the FL mask signal of FIG. 18, and the data transfer signal corresponds to the FL data transfer signal of FIG. 18.

More particularly, each circuit corresponds as follows. A circuit 98 corresponds to the AND circuit 51 (FIG. 18). A circuit 91 corresponds to the EXOR circuit 55 (FIG. 18). A circuit 95 corresponds to the AND circuit 60 (FIG. 18). A circuit 101 corresponds to the AND circuit 54 (FIG. 18). A circuit 94 corresponds to the OR circuit 53 (FIG. 18). A circuit 100 corresponds to the NOT circuit 52 (FIG. 18). A circuit 96 corresponds to the AND circuit 58 (FIG. 18). A circuit 92 corresponds to the OR circuit 57 (FIG. 18). A circuit 97 corresponds to the AND circuit 59 (FIG. 18). A circuit 93 corresponds to the EXOR circuit 56 (FIG. 18).

The ½ sub converter unit 90, with such correspondence, can fulfill the function of the data converter unit 50 of FIG. 18. More particularly, it becomes possible that the ½ sub converter unit 90 performs a data conversion, and also transfer the key (key 1, key 2), upon receipt of the key transfer signal, by outputting an input key as the output signal. Those operations discussed above are the same as those of the data converter unit 50 of FIG. 18, and therefore will not be discussed here.

In the case where the ½ sub converter unit 90 functions as the data inverter unit 70 by the switching signal, the operation of the ½ sub converter unit 90 of FIG. 31 is the same as that of the data inverter unit 70 of FIG. 18. Specifically, the key transfer signal corresponds to the $FL^{-1}$ key transfer signal of FIG. 18, the mask signal corresponds to the $FL^{-1}$ mask signal of FIG. 18, and the data transfer signal corresponds to the $FL^{-1}$ data transfer signal of FIG. 18.

More particularly, each circuit corresponds as follows. The circuit 98 corresponds to the AND circuit 71 (FIG. 18), the circuit 91 corresponds to the EXOR circuit 76 (FIG. 18), the circuit 95 corresponds to the AND circuit 80 (FIG. 18), the circuit 101 corresponds to the AND circuit 77 (FIG. 18), the circuit 94 corresponds to the OR circuit 78 (FIG. 18), the circuit 96 corresponds to the AND circuit 73 (FIG. 18), the circuit 92 corresponds to the OR circuit 74 (FIG. 18), the circuit 97 corresponds to the AND circuit 79 (FIG. 18), and the circuit 93 corresponds to the EXOR circuit 75 (FIG. 18).

The ½ sub converter unit 90, with such correspondence, can fulfill the function of the data inverter unit 70_of FIG. 18. More particularly, it becomes possible that the ½ sub converter unit 90 performs an inverse data conversion, and also transfers the key (key 3, key 4), upon receipt of the key transfer signal, by outputting an input key as the output signal. Those operations discussed above are the same as those of the data inverter unit 70 of FIG. 18, and therefore will not be discussed here.

Subordinate Conversion—Sub Converter 330—½ Sub Converter Unit 90 with Data Transfer Function.

Figure 32:
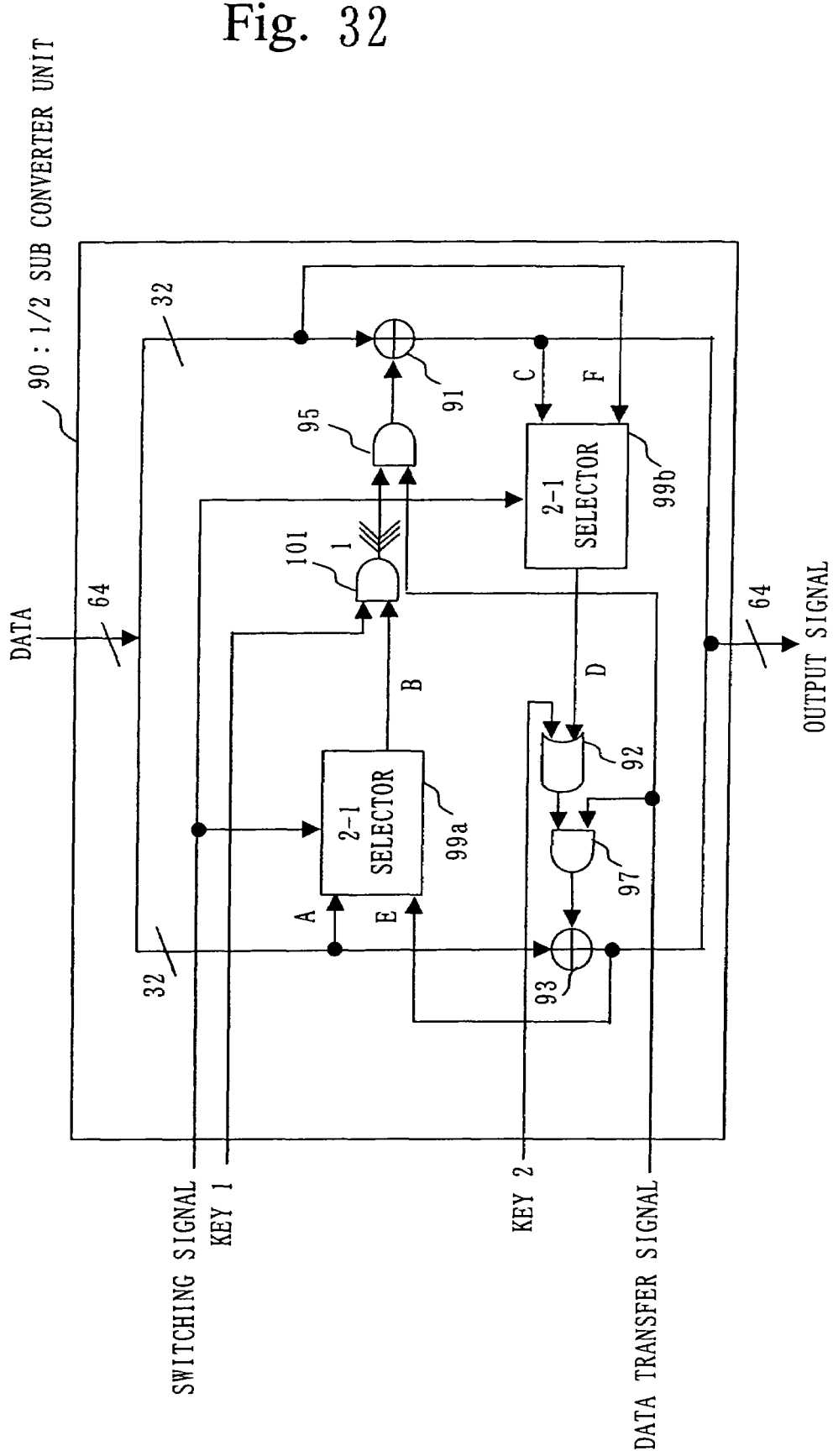
FIG. 32 is a diagram illustrating a configuration of the sub converter in which the ½ sub converter unit 90 is added with the data transfer function.

FIG. 32 is a diagram illustrating a configuration of the sub converter in which the ½ sub converter unit 90 is added with the data transfer function.

Like the case of FIG. 31, the ½ sub converter unit 90 has the same function as that of the data converter unit 50 of FIG. 13 in the case where the signal A is selected by the 2-1 selector 99*a* and the signal C is selected by the 2-1 selector 99*b*. In this case, the data transfer signal corresponds to the FL data transfer signal.

The ½ sub converter unit 90, on the other hand, has the same function as that of the data inverter unit 70 of FIG. 14 in the case where the signal E is selected by the 2-1 selector 99*a* and the signal F is selected by the 2-1 selector 99*b* by the switching signal. In this case, the data transfer signal corresponds to the $FL^{-1}$ data transfer signal.

The ½ sub converter unit 90, thus configured, can perform a data conversion, and also transfer data without performing the data conversion by outputting data upon receipt of the transfer signal indicating a data transfer.

Those operations, discussed earlier, will not be reiterated here.

Subordinate Conversion—Sub Converter 330—½ Sub Converter Unit 90 with Key Transfer Function.

Figure 33:
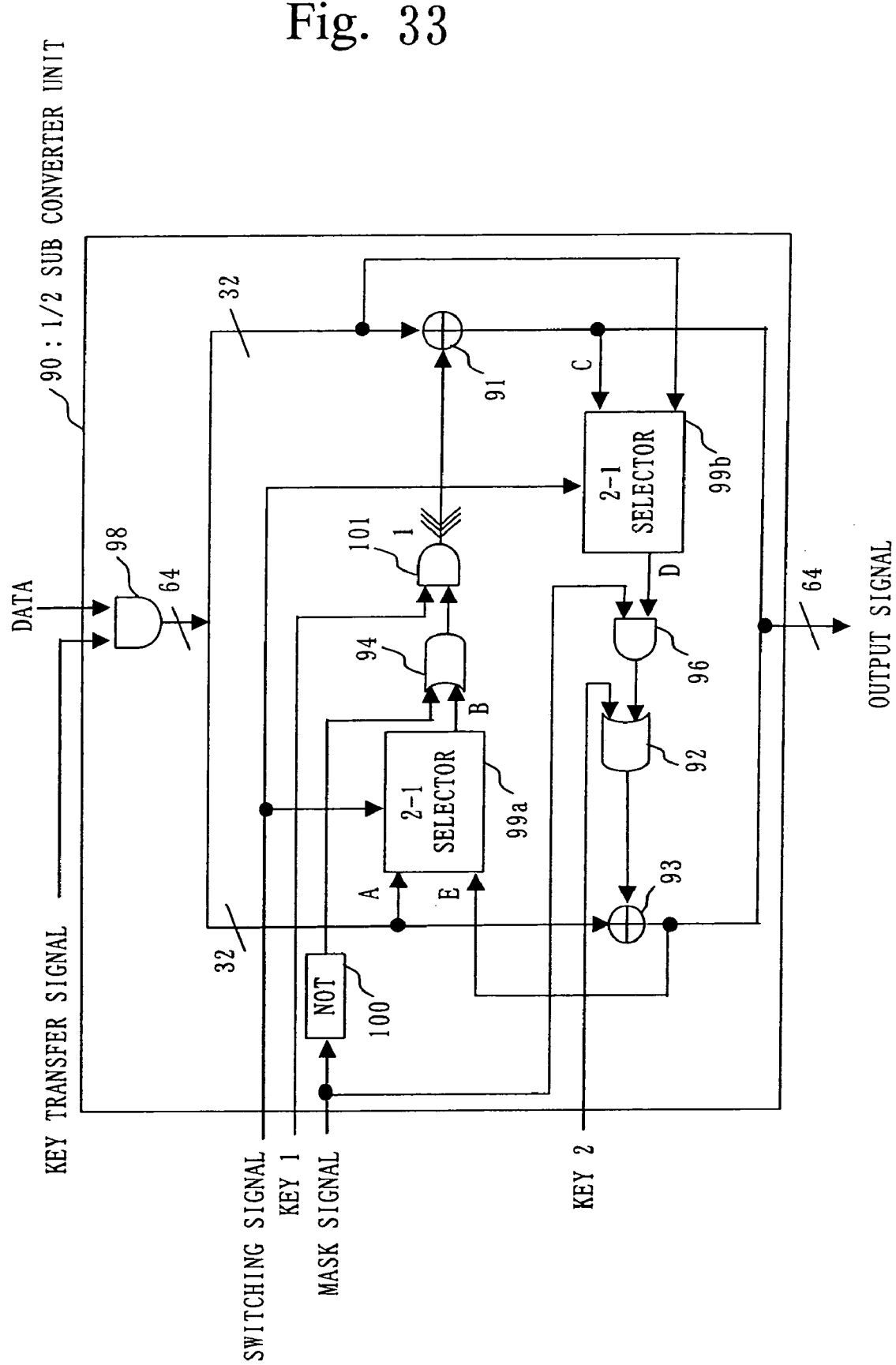
FIG. 33 is a diagram illustrating a configuration of the sub converter 330 in which the ½ sub converter unit 90 is added with the key transfer function.

FIG. 33 is a diagram illustrating a configuration of the sub converter 330 in which the ½ sub converter unit 90 is added with the key transfer function.

Like the case of FIG. 31, the ½ sub converter unit 90 functions the same as the data converter unit 50 of FIG. 10 in the case where the signal A is selected by the 2-1 selector 99a and the signal C is selected by the 2-1 selector 99b. In this case, the key transfer signal and the mask signal correspond to the FL key transfer signal and the FL mask signal, respectively.

The ½ sub converter unit 90, on the other hand, functions the same as the data inverter unit 70 of FIG. 11 in the case where the signal E is selected by the 2-1 selector 99a and the signal F is selected by the 2-1 selector 99b by the switching signal. In this case, the key transfer signal and the mask signal correspond to the $FL^{-1}$ key transfer signal and $FL^{-1}$ mask signal, respectively.

The ½ sub converter unit 90 thus configured can perform a data conversion, and also transfer data without performing the data conversion by outputting data upon receipt of a transfer signal indicating a data transfer.

Those operations, discussed earlier, will not be reiterated here.

As discussed in this embodiment, the ½ sub converter unit 90 configured to implement the data converter unit 50 and the data inverter unit 70 on the shared circuit is thus provided with the key transfer function and the data transfer function. This allows reducing the size of the data conversion apparatus over all by reducing the size of the sub converter 330 and by preventing the increase of selectors that results from the elimination of the necessity of the key paths and the data paths achieved as discussed earlier.

With reference to the first through fourth embodiments, the data conversion apparatuses for block cipher were discussed focusing on the configurations of CAMELLIA. However, the sub converters 330 provided with the transfer function discussed above are also applicable to any data conversion apparatus performing block cipher, such as CAMELLIA, MISTY, KASUMI.

The data conversion apparatuses discussed with reference to FIG. 1, FIG. 6, or FIG. 7, may have one or two 2-1 selectors which are included in the selector 310.

In comparison to that, the data conversion apparatus of the related art discussed earlier requires three 2-1 selectors in order to select one output signal from among four signals as shown in FIG. 56.

In addition, in the case of the data conversion apparatus using ½ F function shown in FIG. 60, four 2-1 selectors are required in order to select one output signal from among five input signals.

Consequently, the data conversion apparatuses shown in FIG. 1, FIG. 6, or FIG. 7 allows reducing the number of selectors included in the data scrambler 30 in comparison with the data conversion apparatus of the related art.

Furthermore, with reference to the data conversion apparatus shown in FIG. 7, the main converter 320 and the sub converter 330 are arranged in parallel, and thereby a selector 340 is required. The selector 340 is made up of a single 2-1 selector that receives two output signals outputted from the main converter 320 and the sub converter 330, respectively, and selects one signal from among the two signals received. Thus, there are two 2-1 selectors are required for the selector 310 and the selector 340 in FIG. 7.

Accordingly, the data conversion apparatus shown in FIG. 7 also allows reducing the number of selectors included in the data scrambler 30 in comparison with the data conversion apparatus of the related art.

EMBODIMENT 5

In this embodiment, a description will be given of block cipher CAMELLIA in which the main converter 320 and the sub converter 330 are arranged in parallel.

CAMELLIA supports a block length of 128 bits, and a key length of 128, 192 or 256 bits is available for use.

The algorithm structure is the FEISTEL structure characterized earlier. Basically, the encryption process and the decryption process can be implemented on the same hardware or software.

Figure 54:
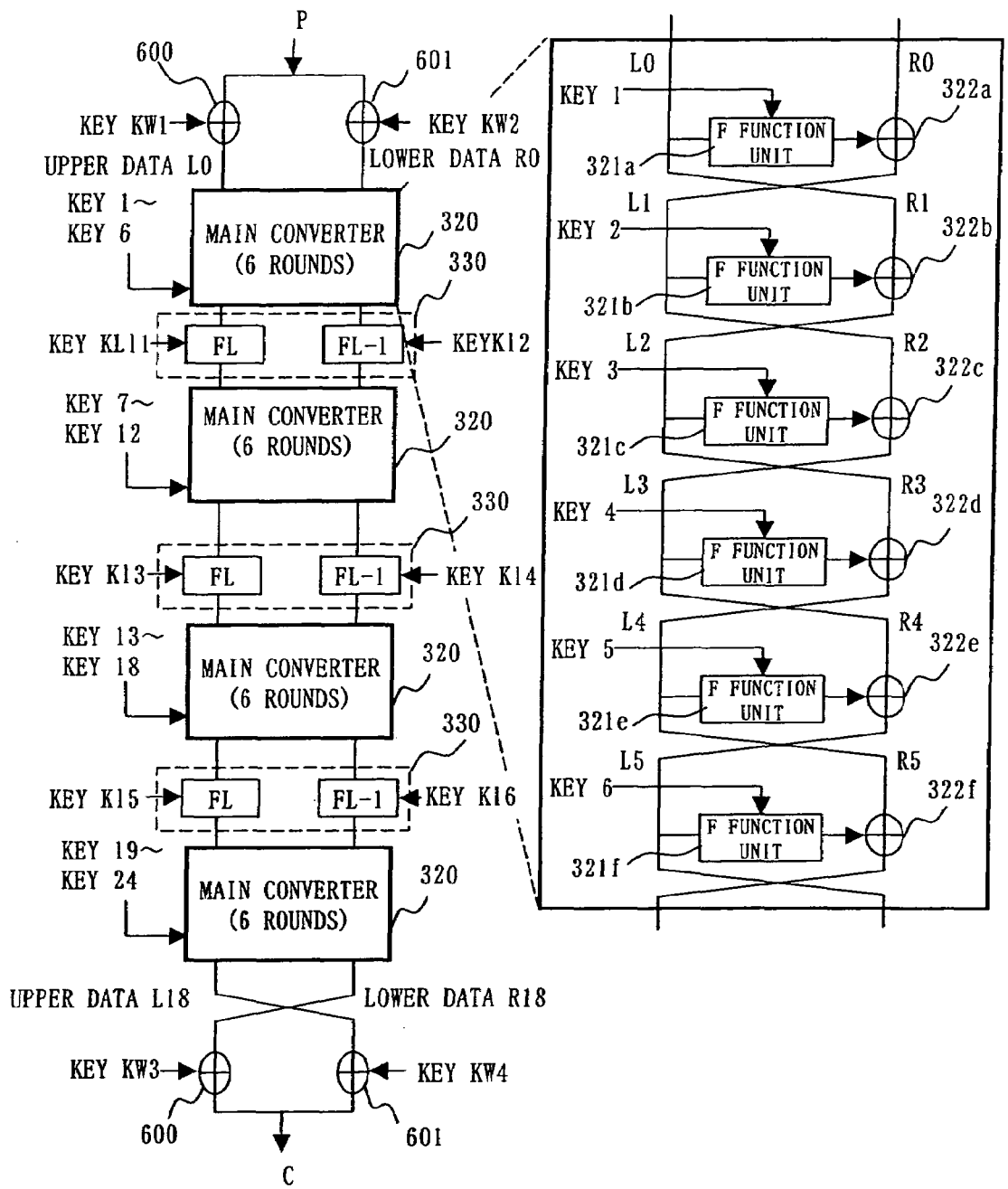
FIG. 54 is a diagram illustrating a data encryption process performed in a data conversion apparatus of CAMELLIA using a 192- or 256-bit key.
Figure 55:
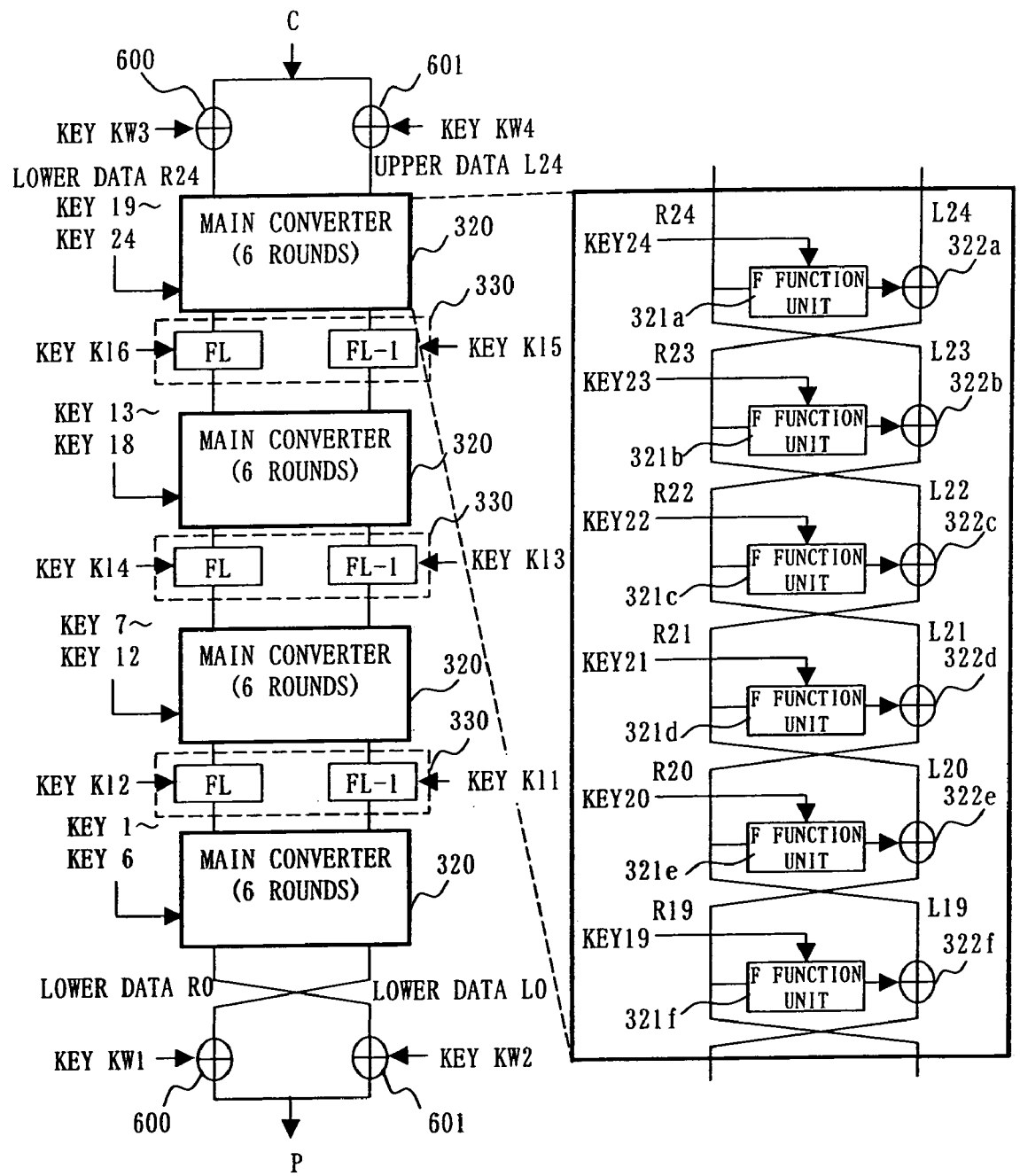
FIG. 55 is a diagram illustrating a data decryption process performed in a data conversion apparatus of CAMELLIA using a 192- or 256-bit key.

The F function is key-length dependent, that is, 18 rounds for a 128-bit key (6 rounds×' of the main converter 320 of FIG. 34) and 24 rounds for a 192- or 256-bit key as shown in FIG. 54 and FIG. 55. FIG. 54 and FIG. 55 will be discussed later.

Figure 34:
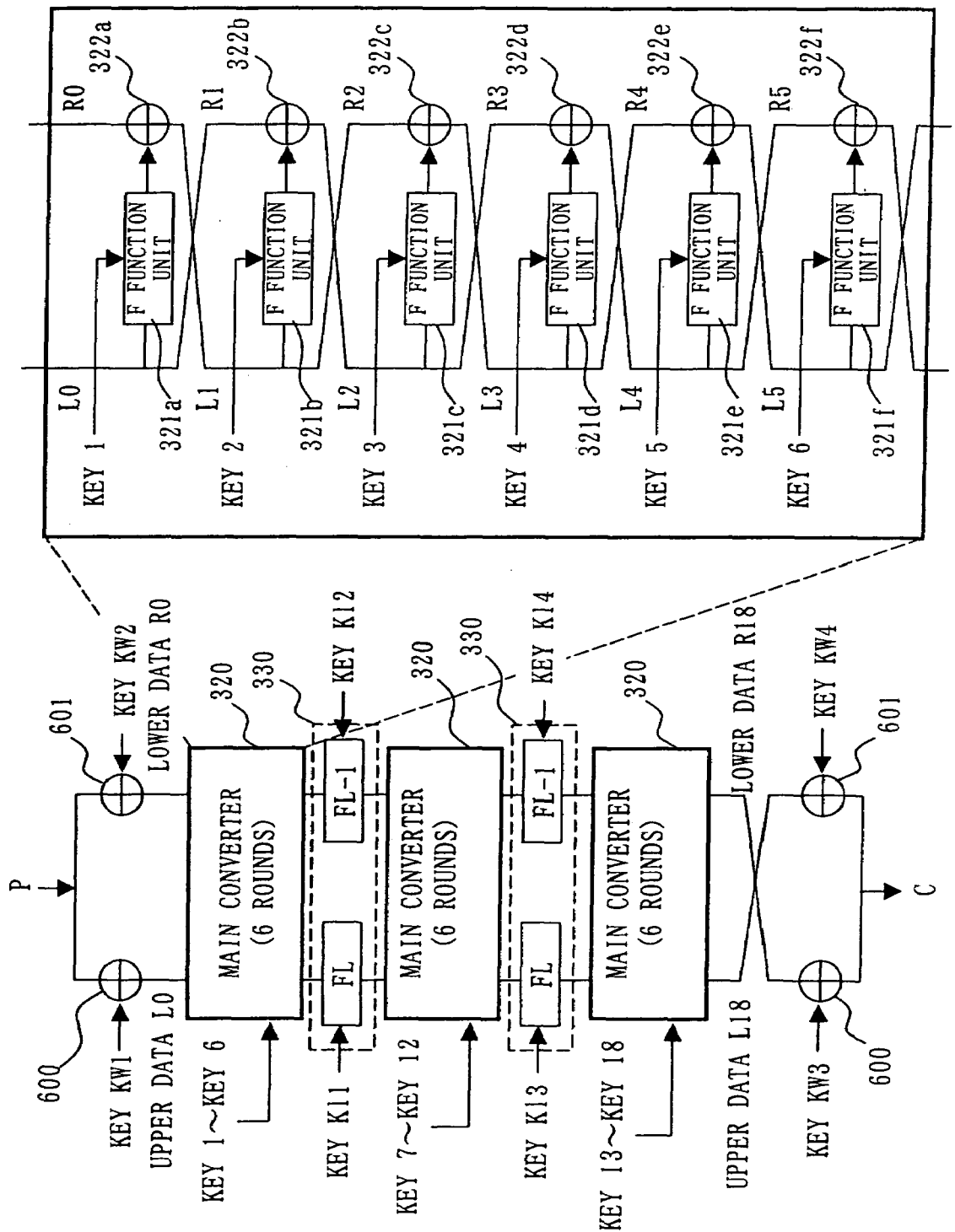
FIG. 34 is a diagram illustrating a data encryption process performed in a data conversion apparatus of CAMELLIA using a 128-bit key.

FIG. 34 is a diagram illustrating an encryption process of CAMELLIA for a 128-bit key. Specifically, FIG. 34 shows the case where P (plaintext) is subject to a data conversion (data decryption) using the main converter 320 and the sub converters 330, and then C (ciphertext) is outputted. With FIG. 34, FL (a data conversion function) and $FL^{-1}$ (a data inverse conversion function) are placed between each six-round F function.

FIG. 34 on the left shows the same operation as that performed by the data scrambler 30 of FIG. 4. Particularly, the EXOR circuit 31a and the EXOR circuit 31b of FIG. 4 correspond to an EXOR circuit 600 and an EXOR circuit 601 of FIG. 34, respectively, and in practice, EXOR included in the sub converter 330 operate the process. It is to be assumed that all the input keys shown in FIG. 34 have been scheduled and outputted from the key scheduler as shown in FIG. 4.

FIG. 34 on the right shows a diagram that is the same as that of FIG. 57.

Figure 35:
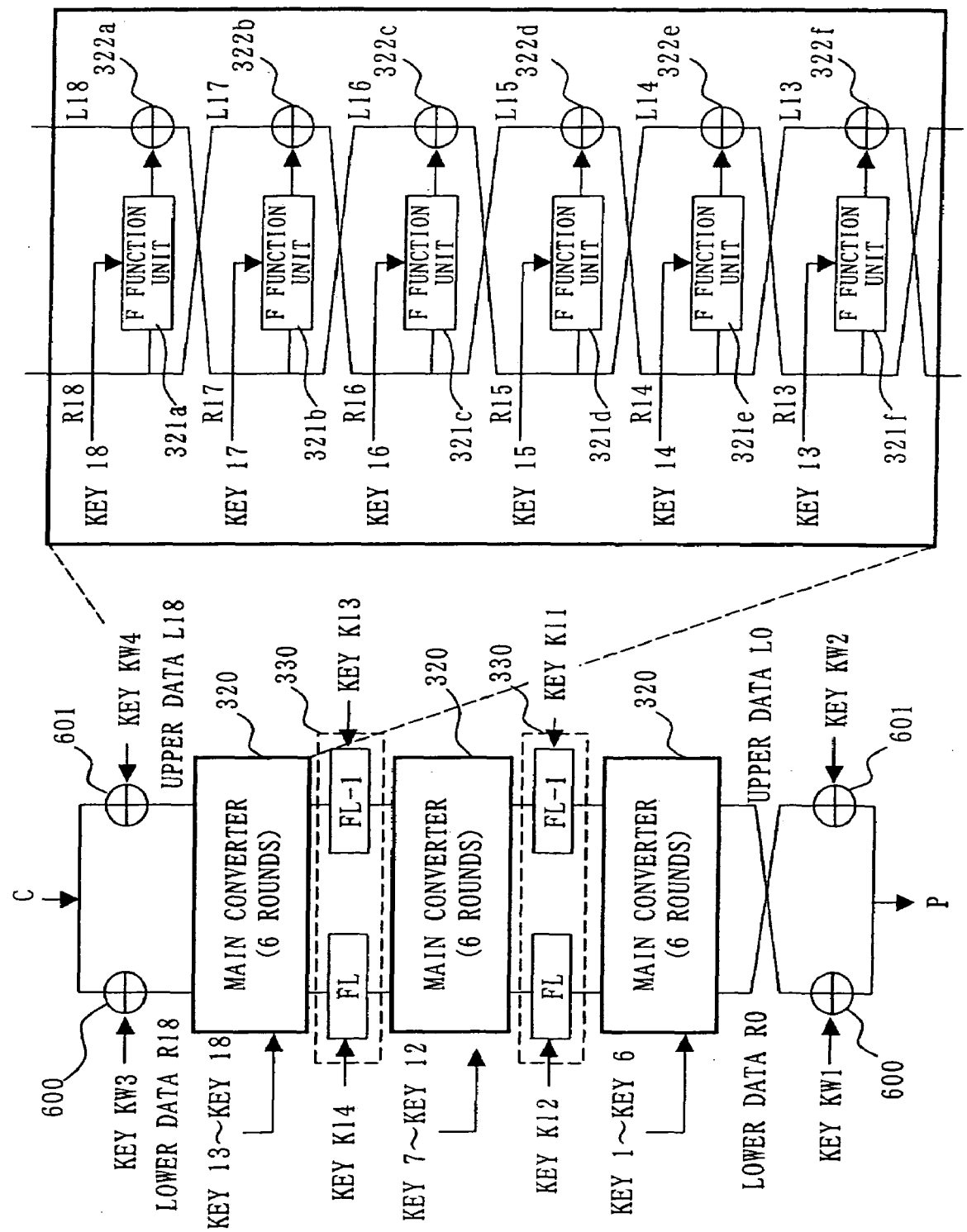
FIG. 35 is a diagram illustrating a data decryption process performed in a data conversion apparatus of CAMELLIA using a 128-bit key.

FIG. 35 is a diagram illustrating a decryption process of CAMELLIA for a 128-bit key.

FIG. 35 shows the case where C (ciphertext) is subject to a data conversion using the main converter 320 and the sub converter 330, and then P (deciphertext) is outputted.

Operations shown in FIG. 34 and FIG. 35, discussed earlier, will not be reiterated here.

A description will now be given of an inside of the F function of CAMELLIA in detail.

Figure 36:
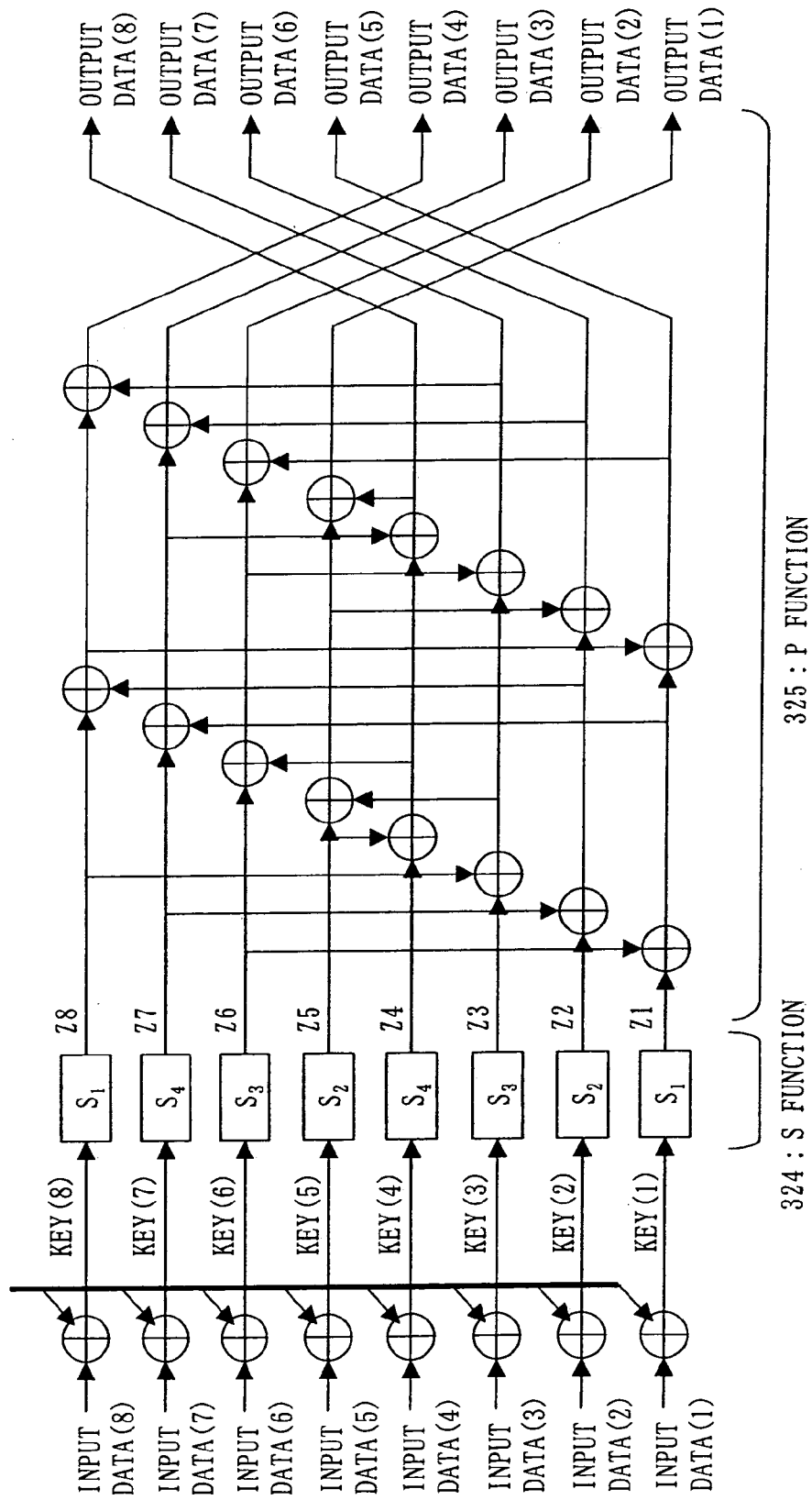
FIG. 36 is a diagram illustrating an internal configuration of the F function in a data conversion apparatus of CAMELLIA.

FIG. 36 is a diagram illustrating an internal configuration of the F function of CAMELLIA.

The F function of CAMELLIA employs SPN structure inside, and data is basically processed in units of eight bits for input data (1) through input data (8). The F function of CAMELLIA includes an S function 324 that is made up of S-boxes, and linear conversion by exclusive ORs (EXOR) that is called a P function 325.

In the F function 321, at the beginning, input data (1) through input data (8) which are respectively eight bit long, are inputted, then the 64 bits of the input data are XORed with 64 bits of eight-bit keys (1) through. (8), respectively, and then outputted. Output data is inputted to the S function 324, and then nonlinear converted on a byte basis by the S function 324 that synthesizes the inverse arithmetic operation of $GF(2^8)$ and affine conversion.

The data is then subject to an exclusive OR based linear conversion by the P function 325. Through these operations, data is scrambled, and then outputted as output data (1) through output data (8).

The F function of CAMELLIA supports a data width of 64 bits. FIG. 36 shows two sets of S-boxes $S_1$ through $S_4$ provided in the S function 324 (one set of $S_1$, $S_2$, $S_3$, and $S_4$ from the bottom of FIG. 36 and another set of $S_2$, $S_3$, $S_4$, and $S_1$ above it).

Therefore, as shown in FIG. 36, the process may also be done by first handling the input data (1) through the input data (4) for data conversion, and then handling the remaining input data of the input data (5) through the input data (8). With this case, in the second round of data conversion, in order to use the circuit as it is with the S-boxes being arranged in the order of $S_1$ to $S_4$, data is to be subject to the advance one-byte rotation shift, and then the input data (5) through the input data (8) that have been subjected to the advance rotation shift are inputted. This allows data to correspond to S-boxes $S_1$ through $S_4$ without changing the structure of the S function 324.

Thus, the F function implements a nonlinear data conversion through the operations of EXOR (exclusive OR) between keys and input data, two rounds of operations by the four types of S function ($S_1$ through $S_4$), and operations by the P function 325. The typical operation of CAMELLIA, including the S function 324 by the S-boxes (inverse arithmetic circuit on GF ($2^8$)+affine conversion) $S_1$ through $S_4$, the P function 325, the data conversion function (FL), and the inverse data conversion function ($FL^{-1}$), can be implemented by a simple combination of Boolean algebras.

A description will now be given of an overall configuration and an operation of CAMELLIA in detail.

Figure 37:
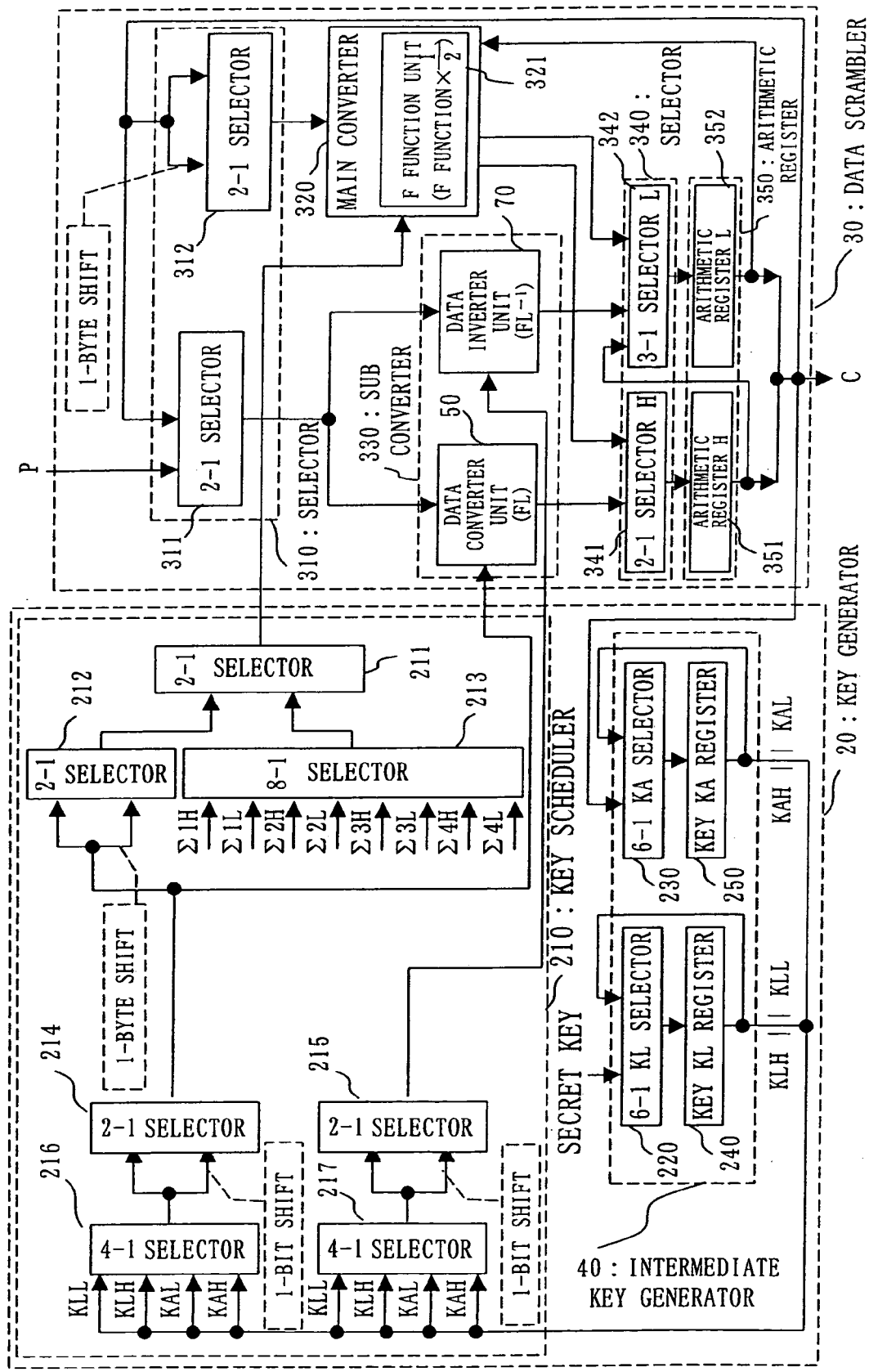
FIG. 37 is a diagram illustrating an overall configuration and operation according to a fifth embodiment.

FIG. 37 is a diagram illustrating an overall configuration and an operation of CAMELLIA.

With CAMELLIA, if the secret key to be input is a 128-bit key, the key is extended internally to a 256-bit key, and the key extended as the extended key is used for data encryption/decryption.

If the secret key to be input is a 192- or 256-bit key, the key is extended internally to a 512-bit key to be used for data encryption/decryption. The case of a 192- or 256-bit key will be discussed later.

First, a description will now be given of a structural feature of CAMELLIA.

The whole algorithm of CAMELLIA is implemented through repeated operations of the same F function by the main converter 320. The F function is configured as shown in FIG. 36.

At the data scrambler 30, as the EXOR circuit 31a and the EXOR circuit 31b of FIG. 4 illustrate, an exclusive OR is performed between the input or output data, and a key. This is called whitening.

Also, at the data scrambler 30, the sub converter 330 including data conversion (FL) and data inverse conversion ($FL^{-1}$) is placed between the main converters 320 including six-round F function. This is shown in FIG. 34 and FIG. 35.

As aforementioned, the extended key (an intermediate key +an output key) is generated as shown in FIG. 2.

This shows that the data conversion apparatus for implementing CAMELLIA algorithm may be configured with the sub converter 330 including data conversion (FL) and inverse data conversion ($FL^{-1}$), the P function 325, and the four types of S-boxes.

The P function 325 may become smaller by being written based on the writing method instructed in the "Specification of Camellia—a 128-bit Block Cipher".

Specifically, according to the aforementioned specification, the P function may be written as follows.

$z1'=z1+z3+z4+z6+z7+z8$ $z2'=z1+z2+z4+z5+z7+z8$ $z3'=z1+z2+z3+z5+z6+z8$ $z4'=z2+z3+z4+z5+z6+z7$ $z5'=z1+z2+z6+z7+z8$ $z6'=z2+z3+z5+z7+z8$ $z7'=z3+z4+z5+z6+z8$ $z8'=z1+z4+z5+z6+z7$

"+" in the equations above for computing z1' through z8' indicates an exclusive OR operation.

The z1 through z8 are outputs from S1, S2, 53, S4, S5 (=S2), S6 (=S3), S7 (=S4), and S8 (=S1), respectively. Now, if z5 through z8 is converted into zz2, zz3, zz4, and zz1, respectively, then the results are as follows.

$z1'=z1+z3+z4+zz1+zz3+zz4$ $z2'=z1+z2+z4+zz1+zz2+zz4$ $z3'=z1+z2+z3+zz1+zz2+zz3$ $z4'=z2+z3+z4+zz2+zz3+zz4$ $z5'=z1+z2+zz1+zz3+zz4$ $z6'=z2+z3+zz1+zz2+zz4$ $z7'=z3+z4+zz1+zz2+zz3$ $z8'=z1+z4+zz2+zz3+zz4$

Based on this, to operate in two clocks, such as to operate S1 through S4 for outputting Z1 through Z4 and to operate S1 through S4 for outputting zz1 through zz4, etc., allows reducing the circuit of the P function approximately by half of size.

A description will now be given of a data conversion apparatus for CAMELLIA with reference to FIG. 37.

The data conversion apparatus for CAMELLIA shown in FIG. 37 includes the main converter 320 and the sub converter 330 arranged in parallel.

The sub converter 330 includes the data converter unit 50 and the data inverter unit 70.

The main converter 320 has the F function unit consisting of ½ F function. In the case where the main converter 320 is configured with the F function of less than one F function, i.e., $½^x$ ($x \geq 1$) F function, as exemplified with the ½ F function of FIG. 61, an output result from the EXOR circuit 1322a, which is an intermediate result of the process by the F function unit 1321a and the process by the F function unit 1321b, is to be held.

In general, if reducing the number of units of the F function installed and employing a method of implementing a one-round F function based data conversion by plural times of loop architecture, then the size of the circuit for the F function is reduced. However, the number of control circuits for controlling the loop and the number of circuits such as selectors for inputting keys to each F function are increased. Thus, there is a trade-off relation between the circuit size for the F function and the circuit size for loop control.

Therefore, in pursuit of downsizing a data conversion apparatus for CAMELLIA, a study is needed on the number of the F function to be installed and the times of repetitions. More specifically, a careful study should be carried out on whether to implement a data conversion apparatus for CAMELLIA by a single the F function installed in the main converter 320, whether to reduce the number of S-boxes installed in the F function and achieve a one-round F function based data conversion through an operation in several cycles, etc. This is a study on the trade-off relation between the reduction in size of the circuit by employing the F function unit of less than one F function and the increase in the size of the circuit by employing the loop accompanied by the increase in the number of selectors, etc.

Further with CAMELLIA, as aforementioned, as the function to generate the output key (key KA), part of the main converter 320 in the data scrambler 30 is used. For this reason, another careful study is needed also on an effect from the increase of selectors, etc. which is added to use the F function of the data scrambler 30.

As discussed with reference to FIG. 36, with the F function of CAMELLIA, the four types of S-boxes ($S_1$, $S_2$, $S_3$, and $S_4$) for 8-bit input/output are used twice each. Then, another study is needed here on whether to install eight units of the S-boxes, or to install four units with twice-repetition, or the like.

According to "On Hardware Implementation of 128-bit Block Ciphers (III)" disclosed in Proceedings of the 2001 Symposium on Cryptograph and Information Security, the size of the circuit for a single S-box includes approximately 200 gates, and therefore if the number of S boxes is reduced by four from 8 to 4, then approximately 800 gates can be reduced.

On the other hand, at least 32 units of 2-1 selectors (approximately 100 gates of NAND circuits) are required for repetitions which is in the trade-off relation.

From this fact, it is expected that the circuit becomes smaller with installing four units of S-boxes with twice-repetition rather than installing eight units.

Thus, with the F function unit 321 of the data conversion apparatus for CAMELLIA, a data conversion may be done once with eight units of S-boxes installed, and alternatively a data conversion may be done with four units of S-boxes installed involving twice-repetition of data conversion. Either can be used. However, in view of the size of the circuit, the one with twice-repetition of data conversion is desirable.

In the case of using the CAMELLIA algorithm shown in FIG. 37, data encryption/decryption can be implemented by the cycle of the intermediate generate 40 according to this sequence.

Processing steps of intermediate key generator 40 cycle will now be described below.

First, in step 1, Whitening is performed using the sub converter 330.

Then, in step 2, an operation is performed for half of one round of the F function (½ F function) using the main converter 320.

Similarly, in step 3, an operation is performed for the other half of one round of the F function (½ F function) using the main converter 320.

In step 4 through step 13, the step 2 and the step 3 are repeated five times.

In step 14, an operation is performed for the data conversion (FL) function and the inverse data conversion (FL-1) function of the sub converter 330 for data conversion.

Then, in step 15 through step 27, step 2 through step 14 are repeated.

Then, in step 28 through step 39, step 2 through step 13 are repeated.

Last, in step 40, the same Whitening as that of step S1 is performed.

Note here that step 1 indicates the operation performed by the EXOR circuit 31a of FIG. 4, and step 40 indicates the operation performed by the EXOR circuit 31b of FIG. 4. In other words, the EXOR circuit 31a and the EXOR circuit 31b operate using the EXORs of the data converter unit 50 and the data inverter unit 70, respectively, in the sub converter 330.

The configuration and the operation of the key generator 20 are the same as those discussed earlier, and therefore will not be reiterated here.

In the step 2 and the step 3 discussed above, a single F function based data conversion is performed in two cycles by the main converter 320. An operation of this data process will now be discussed in detail with reference to FIG. 37 and FIG. 64.

Figure 61:
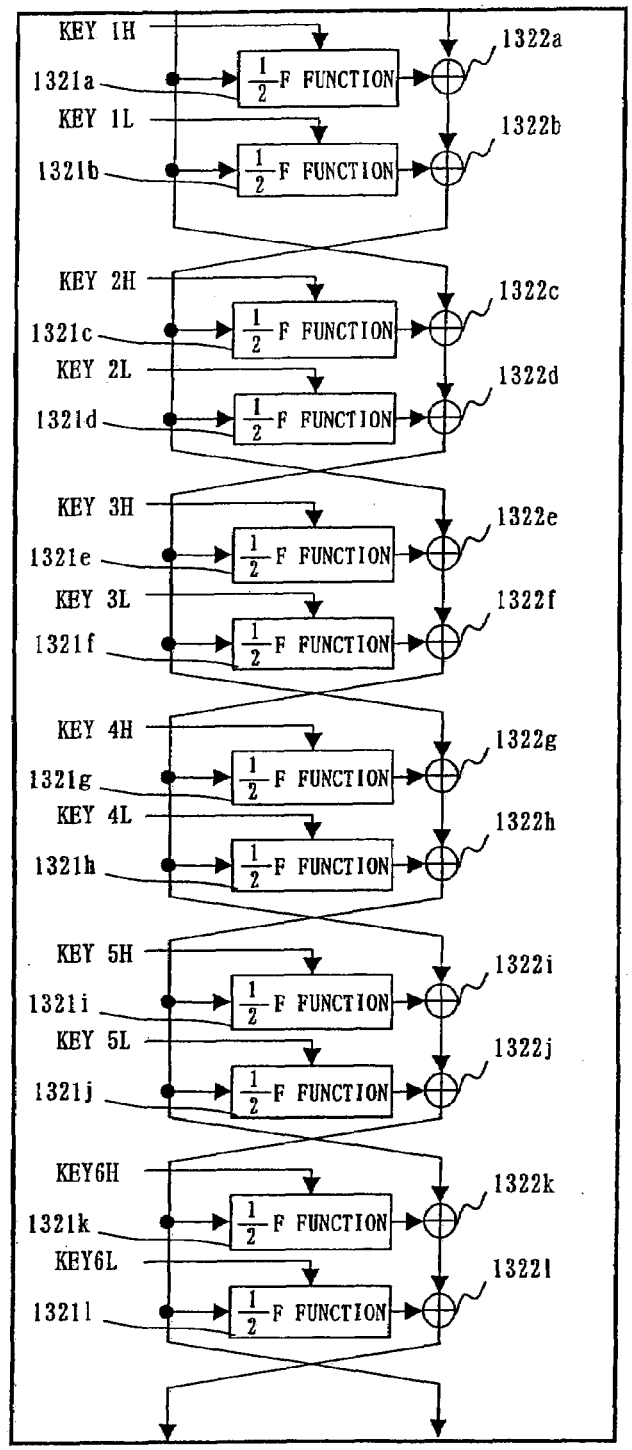
FIG. 61 shows another example of the internal configuration of the main converter 320.
Figure 64:
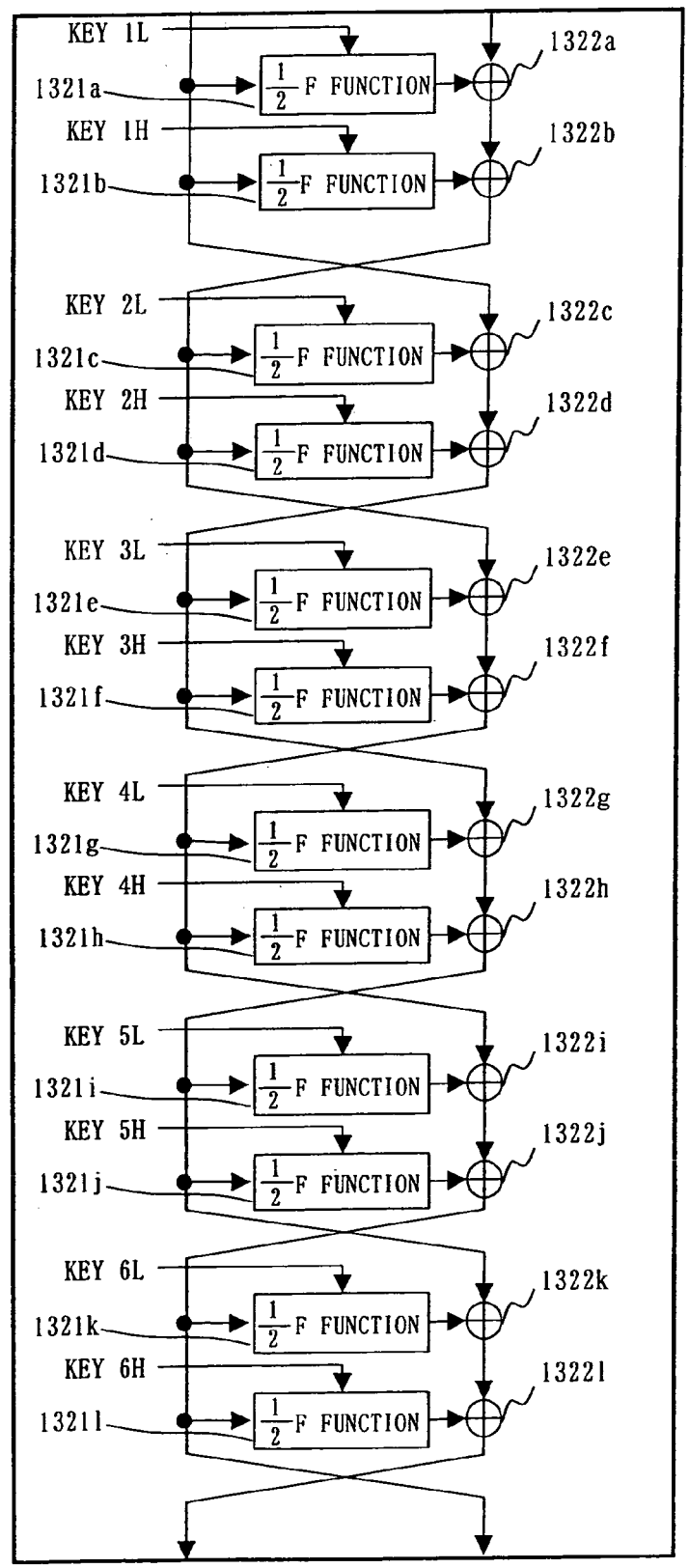
FIG. 64 shows an internal configuration of the main converter 320 of CAMELLIA.

FIG. 64 is different from FIG. 61 such that a lower key is inputted first as an input key and then an upper key is inputted to implement the process.

First, an operation of step 1 will be discussed in detail. Input data P (plaintext or deciphertext) is selected by a 2-1 selector 311 and divided into upper data and lower data. Upper data is subject to Whitening by the data converter unit 50 in the sub converter 330, and lower data is inputted to the data inverter unit 70 in the sub converter 330 and subject to Whitening similarly. The upper data and the lower data subjected to Whitening are inputted to a 2-1 selector H 341 and a 2-1 selector L 342 in a 2-1 selector 340, respectively. Each piece of the input data is selected by the 2-1 selector H 341 or the 2-1 selector L 342, and then held in an arithmetic register H 351 or an arithmetic register L 352, respectively.

An operation of the step 2 will now be discussed.

The upper bits of the upper data held in the arithmetic register H 351 is inputted to a 2-1 selector 312, then the lower bits of the upper data is subject to rotation shift by one byte, and then inputted to the 2-1 selector 312. The 2-1 selector 312 selects lower bits subjected to rotation shift from among the two inputs, and outputs selected bits to the main converter 320. The rotation shift for the selected lower bits by one byte allows optimally applying and inputting the input data (5) through the input data (8) to the S-boxes, as shown in FIG. 36. In the main converter 320, the upper half of the first round of the data conversion shown in FIG. 64 is performed by the F function unit 321 having ½F function. Note here that the F function unit 321 of FIG. 37 and the F function units 1321a through 13211 of FIG. 64 with ½F function are configured the same. With reference to a data conversion performed by the F function unit 1321a of FIG. 64, lower half bits of input upper data are converted by using a key 1L, and converted data is then outputted to the EXOR circuit 1322a. The EXOR circuit 1322a receives converted data outputted by the F function unit 1321a, and XORs between the data received and input lower data. In other words, the data (intermediate data) outputted from the main converter 320 is inputted to a 3-1 selector L 342, and then held in an arithmetic register L 352. At the same time, the upper data of P held in the arithmetic register H 351 passes through the 2-1 selector 311, and then is transferred, by means of the data transfer function of the data converter unit 50 of the sub converter 330, for example, and is held in the arithmetic register H 351 again via the 2-1 selector H 341 from the arithmetic register H 351.

Next, a description will now be given of an operation of the step 3.

Data processing by the F function unit 1321b of FIG. 64 is implemented at the second cycle of processing by the main converter 320 of FIG. 37. Specifically, without being subject to the one-byte rotation shift, the upper bits of the upper data inputted to the 2-1 selector 312 is selected by the 2-1 selector 312, and then outputted to the main converter 320. By the application of this operation, the data of upper half bits of upper data is nonlinear converted by the F function unit 1321b, and then outputted to the EXOR circuit 1322b. The EXOR circuit 1322b inputs the main converter 320 the intermediate data which is outputted from the main converter 320 and held in the arithmetic register L 352 at the first cycle, as the other input signal, and thereby the intermediate data is inputted to the EXOR circuit 1322b. Output data XORed at the EXOR circuit 1322b is selected by the 2-1 selector H 341, and then held in the arithmetic register H 351. At this stage, the upper data of P is being held in the arithmetic register L 352 via the 3-1 selector 342. This means that the upper data and the lower data to be used for data conversion at the second round in the main converter 320 are held in the arithmetic register H 351 and the arithmetic register L 352, respectively.

In steps 4 through 13, steps 2 and 3 are repeated five times.

More particularly, the data conversion of second round is done by the F function unit 1321c and the EXOR circuit 1322c in one cycle, and by the F function unit 1321d and the EXOR circuit 1322d in another cycle, the process in two cycles in total corresponds to the processes of step 4 and step 5. The process of the third round to the sixth round is performed in the same fashion, which corresponds to the processes of steps 6 through 13.

Note, as aforementioned, that the functions of the F function units 1321a through 1321l of FIG. 64 are the same as the function of the F function unit 321 of FIG. 37.

A description will now be given of a process of step 14.

This process indicates the process performed by the sub converter 330 of FIG. 37.

First, the upper data and the lower data, which are processed at step 13 and then held in the arithmetic register H 351 and the arithmetic register L 352, respectively, are inputted to the 2-1 selector 311, then selected, and inputted to the data converter unit 50 and the data inverter unit 70, respectively.

At the data converter unit 50 and the data inverter unit 70, the input data is subject to a linear conversion. Then, converted data by the data converter unit 50 is inputted to the 2-1 selector H 341, and converted data by the data inverter unit 70 is inputted to the 3-1 selector L 342. Then, they are selected and held in the arithmetic register H 351 and the arithmetic register L 352, respectively.

The processes of steps 15 through 27 correspond to the processes of the main converter 320 and the sub converter 330 of FIG. 37.

The processes of steps 28 through 39 correspond to the process of the main converter 320 of FIG. 37.

In step 40, like step 1, Whitening is performed by using the EXOR of the sub converter 330.

Through these steps of the intermediate key generator 40, it becomes possible that a cipher text C is outputted through the process of encryption in case of input data P being a plain text, and a decipher text C is outputted after the process of decryption by the same circuit for the process of encryption, in case of input data P being cipher text.

With the data conversion apparatus using CAMELLIA of FIG. 37, the parallel arrangement of the main converter 320 and the sub converter 330 allows saving cycle time for each cycle and improving the operation frequency, in contrast with the case of the serial arrangement thereof.

Further, with the parallel arrangement of the main converter 320 and the sub converter 330, the path to input a signal to the sub converter 330 without the signal passing through the main converter 320 and the path to input a signal to the main converter 320 without the signal passing through the sub converter 330 become available. This allows a flexible adjustment to changes in configuration and operation of the device, such as addition, elimination, etc. in future activities.

With the data conversion apparatus using CAMELLIA in which the main converter 320 and the sub converter 330 are arranged in series, on the other hand, in the case of performing the one-round data conversion by F function process in two or more cycles, since data to be converted in one cycle is part of input data, the path is needed in the data scrambler 30 for holding converted data of the part of input data in the arithmetic register 350 and transferring the converted data to sub converter 330 after a given period. Or, alternatively, the transfer path is needed in the main converter 320 for transferring the data to the sub converter 330 via the main converter 320 after the given period.

According to this embodiment, however, since the main converter 320 and the sub converter 330 are arranged in parallel, the additional path and the additional transfer function of the main converter 320 are made redundant. This allows preventing the circuit size of the device from getting increased.

Additionally, in the case of using the shared circuit shown in FIG. 59 on which the data converter unit 50 and the data inverter unit 70 are implemented, the path A→B→C→D E→B→C . . . becomes a loop circuit. Therefore, the loop circuit should be designed not to become a transmission circuit when influenced by signal racing, noise, etc. caused by propagation delay difference of the switching signals in practical LSI implementation of the circuit. Another problem is that logic synthesis tools cannot cope with such a circuit with the loop circuit (a FEED-LOOP circuit), so that an efficient logic synthesis cannot be achieved.

In order to solve this problem, the data converter unit 50 and the data inverter unit 70 of the sub converter 330 are designed to be separated in FIG. 37. This allows the data conversion apparatus to avoid such a problem relating to the racing, etc.

In addition, as aforementioned, the sub converter 330 of FIG. 37 using the key/data transfer function can eliminate the necessity of the key path from the key KL register 240 and the data path from the main converter 320. This can contribute to further downsizing of the data conversion apparatus for block cipher of CAMELLIA and achieving low power consumption.

EMBODIMENT 6

A description will now be given of a sixth embodiment.

Figure 38:
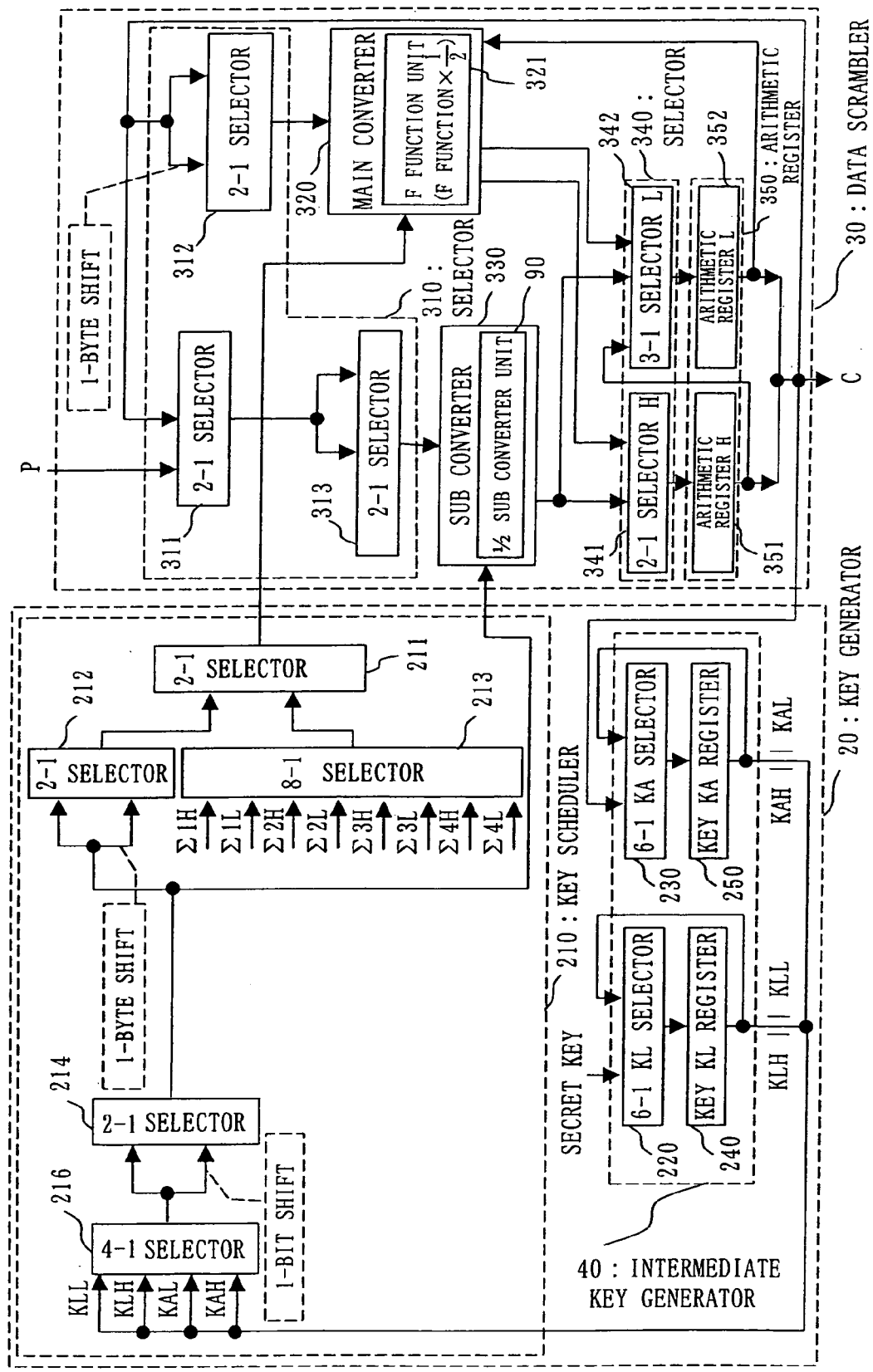
FIG. 38 is a diagram illustrating an overall configuration and operation according to a sixth embodiment.

FIG. 38 is a block diagram of a data conversion apparatus for CAMELLIA of a sixth embodiment. FIG. 28 is different from FIG. 37 such that the sub converter 330 includes the ½ sub converter unit 9, which implements the data conversion apparatus unit 50 and the data inverter unit 70 on the shared circuit. Therefore, the 2-1 selector 215 and the 4-1 selector 217 of FIG. 37 are made redundant.

Thus, the data conversion apparatus according to this embodiment requires none of the four selectors needed for the 2-1 selector 215 and the 4-1 selector 217 and the path to input a key outputted from the 2-1 selector 215 to the sub converter 330. This allows simplifying the configuration of the key scheduler 210, and thereby further downsizing the data conversion apparatus.

EMBODIMENT 7

Figure 47:
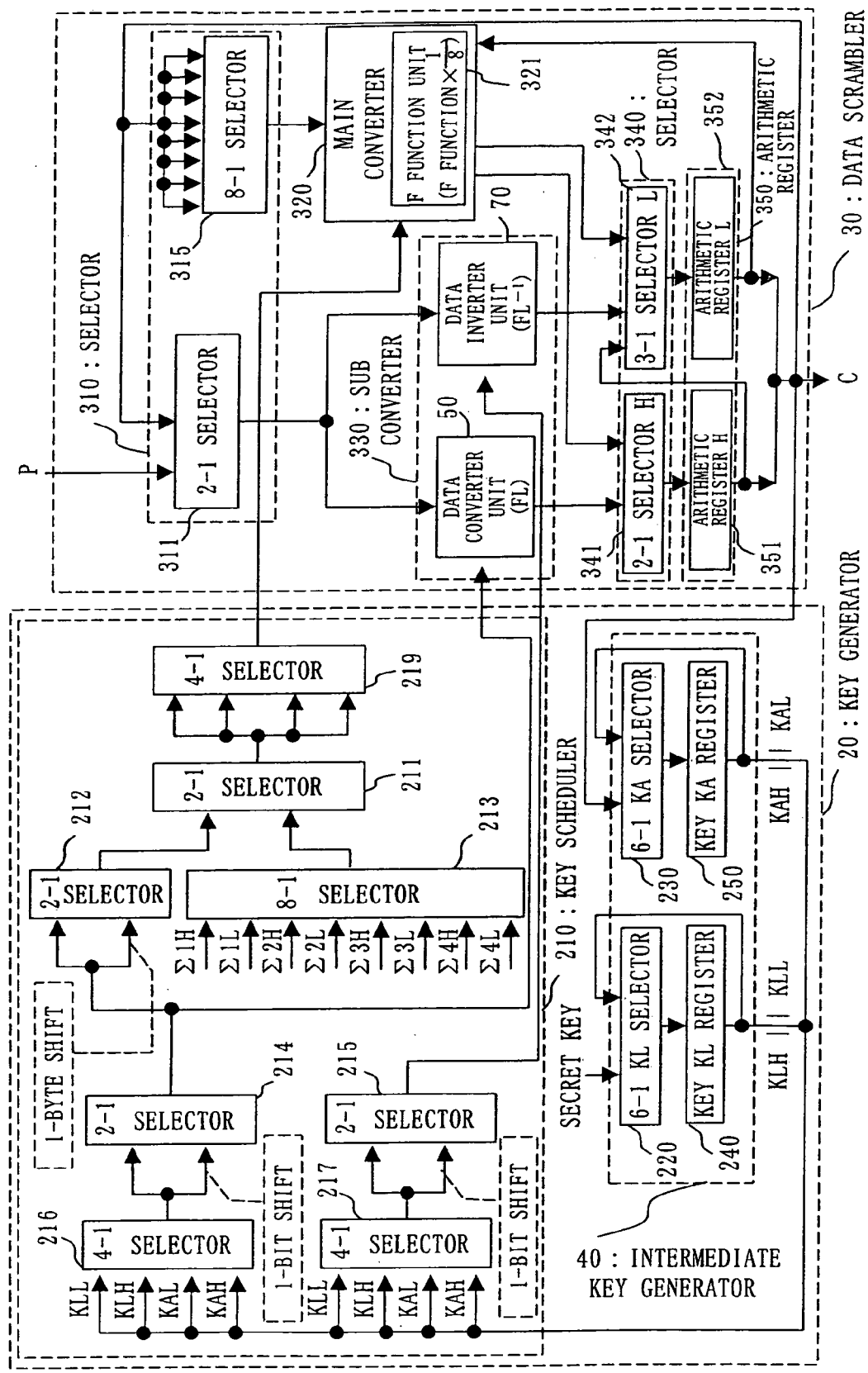
FIG. 47 is a diagram illustrating an overall configuration and operation according to a seventh embodiment.

FIG. 47 is a block diagram of a data conversion apparatus for CAMELLIA according to a seventh embodiment.

This embodiment is different from that of the block diagram of FIG. 37 such that the F function unit 321 in the main converter 320 is configured with a ⅛F function. In other words, the main converter 320 of this embodiment performs a one-round F function based data conversion in eight cycles. Therefore, in contrast with FIG. 37, the 2-1 selector 312 of FIG. 37 is replaced by a 8-1 selector 315. Other components are the same as those of FIG. 37.

EMBODIMENT 8

Figure 48:
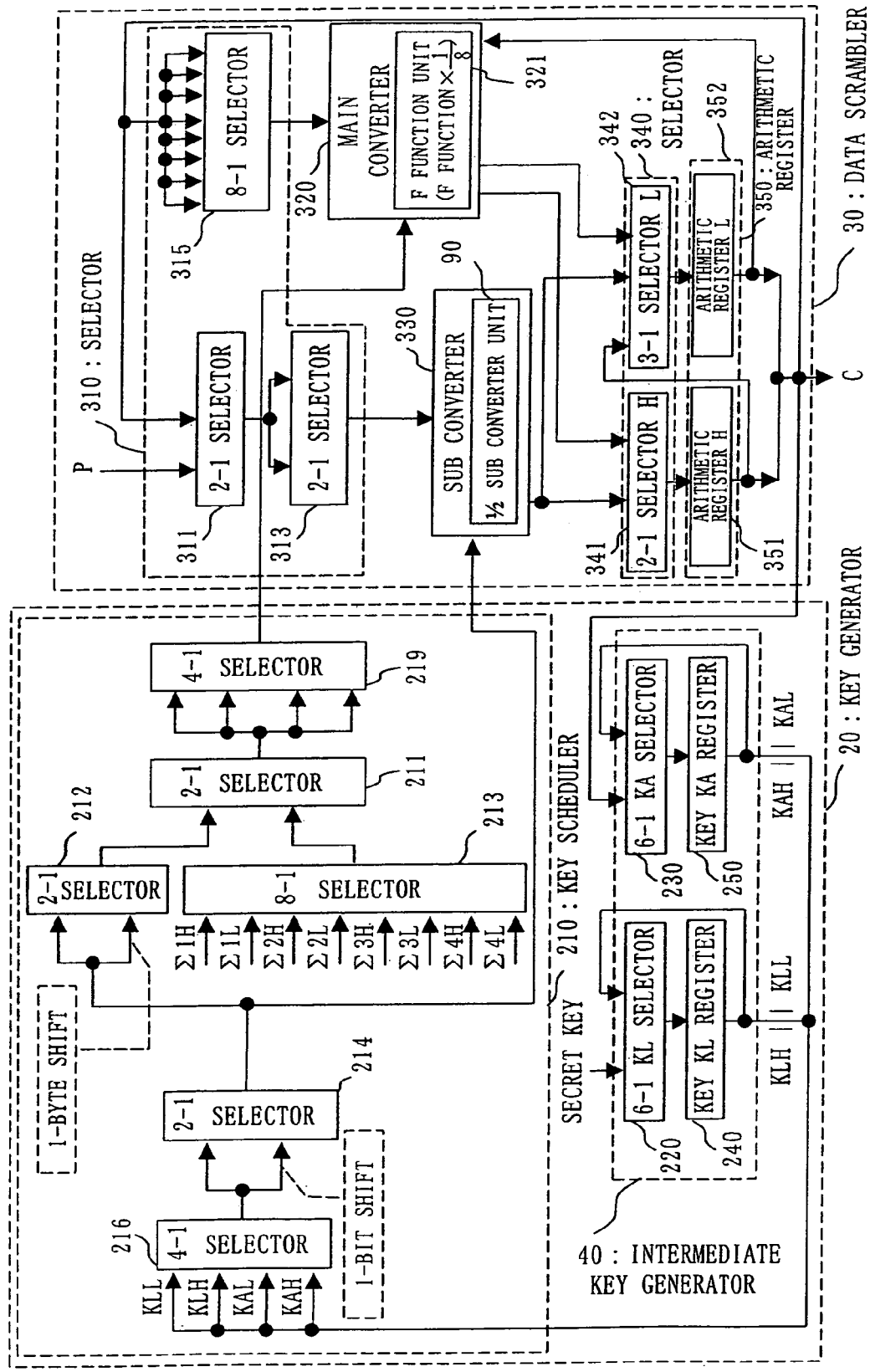
FIG. 48 is a diagram illustrating an overall configuration and operation according to an eighth embodiment.

FIG. 48 is a block diagram of a data conversion apparatus for CAMELLIA according to an eighth embodiment.

This embodiment is different from the embodiment shown in FIG. 47 such that 330 is provided with the ½ sub converter unit 90. Therefore, the 2-1 selector 215 and the 4-1 selector 217 shown in FIG. 47 are made redundant.

EMBODIMENT 9

Figure 49:
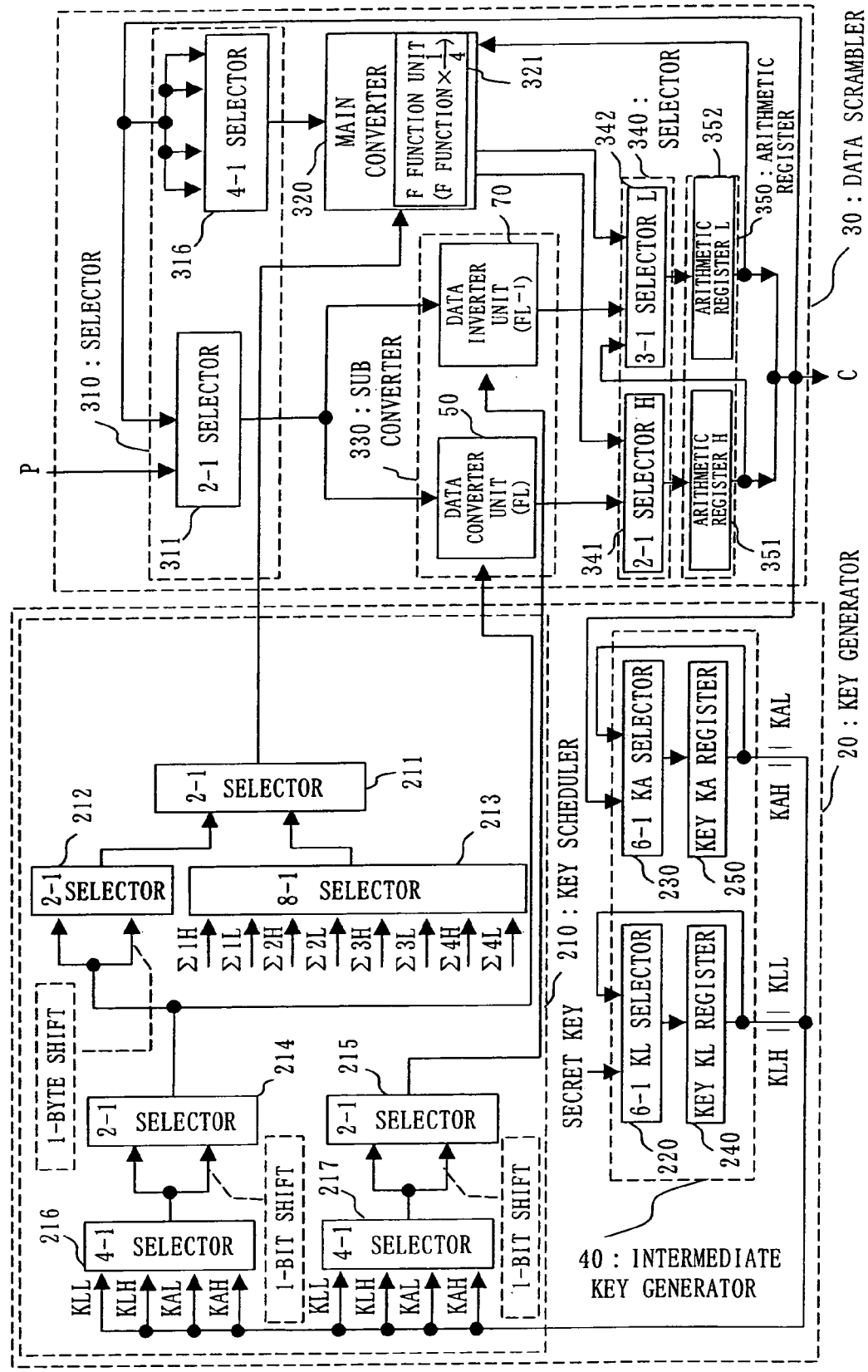
FIG. 49 is a diagram illustrating an overall configuration and operation according to a ninth embodiment.

Another embodiment is shown in FIG. 49.

FIG. 49 is a block diagram of a data conversion apparatus for CAMELLIA according to a ninth embodiment.

This embodiment is different from that of FIG. 37 such that the F function unit 321 in the main converter 320 is configured with a ¼F function. Therefore, the 2-1 selector 312 of FIG. 37 is replaced by a 4-1 selector 316 in FIG. 49. The main converter 320 performs a data conversion in four cycles to perform a one-round F function based data conversion by the F function unit 321, using 16-bit input data selected by the 4-1 selector 316. Other components are the same as those of FIG. 37.

EMBODIMENT 10

Figure 50:
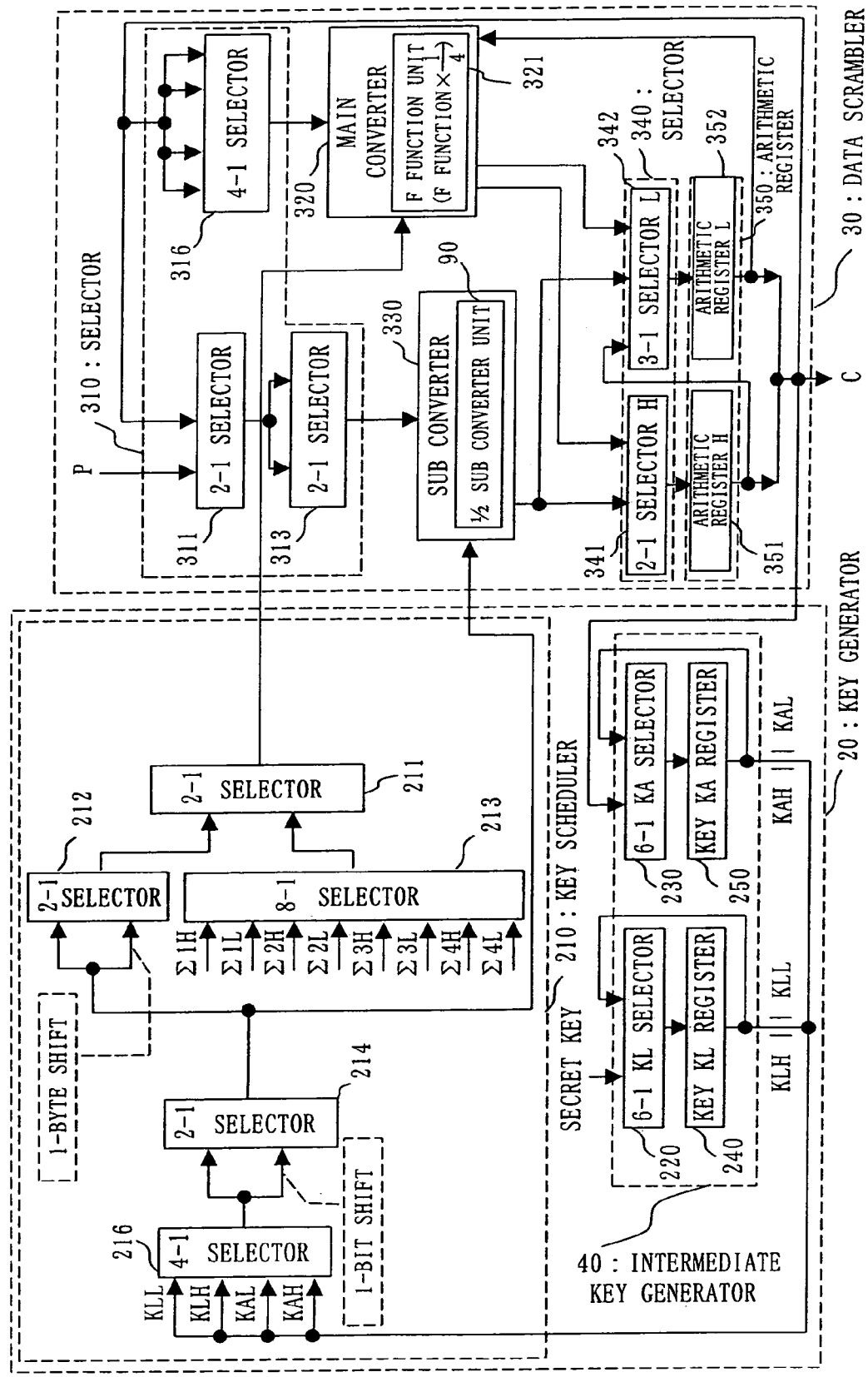
FIG. 50 is a diagram illustrating an overall configuration and operation according to a tenth embodiment.

FIG. 50 is a block diagram of a data conversion apparatus for CAMELLIA according to a tenth embodiment.

This embodiment is different from the embodiment of FIG. 49 such that the sub converter 330 is provided with the ½ sub converter unit 90. Therefore, in contrast with the case of FIG. 49, the 2-1 selector 215 and the 4-1 selector 217 are made redundant. Other components are the same as those of FIG. 49.

EMBODIMENT 11

A description will now be given of an eleventh embodiment.

Figure 39:
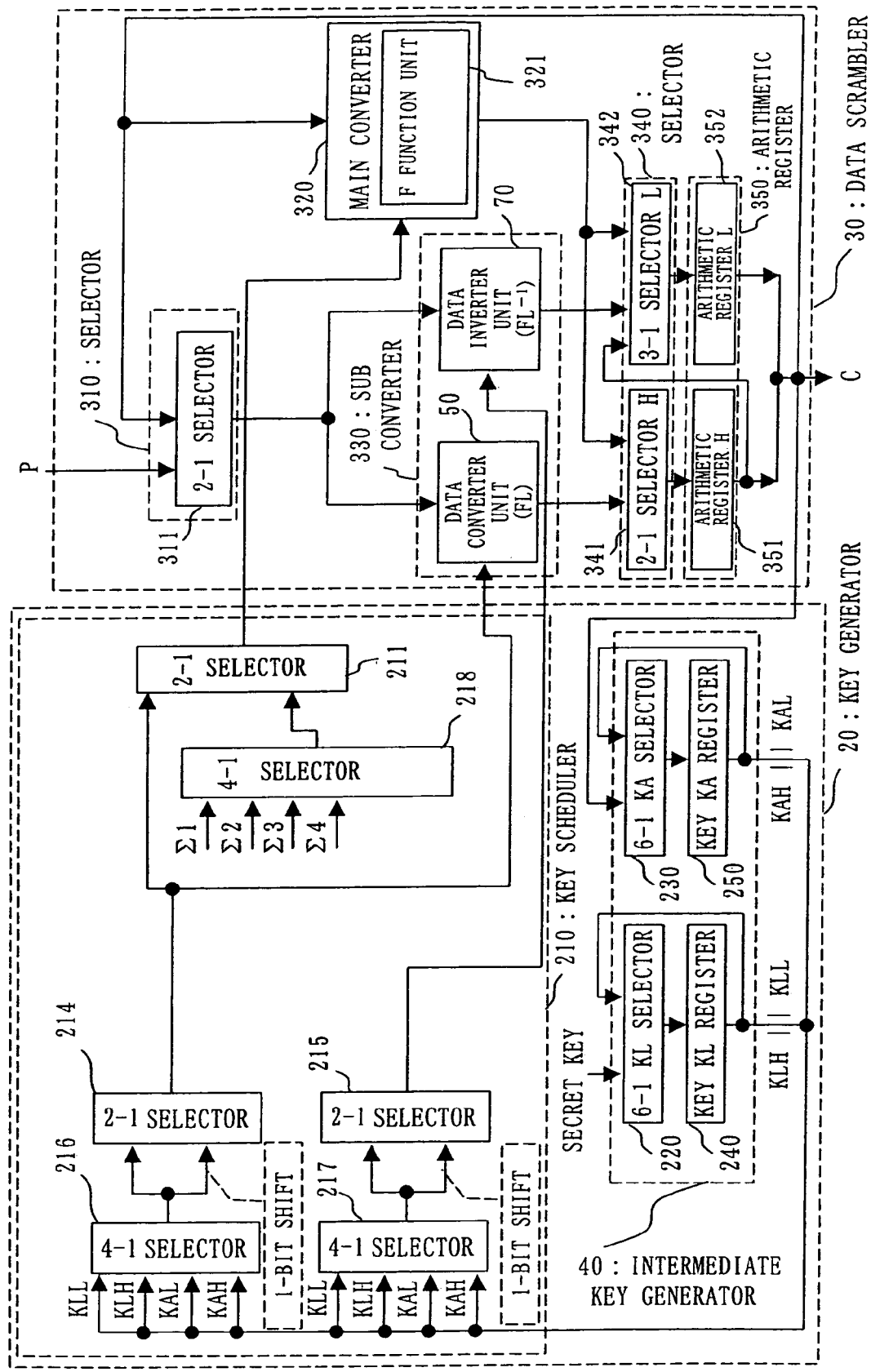
FIG. 39 is a diagram illustrating an overall configuration and operation according to an eleventh embodiment.

FIG. 39 is a block diagram of a data conversion apparatus for CAMELLIA according to the eleventh embodiment.

FIG. 39 is different from FIG. 37 such that the main converter 320 is configured with the F function unit 321 having a single F function. Therefore, the main converter 320 can perform the process of F function for one round in one cycle, which eliminates the necessity of the 2-1 selector 312 of FIG. 37. The 2-1 selector 212 of FIG. 37 is also made redundant, and the 8-1 selector 213 is replaced by a 4-1 selector 218 that selects one constant from among four constants.

EMBODIMENT 12

Figure 40:
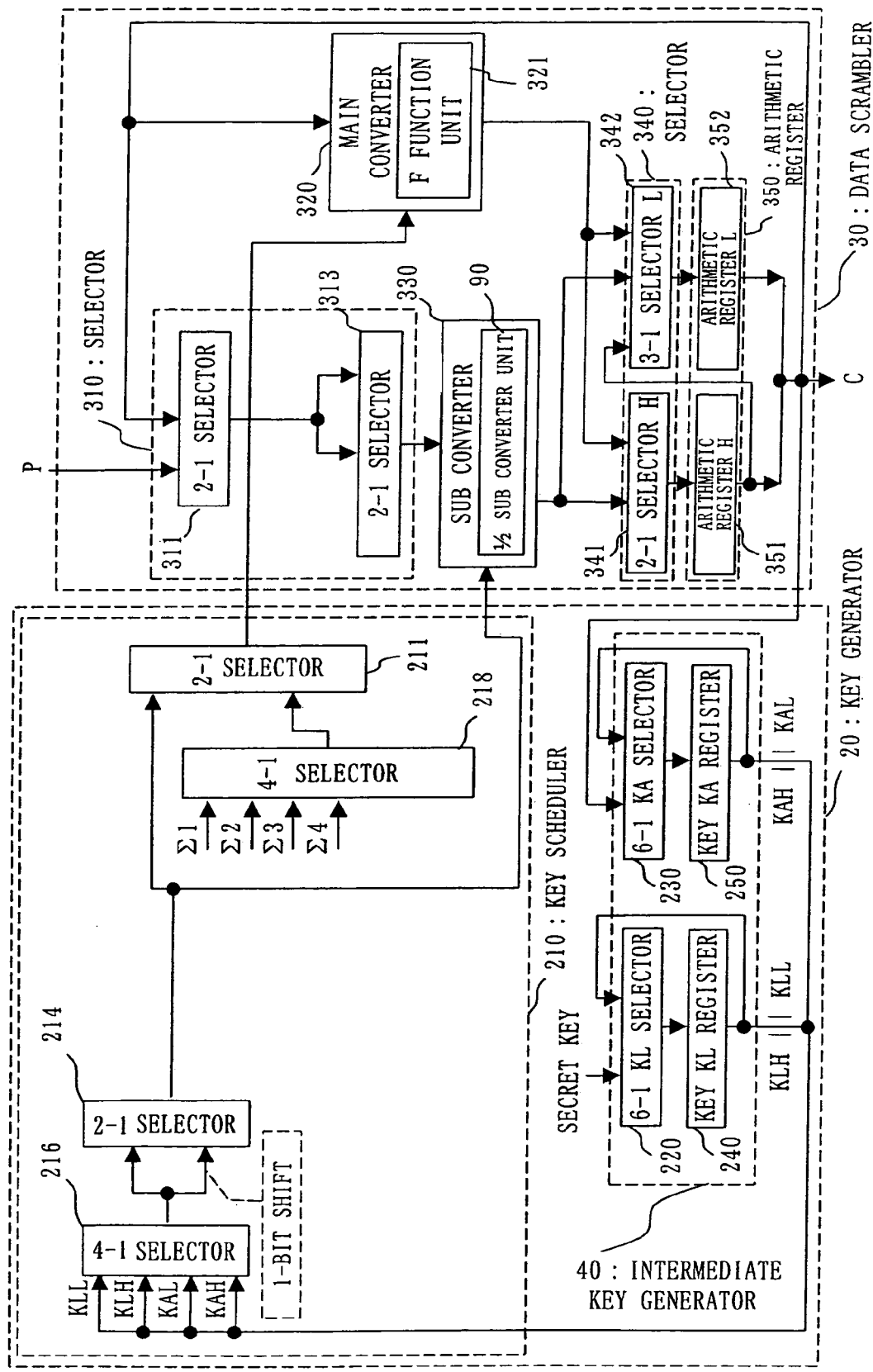
FIG. 40 is a diagram illustrating an overall configuration and operation according to a twelfth embodiment.

A description will now be given of a twelfth embodiment.
FIG. 40 is a block diagram of a data conversion apparatus for CAMELLIA according to the twelfth embodiment.

In FIG. 40 a 2-1 selector 313 is added. Since the sub converter 330 is configured with the ½ sub converter unit 90, one of the upper data and the lower data of data selected by the 2-1 selector 311 is to be selected. According to this embodiment, the process by the main converter 320 is performed in one cycle, so that the 2-1 selector 312 is made redundant like FIG. 39. Also, the 2-1 selector 215 and the 4-1 selector 217 of FIG. 39 are made redundant.

EMBODIMENT 13

A description will now be given of a thirteenth embodiment.

Figure 41:
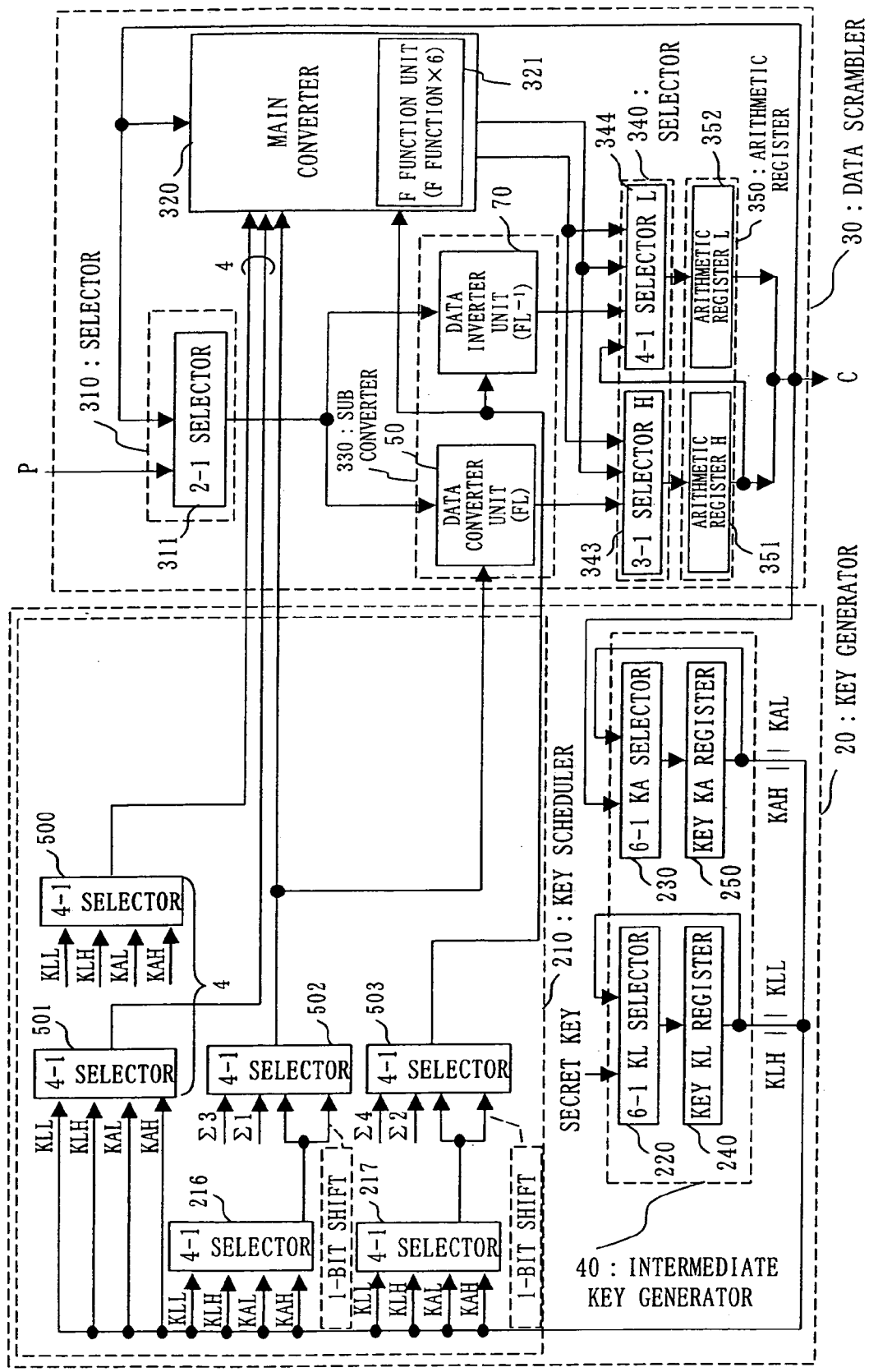
FIG. 41 is a diagram illustrating an overall configuration and operation according to a thirteenth embodiment.

FIG. 41 is a block diagram of a data conversion apparatus for CAMELLIA according to the thirteenth embodiment.

FIG. 41 is different from FIG. 39 such that the main converter 320 does not repeat the process of the F function unit 321 six times, but has six rounds of the F function unit 321 arranged in series provided therein and performs a data conversion. Therefore, there is an extra output signal from the main converter 320 in this embodiment. The reason for this is that output data from the second round of F function of the main converter 320 is to be inputted to a 3-1 selector H 343 and a 4-1 selector L 344 and then held in the arithmetic register H 351 and the arithmetic register L 352, respectively. Accordingly, the 3-1 selector H 343 receives three signals, and the 4-1 selector L 344 receives four signals.

In addition, four sets of 4-1 selectors 500 and 4-1 selectors 501 are provided, and there are extra selectors for inputting four keys selected by those selectors into the main converter 320. Furthermore, the sub converter 330 and the main converter 320 receive keys also from other selectors, a 4-1 selector 502 and a 4-1 selector 503, in the key scheduler 210.

EMBODIMENT 14

A description will now be given of a fourteenth embodiment.

Figure 42:
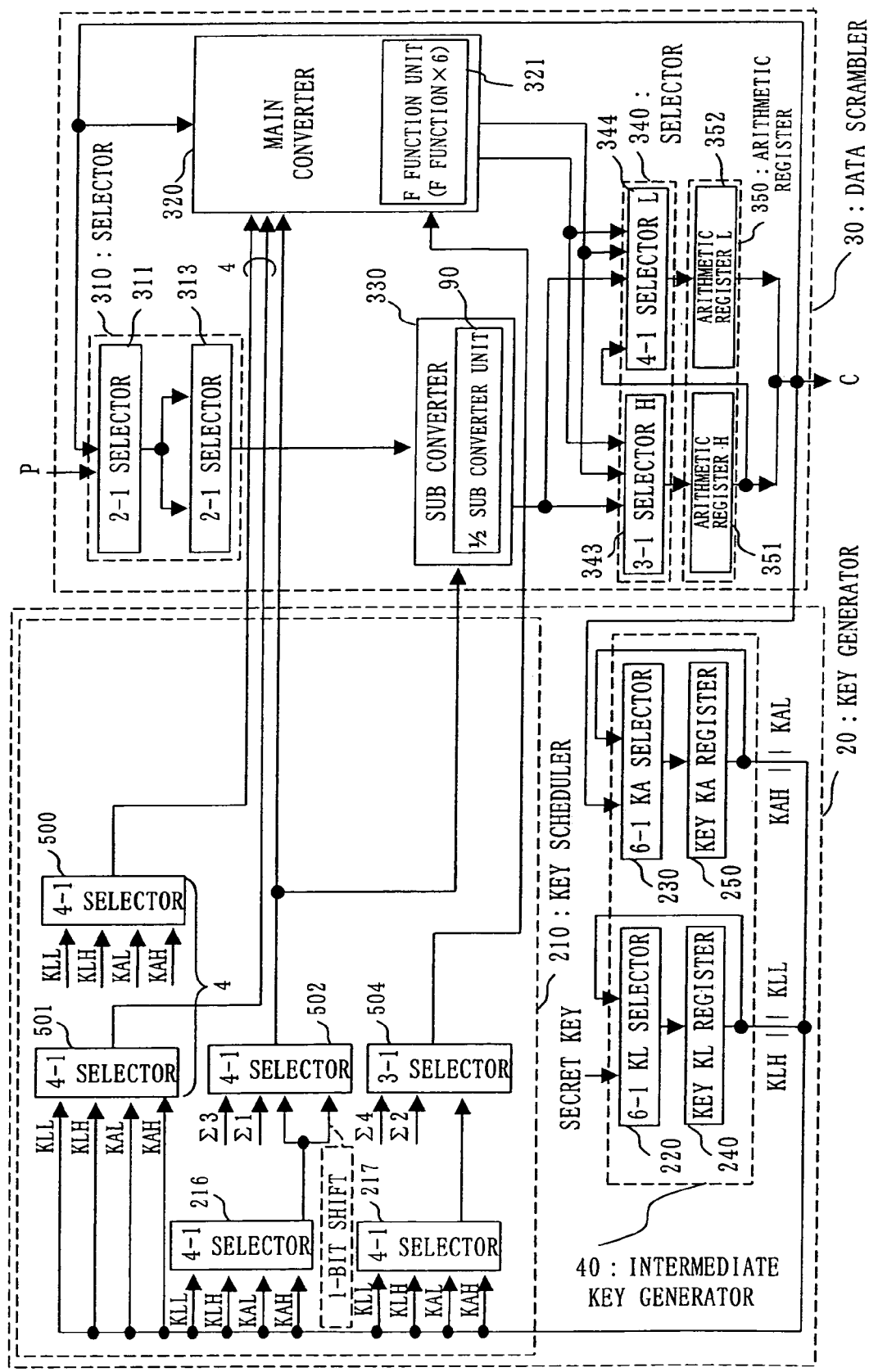
FIG. 42 is a diagram illustrating an overall configuration and operation according to a fourteenth embodiment.

FIG. 42 is a block diagram of a data conversion apparatus for CAMELLIA according to the fourteenth embodiment.

FIG. 42, like FIG. 41, is different from FIG. 40 such that the F function unit of the main converter 32 is provided with the six-round F function arranged in series. Therefore, like the case of FIG. 41, the input signals of the 3-1 selector H 343 and the 4-1 selector L 344 increase in number by one respectively, in contrast with FIG. 40, and four sets of 4-1 selectors 500 and 4-1 selectors 501 are required. The sub converter 330 and the main converter 320 receive keys also from other selectors in the key scheduler 210, the 4-1 selector 502 and the 3-1 selector 504. The 3-1 selector 504 receives three input signals.

EMBODIMENT 15

Figure 43:
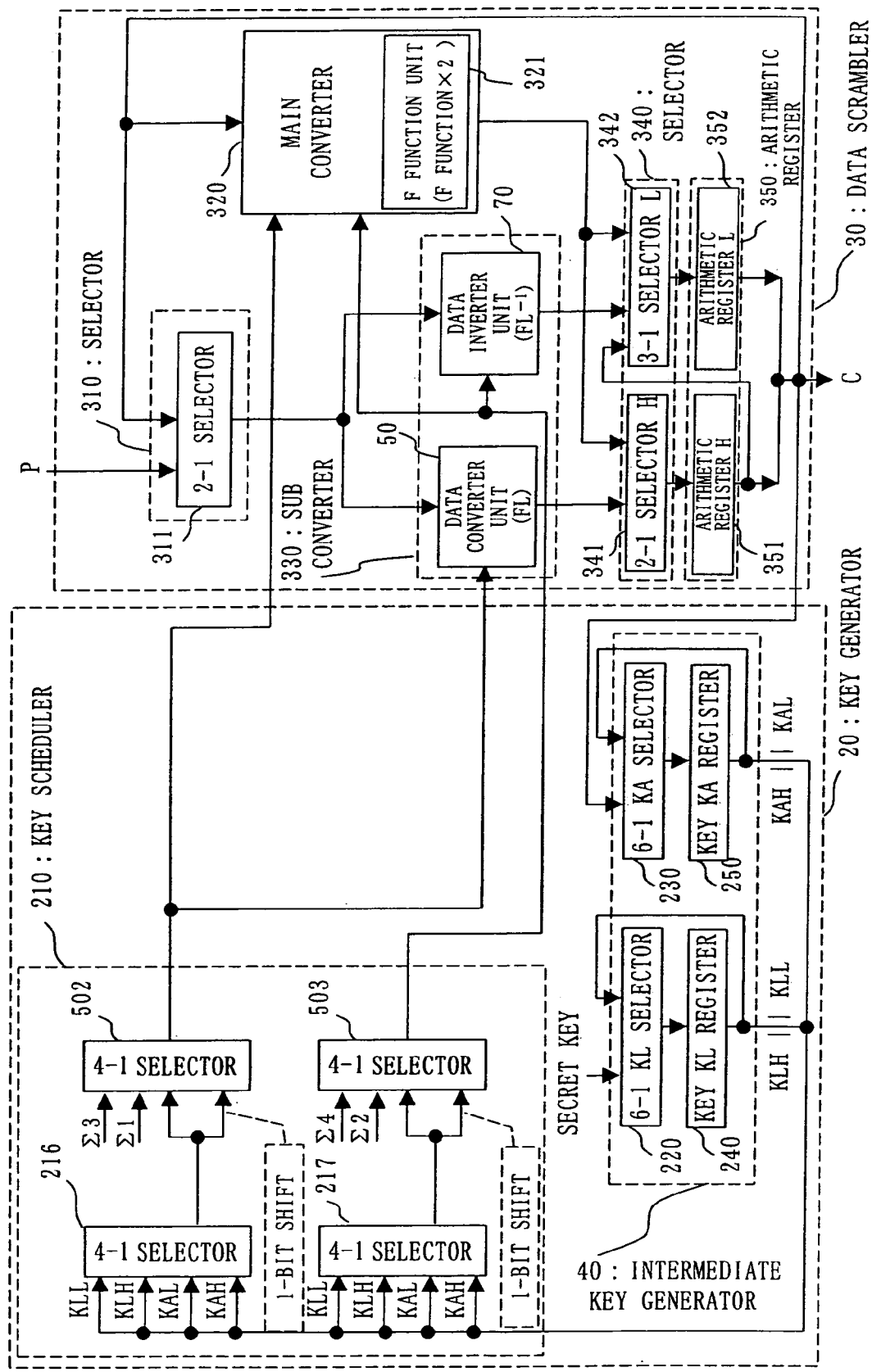
FIG. 43 is a diagram illustrating an overall configuration and operation according to a fifteenth embodiment.

Another embodiment is shown in FIG. 43.

FIG. 43 is a block diagram of a data conversion apparatus for CAMELLIA according to a fifteenth embodiment.

This embodiment is different from that of FIG. 41 such that the main converter 320 is provided with the F function unit 321 having the two-round F function. Therefore, in contrast with FIG. 41, the 3-1 selector H 343 and the 4-1 selector L 344 are replaced by the 2-1 selector H 341 and the 3-1 selector L 342, respectively, and the four sets of selectors including the 4-1 selectors 500 and the 4-1 selectors 501 are made redundant.

EMBODIMENT 16

Figure 44:
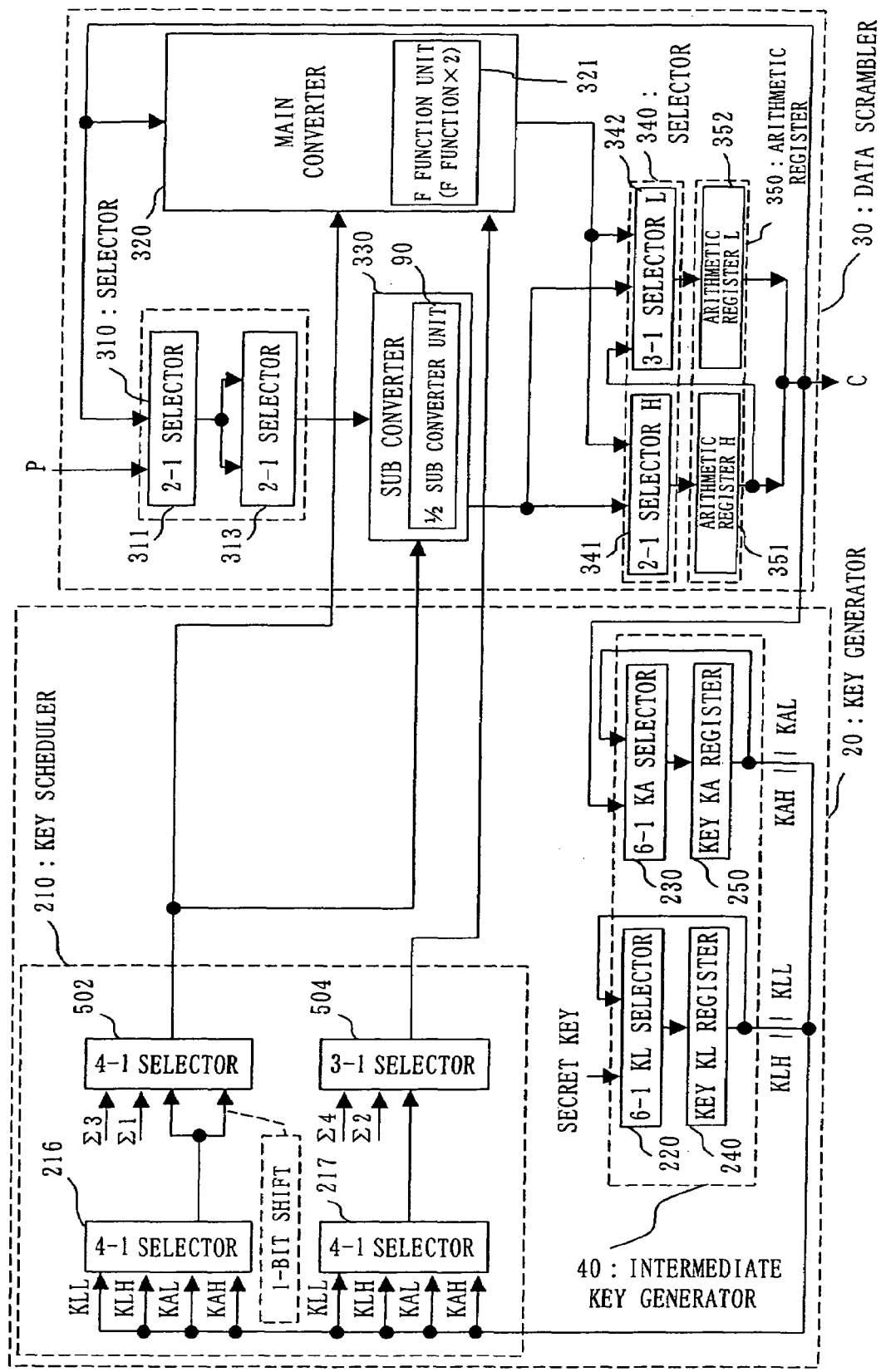
FIG. 44 is a diagram illustrating an overall configuration and operation according to a sixteenth embodiment.

Another embodiment is shown in FIG. 44.
FIG. 44 is a block diagram of a data conversion apparatus for CAMELLIA according to a sixteenth embodiment.

This embodiment is different from the embodiment of FIG. 42 such that the F function unit 321 of the main converter 320 is the two-round F function. Therefore, the 3-1 selector H 343 and the 4-1 selector L 344 of FIG. 42 are replaced by the 2-1 selector H 341 and the 3-1 selector L 342, respectively, and the four sets of selectors including the 4-1 selector 500 and the 4-1 selector 501 are made redundant.

EMBODIMENT 17

Figure 45:
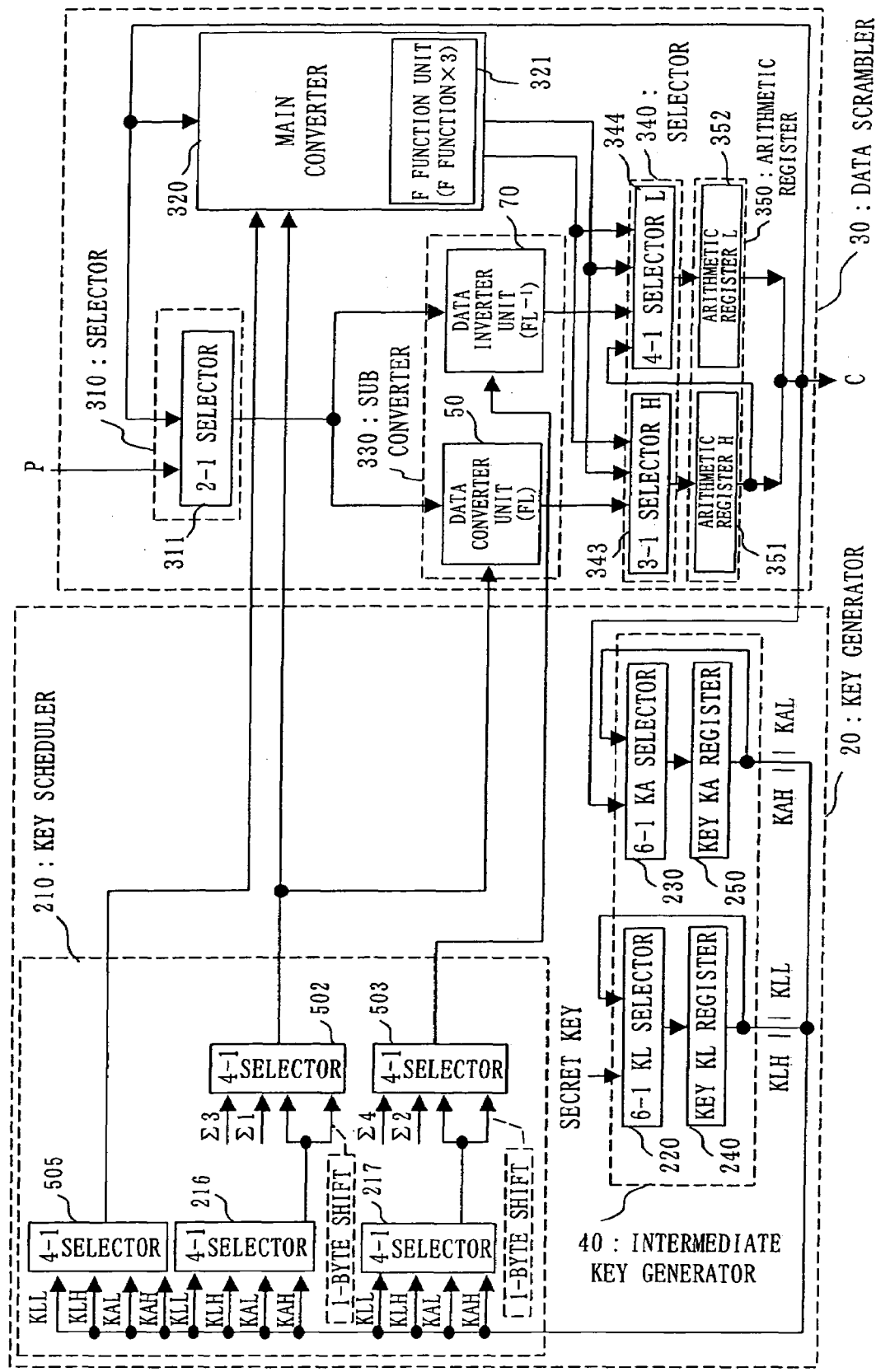
FIG. 45 is a diagram illustrating an overall configuration and operation according to a seventeenth embodiment.

FIG. 45 is a block diagram of a data conversion apparatus for CAMELLIA according to a seventeenth embodiment.

According to this embodiment, the F function unit 321 of the main converter 320 includes a three-round F function. Therefore, in contrast with FIG. 41, the four sets of selectors including the 4-1 selector 500 and the 4-1 selector 501 are made redundant, and a 4-1 selector 505 is added instead. A signal selected by the 4-1 selector 505 is inputted to the main converter 320.

EMBODIMENT 18

Figure 46:
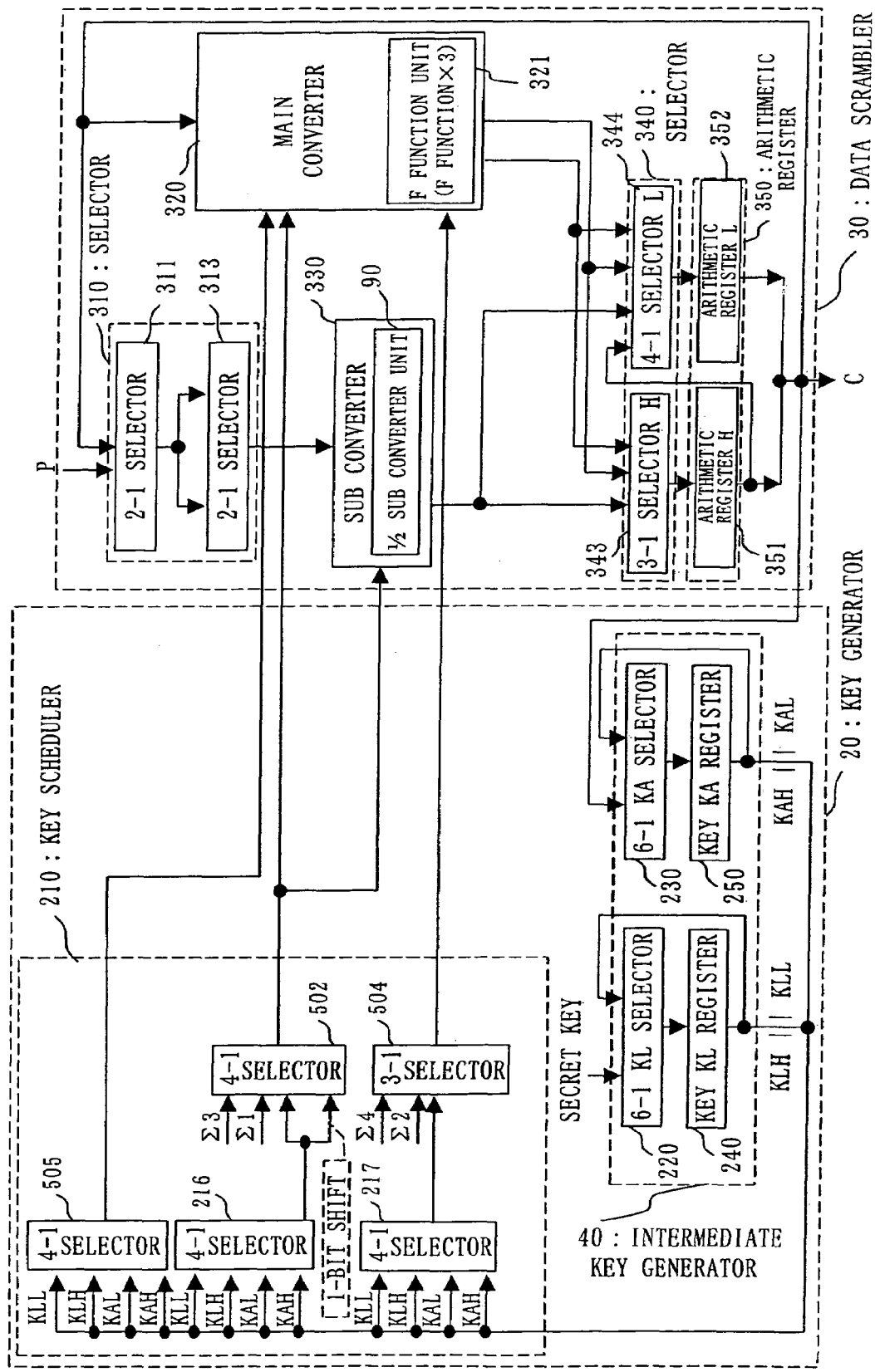
FIG. 46 is a diagram illustrating an overall configuration and operation according to an eighteenth embodiment.

FIG. 46 is a block diagram of a data conversion apparatus for CAMELLIA according to an eighteenth embodiment.

Like the embodiment shown in FIG. 45, the F function unit 321 of the main converter 320 includes the three-round F function. This embodiment is different from that of FIG. 45 such that sub converter 330 includes the ½ sub converter unit 90. Other components are the same as those of the figure.

EMBODIMENT 19

Figure 51:
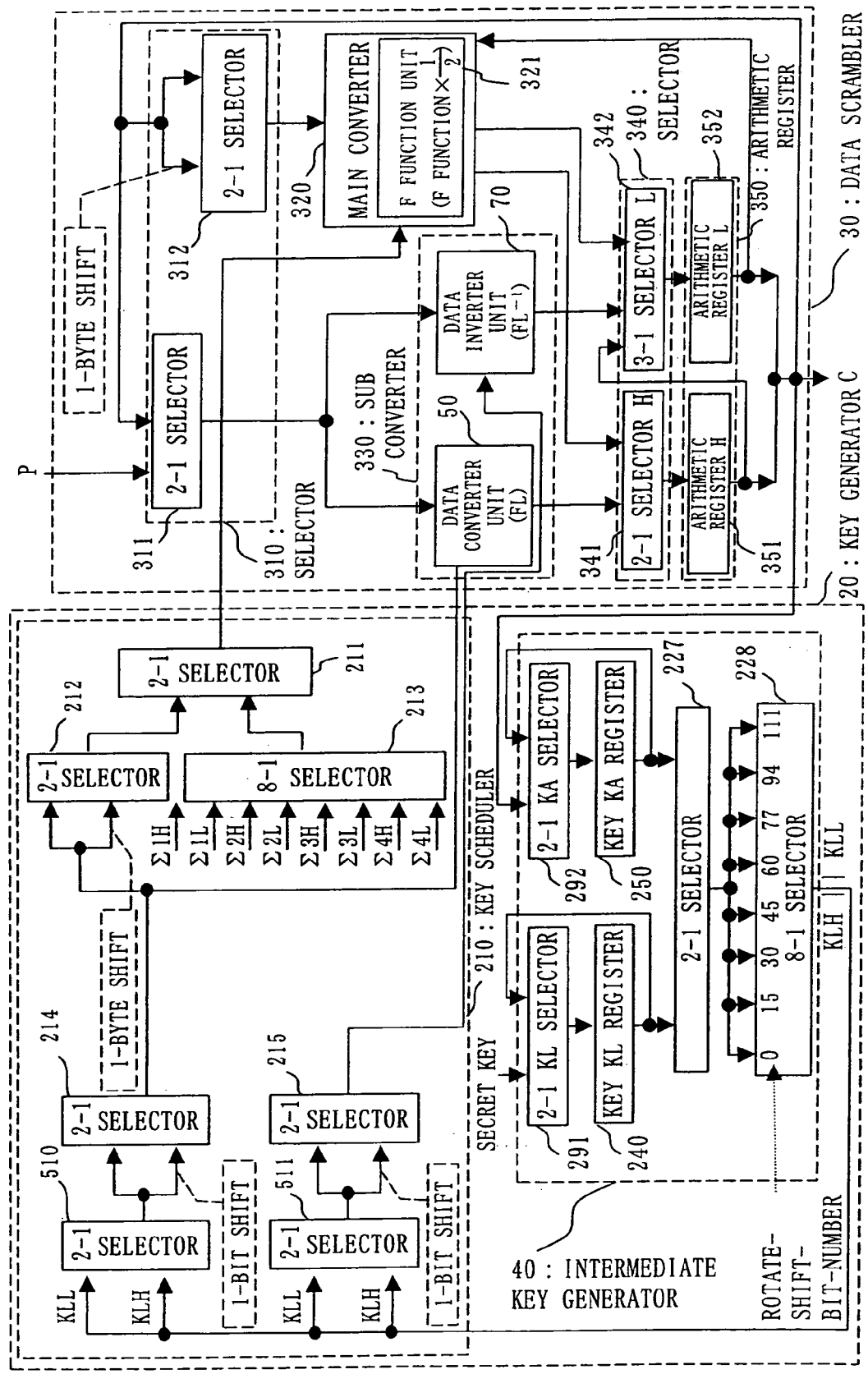
FIG. 51 is a diagram illustrating an overall configuration and operation according to a nineteenth embodiment.

FIG. 51 is a block diagram of a data conversion apparatus for CAMELLIA according to a nineteenth embodiment.

First, the intermediate key generator 40 of this embodiment is different in configuration from that of FIG. 37. The configuration of the intermediate key generator 40 of this embodiment is equivalent to that of the intermediate key generator 40 of FIG. 37, etc. Therefore, the intermediate key generator 40 of FIG. 37, etc. may be replaced by the intermediate key generator 40 of FIG. 51.

A description will now be given of a configuration of the intermediate key generator 40 of FIG. 51.

First, a 2-1 KL selector 291 receives an input secret key and an intermediate key (Key KL) held in the key KL register 240, selects one signal out of these two input signals, and holds a key in the key KL register 240. A 2-1 KA selector 292 receives an output key generated by the intermediate key generator 40 and an output key (Key KA) held in the key KA register 250. The 2-1 KA selector 292 selects one signal from among those two input signals, and holds a selected signal in the key KA register 250.

A 2-1 selector 227 selects one key out of the intermediate key (Key KL) and the output key (Key KA) held in and outputted from the key KL register 240 and the key KA register 250, respectively, and outputs a key to a 8-1 selector 228. At the 8-1 selector 228, a key selected by the 2-1 selector 227 is subject to rotation shift by eight kinds of numbers, 0, 15, 30, 45, 60, 77, 94, and 111, of bits to the left or right as shown in FIG. 51. Specifically, if the number of bits for rotation shift is 0, data is not shifted. If the number of bits for rotation shift is 15, data is subject to rotation shift by 15 bits to the left or right. The same applies to the other cases. Through the rotation shifts of data in that manner, eight signals are produced. Then, the 8-1 selector 228 selects one signal from among the eight signals, and outputs the one signal selected.

Those operations allow the intermediate key generator 40 of this embodiment thus configured to function the same as the intermediate key generator 40 of FIG. 37. In this manner, upper half bits of data outputted from the intermediate key generator 40 becomes KLH, and the lower half bits becomes KLL, and those are inputted to a 2-1 selector 510 and a 2-1 selector 511, respectively, in the key scheduler 210. Thus, the 4-1 selector 216 and the 4-1 selector 217 of FIG. 37 can be replaced by the 2-1 selector 510 and the 2-1 selector 511, respectively, of this embodiment.

Figure 52:
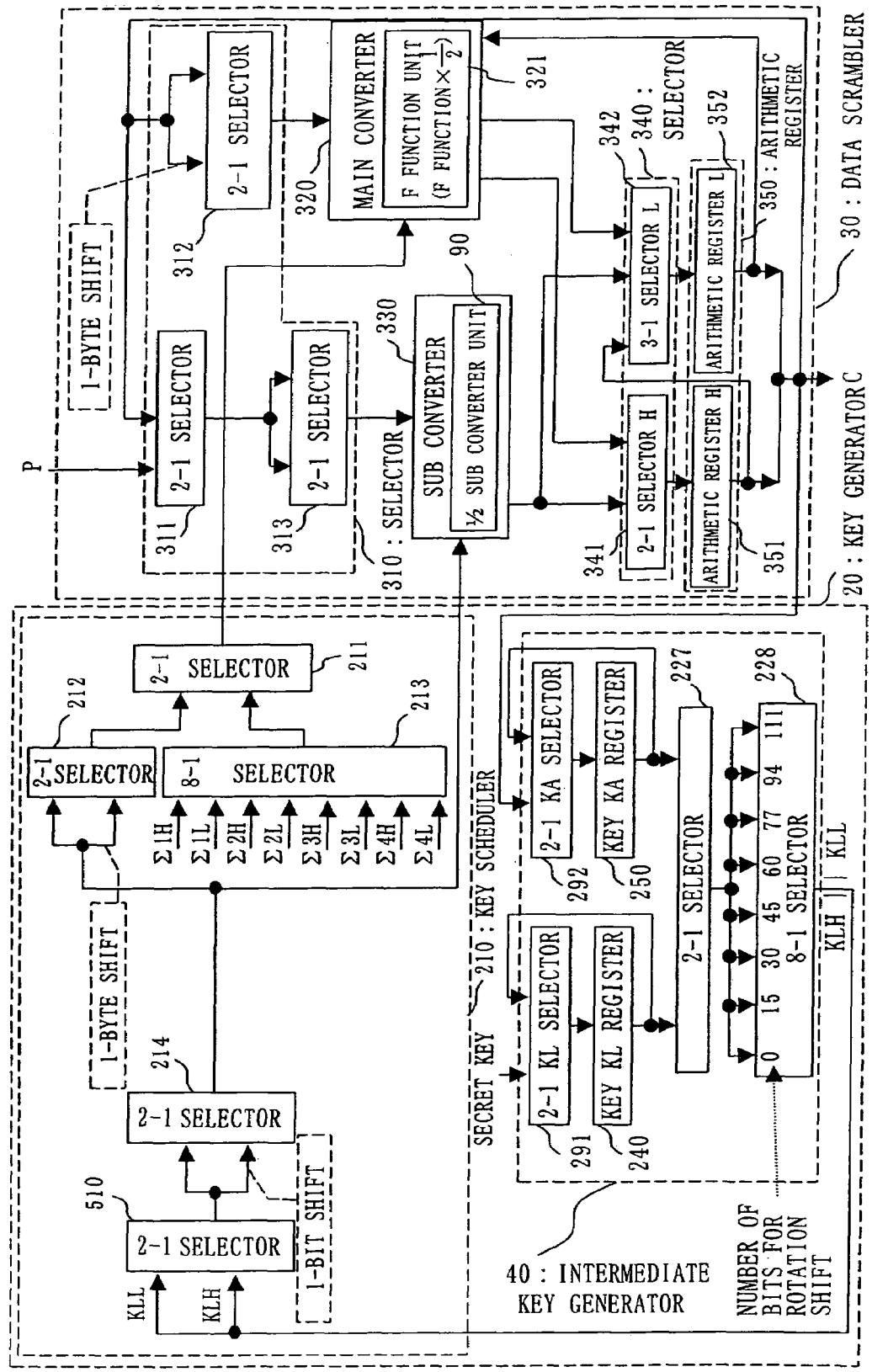
FIG. 52 is a diagram illustrating an overall configuration and operation according to a twentieth embodiment.

Therefore, the intermediate key generator 40 shown in FIG. 52, like the intermediate key generator 40 shown in FIG. 37, requires ten 2-1 selectors. However, the 2-1 selector 510 and the 2-1 selector 511 only require two 2-1 selectors Accordingly, the total number of 2-1 selectors required for the intermediate key generator 40, the 2-1 selector 510 and the 2-1 selector 511 is 12.

The intermediate key generator 40 shown in FIG. 37 requires ten 2-1 selectors, and the 4-1 selector 216 and the 4-1 selector 217 require six 2-1 selectors. Accordingly, the total number of 2-1 selectors required for the intermediate key generator 40, the 4-1 selector 216 and the 4-1 selector 217 is 16.

Thus, the data conversion apparatus of this embodiment can reduce the number of 2-1 selectors by four in comparison to the data conversion apparatus shown in FIG. 37.

Consequently, this embodiment allows achieving downsizing based on the reduction in the number of selectors, and also achieve low power consumption accompanying the reduction in the number of gates resulting from the reduction of selectors.

Note that the configuration of the intermediate key generator 40 discussed in this embodiment is also applicable to those of all the other embodiments of the present invention.

EMBODIMENT 20

FIG. 52 is a block diagram of a data conversion apparatus for CAMELLIA according to a twentieth embodiment.

This embodiment is different from that of FIG. 51 such that the sub converter 330 includes the ½ sub converter unit 90. Thus, the 2-1 selector 215 and the 2-1 selector 511 of FIG. 51 are made redundant according to this embodiment. Other components are the same as those of FIG. 51.

Note that the rotate-shift-bit-number referred to in FIG. 51 and FIG. 52 is synonym with the number of bits for rotation shift.

EMBODIMENT 21

FIG. 34 and FIG. 35 discussed in the fourth embodiment show the process of encryption/decryption of CAMELLIA for a 128-bit key.

However, the configurations of the data conversion apparatuses discussed in all the embodiments of the present invention are applicable to any data conversion apparatus performing the encryption/decryption process of CAMELLIA not only for a 128-bit key but also 192—or 256-bit key.

Figure 53:
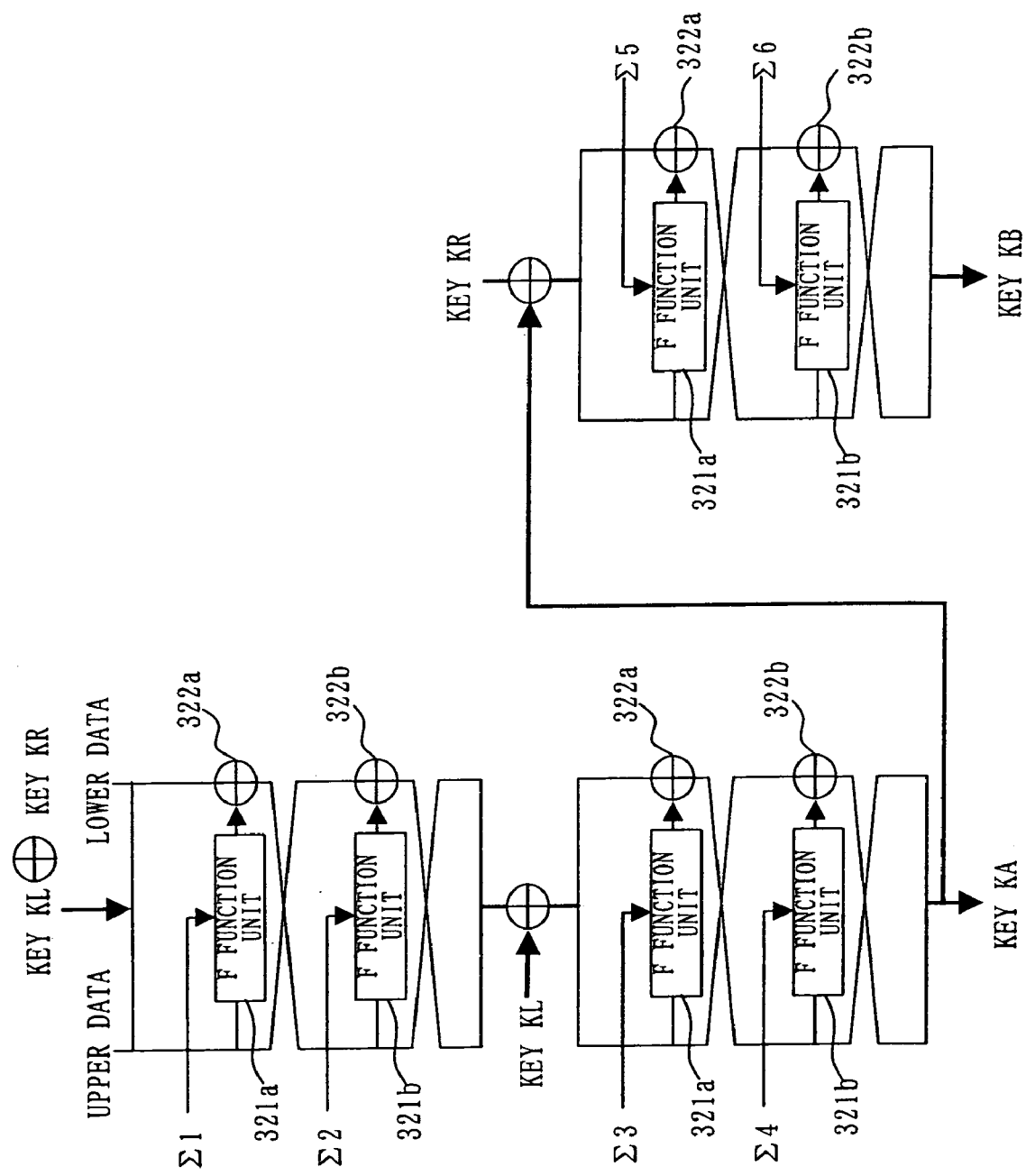
FIG. 53 is a diagram illustrating an operation of the intermediate key generator 40 generating the output key from the intermediate key with a 192- or 256-bit key.

FIG. 53 is a diagram illustrating a process of generating a 192-bit key.

As discussed earlier, with a 128-bit key, a 256-bit key is generated as the extended key. Now, with a 192—or 256-bit secret key to be inputted, the bit length of the extended key is 512.

With FIG. 53, a key KL and a key KR are intermediate keys, and a key KA and a key KB are output keys. Then, all the keys KL, KR, KA and KB are 128 bits, and therefore putting the keys together generates a 512-bit extended key.

With a 256-bit secret key to be inputted, the key KL is assigned 128 bits, that are upper half bits of the input secret key, and the key KR is assigned the lower 128 bits.

The key KL and the key KR are XORed, respectively, and then inputted to a part of the main converter 320 as shown in FIG. 53.

FIG. 53 corresponds to FIG. 2 on the right hand side, which shows the generation method of an extended key in the case where the secret key is 128 bits long.

The method of generating the output key KA from an input key shown in FIG. 53 on the left is the same as the method of generating the output key KA illustrated in FIG. 2, except that the input key is based on an XORed result with the key KL or the key KR. FIG. 2 does not show the process of generating the output key KB from the key KR shown in FIG. 53 on the right. Therefore, the process of generating the output key (key KB) will now be described.

With a 256-bit key inputted, lower 128 bits becomes the input key (key KR), and is inputted to the main converter 320. Upper bits of the lower 128 bits are nonlinear converted by a constant Σ5 using the F function unit 321a at the first stage in the main converter 320, and outputted. Output data is XORed with lower bits of the input key (key KR) at the EXOR circuit 322a, and then inputted to the F function unit 321b. At the F function unit 321b, the data is subject to another nonlinear conversion by a constant Σ6, and converted data is then XORed with the upper bits of the input key (KR) at the EXOR circuit 322b. The converted data through an operation by the EXOR circuit 322b is outputted as upper 64-bit data of the output key (Key KB), and resultant data from an operation by the EXOR circuit 322a is outputted as lower 64-bit data of the output key (Key KB).

The thus generated output keys (Key KA and Key KB) and input keys (Key KL and Key KR) are transferred as a 512-bit extended key from the intermediate key generator 40 to the key scheduler 210, then scheduled by the key scheduler 210, and used for data encryption/decryption.

With a 192-bit secret key, the upper 128 bits of the input secret key become the Key KL. Then, the lower 64 bits of the input secret key becomes the upper 64 bits of the key KR. The lower 64 bits of the key KR are the inverse of the upper 64 bits of the key KR which is the lower 64 bits of the input secret key. Other methods of generating keys are the same as the method of generating the 256-bit secret key, and therefore will not be discussed here.

FIG. 54 is a diagram illustrating the encryption process of CAMELLIA for a 192—or 256-bit key.

In contrast with FIG. 34 illustrating the encryption process of CAMELLIA for a 128-bit key, the number of the main converters 320 is increased from three to four, and the number of the sub converters 330 is increased from two to three. Therefore, the process of encryption for a 192—or 256-bit key uses a 24-round F function is carried out for encryption in total. Other components are the same as those of the case for a 128-bit key shown in FIG. 34, and therefore will not be discussed here.

FIG. 55 is a diagram illustrating the process of decryption of CAMELLIA for a 192—or 256-bit key.

The process of decryption of CAMELLIA for a 128-bit key was discussed earlier with reference to FIG. 35. In contrast with FIG. 35, the number of the main converters 320 is increased to four, the number of the sub converters 330 is increased to three, and a 24-round F function is provided like the case of the encryption process. Other components are the same as those of the decryption process of CAMELLIA for a 128-bit key, and therefore will not be discussed here.

Note that the details of 128-, 192-, or 156-bit key block cipher CAMELLIA algorithm are set forth in "128-bit Block Cipher Camellia Algorithm Specification".

All the embodiments shown above are applicable to any data conversion apparatus for a 128-, 192-, or 256-bit key.

The key and data transfer function provided in the sub converter 330 can be applied to all the embodiments of the present invention.

With all the foregoing embodiments, the operations of the respective components are associated with one another, and therefore the operations of the respective components may be replaced by a sequence of operations based on the relation of operations discussed above. With the replacement, the embodiments may become those of a method invention.

Furthermore, if the processes of the respective components replace the operations thereof, then the foregoing embodiments may become embodiments for programs.

Still more, if the programs are stored in computer readable storage means storing programs, then the embodiments may become embodiments for computer readable storage means storing programs.

All the embodiments for programs or the embodiments for computer readable storage storing programs may be implemented by computer operable programs.

Processes of the respective embodiments for programs and those for the respective embodiments for computer readable storage means are executable by programs, which are stored in a memory. The programs are read by a central processing unit (CPU) from the memory and executed to implement flow charts by the central processing unit. Note that the memory and the central processing unit are not shown in the figures.

Also note that the software or program of each embodiment may be implemented by a firmware stored in a ROM (READ ONLY MEMORY). Alternatively, each function of the foregoing programs may be implemented by a combination of software, firmware, and hardware.

INDUSTRIAL APPLICABILITY

The restriction of the increase of selectors and the reduction in the number of selectors allow downsizing the device.

Also, the reduction in an overall number of gates in circuits allows achieving low power consumption.

Still more, the operation frequency can be improved.

The sub converter can transfer input data or an input key.

A flexible adjustment to a change in the configuration of the apparatus is allowed.

It is allowed that one of the data conversion unit 50 and the data inversion unit 70 performs data conversion and the other of the data conversion unit 50 and the data inversion unit 70 transfers input data or an input key.

The path from the main converter to the selector is made redundant, thereby allowing the device to become compact, and the reduction in the number of selectors allows achieving low power consumption.

What is claimed is:

1. A data conversion apparatus receiving data, and performing data conversion for one of encryption and decryption of the received data using a key, the data conversion apparatus comprising:
   a data scrambler performing data conversion on the received data; and
   a controller controlling a transfer signal indicating one of the key and the data to be transferred, wherein the controller outputs the transfer signal in a case of transferring the one of the key and the data, and wherein the data scrambler includes a sub converter comprising:

first and second inputs configured to receive the key and the data, respectively, and a combination of logical operation elements and a bit shifting element configured to perform the data conversion for the one of data encryption and data decryption by logically combining bits of the key with bits of the data, and a third input configured to receive the transfer signal, the third input being configured such that receipt of the transfer signal alters an operation of the combination of the logical operation elements and the bit shifting element, and an output configured to produce the converted data resulting from the combining of the bits of the key with the bits of the data, wherein the operation of the combination of the logical operation elements and the bit shifting element is altered to transfer unchanged at least one of the key and the data received via the first and second inputs to the output without performing the data conversion in response to the transfer signal being received at the third input from the controller, the altered operation being such that the at least one of the key and the data passes through the combination of the logical elements and the bit shifting element unchanged.

2. The data conversion apparatus according to claim 1, wherein the data scrambler further includes, a main converter receiving and performing a nonlinear conversion on the data, wherein the controller outputs a data transfer signal as the transfer signal in a case of transferring the data, and wherein the sub converter performs the following:

receives via the third input the data transfer signal outputted from the controller, receives via the second input the data converted according to the nonlinear conversion from the main converter, and transfers unchanged the data received via the second input from the main converter to the output as a result of receiving the data transfer signal.

3. The data conversion apparatus according to claim 1, further comprising:

a key generator generating the key, wherein the controller outputs a key transfer signal as the transfer signal in a case of transferring the key, and wherein the sub converter performs the following:

receive via the third input the key transfer signal outputted from the controller and the key generated by the key generator, and transfer unchanged the key received via the first input from the key generator to the output as a result of receiving the key transfer signal.

4. The data conversion apparatus according to claim 3, wherein the key generator further includes:

an intermediate key generator receiving a secret key and generating an intermediate key based on the secret key received, wherein the sub converter receives via the first input the intermediate key from the intermediate key generator and, upon receipt via the third input of the key transfer signal outputted from the controller, transfers unchanged the intermediate key generated by the intermediate key generator via the output to a main converter as a result of receiving the key transfer signal, wherein the main converter converts and outputs the intermediate key transferred by the sub converter by performing at least one nonlinear conversion on the transferred intermediate key, wherein the sub converter converts and outputs the intermediate key previously converted and outputted by the main converter by using the combination of the logical operation elements and the bit shifting element to perform the data conversion at least once, wherein at least one of the main converter and the sub converter repeats converting and outputting the intermediate key at least once, wherein the main converter outputs the intermediate key outputted from at least one of the main converter and the sub converter as an output key, and wherein the intermediate key generator receives the output key outputted from the main converter, thereby generating an extended key including the intermediate key and the output key.

5. The data conversion apparatus according to claim 4, wherein the intermediate key generator includes:

a 6-1 selector selecting one key from among six keys received, and a key register holding the one key selected by the 6-1 selector as the intermediate key, wherein the 6-1 selector receives six keys including the secret key, the intermediate key held in the key register, and four keys obtained through rotation shifts of the intermediate key held in the key register by four different numbers, and selects one key from among the six keys received, wherein the key register holds a key selected by the 6-1 selector, and wherein the sub converter, upon receipt of the key transfer signal outputted from the controller, receives the key held in the key register as the intermediate key, and transfers the intermediate key received.

6. The data conversion apparatus according to claim 4, wherein the intermediate key generator includes:

a 4-1 selector selecting one key from among four keys received, a 3-1 selector selecting one key from among three keys received, and a key register holding a key selected by the 3-1 selector as the intermediate key, wherein the 4-1 selector receives four keys obtained through the rotation shifts of the intermediate key held in the key register by four different numbers, and selects one key from among the four keys received, wherein the 3-1 selector receives three keys including the secret key, the one key selected by the 4-1 selector, and the intermediate key held in the key register, and selects one key from among the three keys received, wherein the key register holds a key selected by the 3-1 selector, and wherein the sub converter, upon receipt of the key transfer signal outputted from the controller, receives the key held in the key register as the intermediate key, and transfers the intermediate key received.

7. The data conversion apparatus according to claim 4, wherein the key generator further includes:

a key scheduler receiving the extended key generated by the intermediate key generator and a predetermined constant, and scheduling at least one of the received extended key and the received predetermined constant to be output to at least one of the main converter and the sub converter according to a predetermined condition.

8. The data conversion apparatus according to claim 1, wherein the sub converter includes at least one of:
a data converter unit having a first combination of logical operation elements and a bit shifting element configured to perform linear data conversion, and
a data inverter unit having a second combination of logical operation elements and a bit shifting element configured to perform a data conversion that is inverse to that of the data converter unit,
wherein at least one of the data converter unit and the data inverter unit is configured to perform the following:
perform the data conversion on the data received via the second input based on the key received via the first input when the transfer signal is not received from the controller, and
when the third input receives the transfer signal outputted from the controller, transfer unchanged at least one of the data and the key received via the first and second inputs without performing the data conversion based on the altered operation of the corresponding combination of the logical operation elements and the bit shifting element as a result of receiving the transfer signal.

9. The data conversion apparatus according to claim 8, wherein the controller outputs a key transfer signal and a mask signal as the transfer signals for transferring the key received via the first input, and
wherein the at least one of the data converter unit and the data inverter unit transfers the received key unchanged, upon receipt of the key transfer signal and the mask signal outputted from the controller, by nullifying the data received via the second input by inputting the key transfer signal to one of the logical operation elements, and letting the key received via the first input to pass through to the output by inputting the mask signal to another one of the logical operation elements.

10. The data conversion apparatus according to claim 8, wherein the controller outputs a DATA TRANSFER signal as the transfer signal, and
wherein at least one of the data converter unit and the data inverter unit transfers the data received via the second input, upon receipt of the DATA TRANSFER signal outputted from the controller, by nullifying the key received via the first input at one of the logical elements and letting the data received pass through to the output as a result of receiving the DATA TRANSFER signal.

11. The data conversion apparatus according to claim 1, wherein the sub converter includes:
a ½ sub converter unit in which the combination of the logical operation elements and the bit shifting element is configured to switchably implement a first data conversion for linear data conversion and a second data inversion for data conversion that is inverse to the linear data conversion,
wherein the sub converter is configured to perform the following
perform the data conversion on the data received via the second input by use of the ½ sub converter unit when the transfer signal is not received from the controller, and
when the third input receives the transfer signal outputted by the controller in a case where the controller outputted the transfer signal, transfer unchanged at least one of the key and the data received via the first and second inputs based on the altered operation of the combination of the logical operation elements and the bit shifting element as a result of receiving the transfer signal.

12. The data conversion apparatus according to claim 1, wherein the sub converter includes:
a data converter unit having a first combination of logical operation elements and a bit shifting element configured to perform linear data conversion, and
a data inverter unit having a second combination of logical operation elements and a bit shifting element configured to perform a data conversion that is inverse to that of the data converter unit, the data converter unit and the data inverter unit being arranged in series,
wherein one of the data converter unit and the data inverter unit either performs the data conversion on or transfers unchanged one of the following:
data previously converted by the other of the data converter unit and the data inverter unit,
a key transferred unchanged by the other of the data converter unit and the data inverter unit, and
data transferred unchanged by the other of the data converter.

13. The data conversion apparatus according to claim 1, wherein the sub converter receives one of a 128-bit key, a 192-bit key, and a 256-bit key via the first input for use in performing the data conversion on the data received via the second input.

14. The data conversion apparatus according to claim 1, further comprising:
a key generator for generating a key,
wherein the key generator further includes,
an intermediate key generator receiving a secret key, generating an intermediate key based on the secret key, and generating an output key based on the intermediate key using a main converter and the sub converter.

15. The data conversion apparatus according to claim 14, wherein the intermediate key generator includes:
a first 6-1 selector receiving six keys, and selecting one key from among the six keys received,
a first key register holding the one key selected by the first 6-1 selector as the intermediate key,
a second 6-1 selector selecting one key from among six keys, and
a second key register holding the one key selected by the first 6-1 selector as the output key,
wherein the first 6-1 selector receives a secret key, receives six keys including the secret key, the intermediate key held in the first key register, and four keys obtained through rotation shifts of the intermediate key held in the first key register by four different numbers, and selects one key from among the six keys received,
wherein the first key register holds a key selected by the first 6-1 selector, as an intermediate key,
wherein the second 6-1 selector receives an output key generated by using the main converter and the sub converter, receives six keys including the output key received, the output key held in the second key register, and four keys obtained through rotation shifts of the output key held in the second key register by four different numbers, and selects one key from among the six keys received, and
wherein the second key register holds the one key selected by the second 6-1 selector as an output key.

16. The data conversion apparatus according to claim 14, wherein the intermediate key generator includes,
a 2-1 selector selecting one key from among two keys,
a 4-1 selector selecting one key from among four keys, a first 3-1 selector selecting one key from among three keys,
a first key register holding the one key selected by the first 3-1 selector as an intermediate key,
a second 3-1 selector selecting one key from among three keys, and
a second key register holding the one key selected by the second 3-1 selector as an output key,
wherein the 2-1 selector selects one key from among the intermediate key held in the first key register and the output key held in the first key register,
wherein the 4-1 selector receives four keys obtained through rotation shifts of the one key selected by the 2-1 selector by four different numbers, and selects one key from among the four keys received,
wherein the first 3-1 selector receives a secret key, receives three keys including the secret key, the one key selected by the 4-1 selector, and the intermediate key held in the first key register, and selects one key from among the three keys,
wherein the first key register holds the one key selected by the first 3-1 selector as an intermediate key,
wherein the second 3-1 selector receives an output key generated by using the main converter and the sub converter, receives three keys including the output key received, the one key selected by the 4-1 selector, and the output key held in the second key register, and selects one key from among the three keys, and
wherein the second key register holds one key selected by the second 3-1 selector as an output key.

17. The data conversion apparatus according to claim 14, wherein the intermediate key generator includes:
a first 2-1 selector selecting one key from among two keys,
a first key register holding the one key selected by the first 2-1 selector,
a second 2-1 selector selecting one key from among two keys,
a second key register holding the one key selected by the second −1 KA selector,
a third 2-1 selector selecting one key from among two keys, and
a 8-1 selector selecting one key from among eight keys,
wherein the first 2-1 selector receives a secret key, and selects one key from among the secret key received and the key held in the first key register,
wherein the second 2-1 selector receives an output key generated by using the main converter and the sub converter, and selects one key from among the output key received and the key held in the second key register,
wherein the third 2-1 selector selects one key from among two keys selected by the first 2-1 selector and the second 2-1 selector, and
wherein the 8-1 selector receives eight keys obtained through rotation shifts of the one key selected by the third 2-1 selector by different eight numbers, and selects one key from among the eight keys received.

18. A data conversion method for receiving data, and performing data conversion for at least one of data encryption and data decryption of the received data using a key, wherein the data conversion method comprising:
inputting the key and the received data to a circuit comprising a combination of logical operation elements and a bit shifting element;
when at least one of the inputted key and the inputted data is to be transferred unchanged by the circuit, inputting a transfer signal to the circuit in conjunction with the inputting of the key and the received data,
using the combination of the logical elements and the bit shifting element to perform the data conversion for the one of data encryption and data decryption by logically combining bits of the inputted data with bits of the inputted key when the transfer signal is not inputted in conjunction with the inputting of the key and the received data, and
when the transfer signal is inputted in conjunction with the inputting of the key and the received data, using the transfer signal to alter the operation of the combination of the logical elements and the bit shifting element not to perform the data conversion such that the at least one of the inputted key and the inputted data passes through the combination of the logical elements and the bit shifting element unchanged.

19. A data conversion apparatus, comprising:
a key generating section; and
a data scrambler that receives a key generated by the key generating section and input data, and performs data conversion on the input data using the key,
wherein the data scrambler comprises:
a main converter that receives the key generated by the key generating section and first data, and performs nonlinear data conversion on the first data using the received key,
a sub converter that receives the key generated by the key generating section and second data, and either performs XOR on the received second data using the received key or performs linear data conversion on the received second data using the received key, and
a selector which receives the input data received by the data scrambler and the data converted by the nonlinear data conversion performed by the main converter, and determines when to transfer the input data received by the data scrambler to the sub converter as the second data and when to transfer the data converted by the nonlinear data conversion to the sub converter as the second data;
wherein the sub converter receives, as the second data, the data received by the data scrambler and the data converted by the nonlinear data conversion performed by the main converter, respectively, based on the determinations by the selector,
wherein the sub converter performs XOR on the input data using the received key, when receiving the input data as the second data,
wherein the sub converter is controlled to perform a selected one of XOR and linear data conversion on the data converted by the nonlinear data conversion using the received key, when receiving the data converted by the nonlinear data conversion as the second data, the one of XOR and linear data conversion being selected based on a control signal transferred to the sub converter,
wherein the main converter selectively receives, as the first data, the data converted by the XOR performed by the sub converter or the data converted by the linear data conversion performed by the sub converter, and performs nonlinear data conversion on the received XORed data or the received data converted by the linear data conversion, and
wherein the sub converter and the main converter repeat processing in order of the sub converter followed by the main converter.

20. The data conversion apparatus according to claim 19, wherein the main converter includes, an F function unit that repeats performing the nonlinear data conversion of the data received based on an F function using the key received and outputting the data converted more than once.

21. The data conversion apparatus according to claim 20, wherein the F function unit repeats the nonlinear data conversion based on the F function more than once in such a manner as to complete the nonlinear data conversion based on the F function for one round by repeating $2^x$ times performing the nonlinear data conversions of the data received based on $\frac{1}{2}^x$ F function ($x \geqq 0$) using the key received and outputting the data converted, and as to repeat outputting the data of which the nonlinear data conversion is completed more than once.

22. The data conversion apparatus according to claim 20, wherein the F function unit receives one of upper data and lower data divided, performs the nonlinear data conversion of the one of upper data and lower data received, outputs one of the upper data and the lower data converted, XORs one of the upper data and the lower data outputted with an other of the upper data and the lower data, swaps XORed data and an other of the upper data and the lower data that was not received by the F function unit, and outputs swapped data.

23. The data conversion apparatus according to claim 19, further comprising:
a key generator for generating a key,
wherein the key generator includes,
an intermediate key generator, receiving a secret key, generating an intermediate key based on the secret key received, and generating an output key based on the intermediate key using the main converter and the sub converter.

24. The data conversion apparatus according to claim 23, wherein the key generator further includes,
a key scheduler receiving the intermediate key generated by the intermediate key generator, the output key and a predetermined constant, and scheduling a key to be used by the main converter and the sub converter for the data conversion, based on the intermediate key received, the output key received and the predetermined constant received according to a predetermined condition, and
wherein the main converter and the sub converter each receive the key scheduled by the key scheduler, and perform the data conversion of the data respectively received based on the key respectively received.

25. The data conversion apparatus according to claim 23, wherein the intermediate key generator includes,
a first 6-1 selector receiving six keys, and selecting one key from among the six keys received,
a first key register holding the one key selected by the first 6-1 selector as the intermediate key,
a second 6-1 selector selecting one key from among six keys, and
a second key register holding the one key selected by the second 6-1 selector as the output key,
wherein the first 6-1 selector receives a secret key, receives six keys including the secret key, the intermediate key held in the first key register, and four keys obtained through rotation shifts of the intermediate key held in the first key register by four different numbers, and selects one key from among the six keys received,
wherein the first key register holds a key selected by the first 6-1 selector, as an intermediate key,
wherein the second 6-1 selector receives an output key generated by using the main converter and the sub converter, receives six keys including the output key received, the output key held in the second key register, and four keys obtained through rotation shifts of the output key held in the second key register by four different numbers, and selects one key from among the six keys received, and
wherein the second key register holds the one key selected by the second 6-1 selector as an output key.

26. The data conversion apparatus according to claim 23 wherein the intermediate key generator includes,
a 2-1 selector selecting one key from among two keys,
a 4-1 selector selecting one key from among four keys,
a first 3-1 selector selecting one key from among three keys,
a first key register holding the one key selected by the first 3-1 selector as an intermediate key,
a second 3-1 selector selecting one key from among three keys, and
a second key register holding the one key selected by the second 3-1 selector as an output key,
wherein the 2-1 selector selects one key from among the intermediate key held in the first key register and the output key held in the second key register,
wherein the 4-1 selector receives four keys obtained through rotation shifts of the one key selected by the 2-1 selector by four different numbers, and selects one key from among the four keys received,
wherein the first 3-1 selector receives a secret key, receives three keys including the secret key, the one key selected by the 4-1 selector, and the intermediate key held in the first key register, and selects one key from among the three keys,
wherein the first key register holds the one key selected by the first 3-1 selector as an intermediate key,
wherein the second 3-1 selector receives an output key generated by using the main converter and the sub converter, receives three keys including the output key received, the one key selected by the 4-1 selector, and the output key held in the second key register, and selects one key from among the three keys, and
wherein the second key register holds one key selected by the second 3-1 selector as an output key.

27. The data conversion apparatus according to claim 23, wherein the intermediate key generator includes,
a first 2-1 selector selecting one key from among two keys,
a first key register holding the one key selected by the first 2-1 selector,
a second 2-1 selector selecting one key from among two keys,
a second key register holding the one key selected by the second 2-1 selector,
a third 2-1 selector selecting one key from among two keys, and
a 8-1 selector selecting one key from among eight keys,
wherein the first 2-1 selector receives a secret key, and selects one key from among the secret key received and the key held in the first key register,
wherein the second 2-1 selector receives an output key generated by using the main converter and the sub converter, and selects one key from among the output key received and the key held in the second key register,
wherein the third 2-1 selector selects one key from among two keys selected by the first 2-1 selector and the second 2-1 selector, and
wherein the 8-1 selector receives eight keys obtained through rotation shifts of the one key selected by the third 2-1 selector by different eight numbers, and selects one key from among the eight keys received.

28. The data conversion apparatus according to claim 19, wherein the sub converter includes at least one of,
- a data converter unit performing linear data conversion, and
- a data inverter unit performing data conversion that is inverse to that of the data converter unit, and
- wherein the data conversion apparatus performs the data conversion by at least one of the data converter unit and the data inverter unit.

29. The data conversion apparatus according to claim 19, wherein the sub converter includes,
- a ½ sub converter unit implementing data conversion for linear data conversion and data inversion for data conversion that is inverse to the data conversion on a shared circuit on a shared circuit, and
- wherein the sub converter converts the data by use of the ½ sub converter unit.

30. The data conversion apparatus according to claim 19, wherein the data conversion apparatus receives one of a 128-bit key, a 192-bit key and a 256-bit key, and performs data conversion for one of data encryption and data decryption of the data received using the key received.

31. A data conversion method, comprising:
- a key generating step; and
- a data scrambling step that receives a key generated by the key generating step and input data, and performs data conversion on the received data for at least one of encryption and decryption of the input data using the key,
- wherein the data scrambling step comprises:
  - a main converting step that receives the key generated by the key generating step and first data, and performs nonlinear data conversion on the first data using the received key,
  - a sub converting step that receives the key generated by the key generating step and second data, and either performs XOR on the received second data using the received key or performs linear data conversion on the received second data using the received key,
  - a determining step for determining when the input data received by the data scrambling step is to be transferred to the sub converter as the second data, and
  - a determining step for determining when the data converted by the nonlinear data conversion by the main converting step is to be transferred to the sub converting step as the second data,
- wherein the sub converting step receives, as the second data, the data received by the data scrambling step and the data converted by the nonlinear data conversion performed by the main converting step, respectively, based on the determining steps,
- wherein the sub converting step performs XOR on the received data using the received key, when receiving the data received by the data scrambling step as the second data,
- wherein the sub converting step performs a selected one of XOR and linear data conversion on the data converted by the nonlinear data conversion using the received key, when receiving the data converted by the nonlinear data conversion as the second data, the one of XOR and linear data conversion being selected based on a control signal received by the sub converting step;
- wherein the main converting step selectively receives, as the first data, the data converted by the XOR performed by the sub converting step or the data converted by the linear data conversion performed by the sub converting step, and performs nonlinear data conversion on the received XORed data or the received data converted by the linear data conversion, and
- wherein the sub converting step and the main converting step repeat processing in order of the sub converting step followed by the main converting step.

* * * * *